United States Patent
Yoshimoto

(10) Patent No.: US 12,313,314 B2
(45) Date of Patent: May 27, 2025

(54) SOLID-STATE REFRIGERATION DEVICE

(71) Applicant: DAIKIN INDUSTRIES, LTD., Osaka (JP)

(72) Inventor: Akio Yoshimoto, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 369 days.

(21) Appl. No.: 17/704,944

(22) Filed: Mar. 25, 2022

(65) Prior Publication Data

US 2022/0214091 A1 Jul. 7, 2022

Related U.S. Application Data

(63) Continuation of application No. PCT/JP2020/034167, filed on Sep. 9, 2020.

(30) Foreign Application Priority Data

Sep. 30, 2019 (JP) ................. 2019-179628

(51) Int. Cl.
*F25B 47/02* (2006.01)
*F25B 21/00* (2006.01)

(52) U.S. Cl.
CPC .............. *F25B 47/02* (2013.01); *F25B 21/00* (2013.01); *F25B 2321/0023* (2013.01)

(58) Field of Classification Search
CPC ...... F25B 2321/0021; F25B 2321/0023; F25B 21/00; F25B 47/02
See application file for complete search history.

(56) References Cited

U.S. PATENT DOCUMENTS

2012/0272666 A1   11/2012   Watanabe et al.
2014/0090406 A1   4/2014    Ishikawa et al.
(Continued)

FOREIGN PATENT DOCUMENTS

DE   10 2012 206 359 A1   10/2012
EP         2 821 733 A1    1/2015
(Continued)

OTHER PUBLICATIONS

European Search Report of corresponding EP Application No. 20 87 0946.9 dated Sep. 4, 2023.
(Continued)

*Primary Examiner* — Ana M Vazquez
(74) *Attorney, Agent, or Firm* — GLOBAL IP COUNSELORS, LLP

(57) ABSTRACT

A solid-state refrigeration device includes a solid-state cooler, first and second heat exchangers, a heat medium circuit, a reciprocating transport mechanism to transport a heat medium of the heat medium circuit, and an operation switching mechanism. The operation switching mechanism is configured to switch between a heating operation and a defrosting operation. In the heating operation, the heat medium heated by the solid-state cooler is caused to release heat in the first heat exchanger, and the heat medium cooled by the solid-state cooler is caused to absorb heat in the second heat exchanger. In the defrosting operation, the heat medium cooled by the solid-state cooler is caused to absorb heat in the first heat exchanger, and the heat medium heated by the solid-state cooler is caused to release heat in the second heat exchanger.

20 Claims, 35 Drawing Sheets

(56) References Cited

U.S. PATENT DOCUMENTS

| | | | | |
|---|---|---|---|---|
| 2014/0165595 A1* | 6/2014 | Zimm | ................ | F25B 21/00 |
| | | | | 62/3.1 |
| 2015/0267943 A1* | 9/2015 | Kim | ................ | F25B 21/00 |
| | | | | 62/3.1 |
| 2016/0025385 A1* | 1/2016 | Auringer | ................ | F25B 21/00 |
| | | | | 62/3.1 |
| 2019/0161273 A1 | 5/2019 | Ingram-Tedd et al. | | |

FOREIGN PATENT DOCUMENTS

| | | |
|---|---|---|
| JP | 1-111174 A | 4/1989 |
| JP | 10-9725 A | 1/1998 |
| JP | 2011-99672 A | 5/2011 |
| JP | 2019-27611 A | 2/2019 |
| JP | 2019-507714 A | 3/2019 |
| JP | 2019-60544 A | 4/2019 |
| JP | 2019-100592 A | 6/2019 |
| WO | 2012/168971 A1 | 12/2012 |

OTHER PUBLICATIONS

International Preliminary Report of corresponding PCT Application No. PCT/JP2020/034167 dated Apr. 14, 2022.
International Search Report of corresponding PCT Application No. PCT/JP2020/034167 dated Oct. 27, 2020.

* cited by examiner

FIRST ACTION

SECOND ACTION

AIR-COOLING OPERATION

AIR-HEATING OPERATION (NORMAL ACTION)

DEFROSTING OPERATION (NORMAL ACTION)

DEFROSTING OPERATION (BYPASS ACTION)

AIR-HEATING OPERATION (BYPASS ACTION)

DEFROSTING OPERATION (FIRST DEFROSTING ACTION)

DEFROSTING OPERATION (SECOND DEFROSTING ACTION)

DEFROSTING OPERATION (FIRST DEFROSTING ACTION)

THIRD ACTION

FOURTH ACTION

FIFTH ACTION

SIXTH ACTION

AIR-COOLING OPERATION

AIR-HEATING OPERATION

DEFROSTING OPERATION

DEFROSTING OPERATION (FIRST DEFROSTING ACTION)

DEFROSTING OPERATION (SECOND DEFROSTING ACTION)

DEFROSTING OPERATION (FIRST DEFROSTING ACTION)

DEFROSTING OPERATION (SECOND DEFROSTING ACTION)

DEFROSTING OPERATION (FIRST DEFROSTING ACTION)

DEFROSTING OPERATION (SECOND DEFROSTING ACTION)

SOLID-STATE REFRIGERATION DEVICE

CROSS-REFERENCE TO RELATED APPLICATIONS

This is a continuation of International Application No. PCT/JP2020/034167 filed on Sep. 9, 2020, which claims priority to Japanese Patent Application No. 2019-179628, filed on Sep. 30, 2019. The entire disclosures of these applications are incorporated by reference herein.

BACKGROUND

Technical Field

The present disclosure relates to a solid-state refrigeration device.

Background Art

A magnetic refrigeration device disclosed in Japanese Unexamined Patent Application Publication (Translation of PCT Application) No. 2016-507714 includes a plurality of beds, a high-temperature-side heat exchanger, and a low-temperature-side heat exchanger. The beds, the high-temperature-side heat exchanger, and the low-temperature-side heat exchanger are connected to a heat medium circuit. In the beds, a magnetic working substance generates heat or absorbs heat in accordance with a magnetic field fluctuation of the magnetic working substance. A heat medium of the heat medium circuit is heated by the magnetic working substance that generates heat. Otherwise, the heat medium of the heat medium circuit is cooled by the magnetic working substance that absorbs heat. Due to such an action, a temperature difference occurs between the heat medium of the high-temperature-side heat exchanger and the heat medium of the low-temperature-side heat exchanger.

The surface of the low-temperature-side heat exchanger may become frosted, because the temperature of the heat medium of the low-temperature-side heat exchanger becomes low. In Japanese Unexamined Patent Application Publication (Translation of PCT Application) No. 2016-507714, the low-temperature-side heat exchanger is defrosted by transporting the heat medium accumulated in the high-temperature-side heat exchanger to the low-temperature-side heat exchanger.

SUMMARY

According to a first aspect of the present disclosure, a solid-state refrigeration device includes at least one solid-state cooler, at least one first heat exchanger, at least one second heat exchanger, at least one heat medium circuit, a reciprocating transport mechanism configured to transport a heat medium of the heat medium circuit in a reciprocating manner, and an operation switching mechanism. The solid-state cooler includes a solid refrigerant substance, an internal flow path with the solid refrigerant substance disposed therein, and an inducer configured to induce a caloric effect in the solid refrigerant substance. The heat medium circuit is connected to the first heat exchanger, the second heat exchanger, and the internal flow path. The operation switching mechanism is configured to switch between a heating operation and a defrosting operation. In the heating operation, the heat medium heated by the solid-state cooler is caused to release heat in the first heat exchanger, and the heat medium cooled by the solid-state cooler is caused to absorb heat in the second heat exchanger. In the defrosting operation, the heat medium cooled by the solid-state cooler is caused to absorb heat in the first heat exchanger, and the heat medium heated by the solid-state cooler is caused to release heat in the second heat exchanger.

BRIEF DESCRIPTION OF THE DRAWINGS

FIG. 5A illustrates a first action, and FIG. 5B illustrates a second action.

FIG. 31A illustrates a third action, and FIG. 31B illustrates a fourth action.

FIG. 32A illustrates a fifth action, and FIG. 32B illustrates a sixth action.

DETAILED DESCRIPTION OF EMBODIMENT(S)

Hereafter, embodiments of present disclosure will be described with reference to the drawings. The embodiments described below are basically preferred examples, and are not intended to limit the scope of the present invention, the applications thereof, or the range of the uses thereof.

First Embodiment

A magnetic refrigeration device (1) according to the present embodiment adjusts the temperature of a heat medium by using the magnetocaloric effect. The magnetic refrigeration device (1) is a solid-state refrigeration device that adjusts the temperature of a heat medium by using the caloric effect. The magnetic refrigeration device (1) is applied, for example, to an air conditioner. The magnetic refrigeration device (1) adjusts the temperature of air in a space to be air-conditioned. The space to be air-conditioned is an indoor space. The magnetic refrigeration device (1) performs an air-cooling operation and an air-heating operation in a switching manner.

Figure 1:
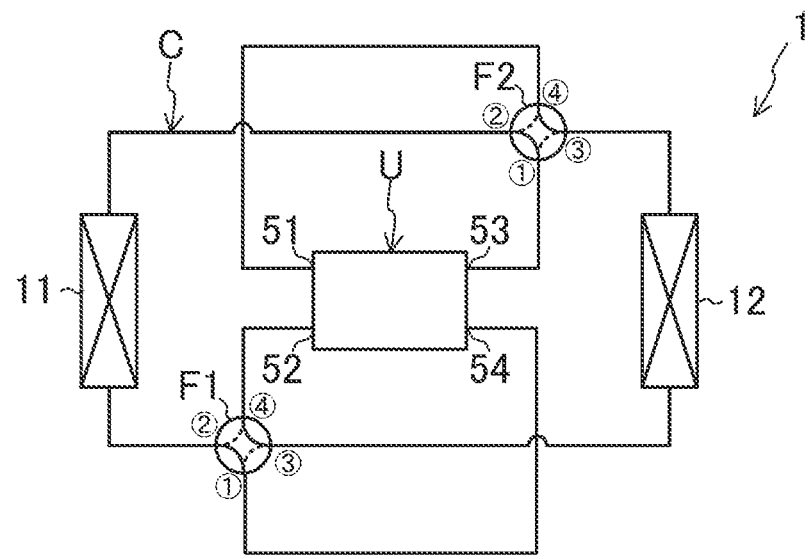
FIG. 1 is a piping diagram of a magnetic refrigeration device according to a first embodiment.

As illustrated in FIG. 1, the magnetic refrigeration device (1) includes a heat medium circuit (C) filled with a heat medium. The heat medium, with which the heat medium circuit (C) is filled, is transported in the heat medium circuit (C). The heat medium includes, for example, a refrigerant, water, brine, and the like.

The magnetic refrigeration device (1) includes a magnetic refrigeration unit (U), an indoor heat exchanger (11), an outdoor heat exchanger (12), a switching mechanism (15), and a control device (100). In the present embodiment, the indoor heat exchanger (11) corresponds to a first heat exchanger, and the outdoor heat exchanger (12) corresponds to a second heat exchanger.

Magnetic Refrigeration Unit

Figure 2:
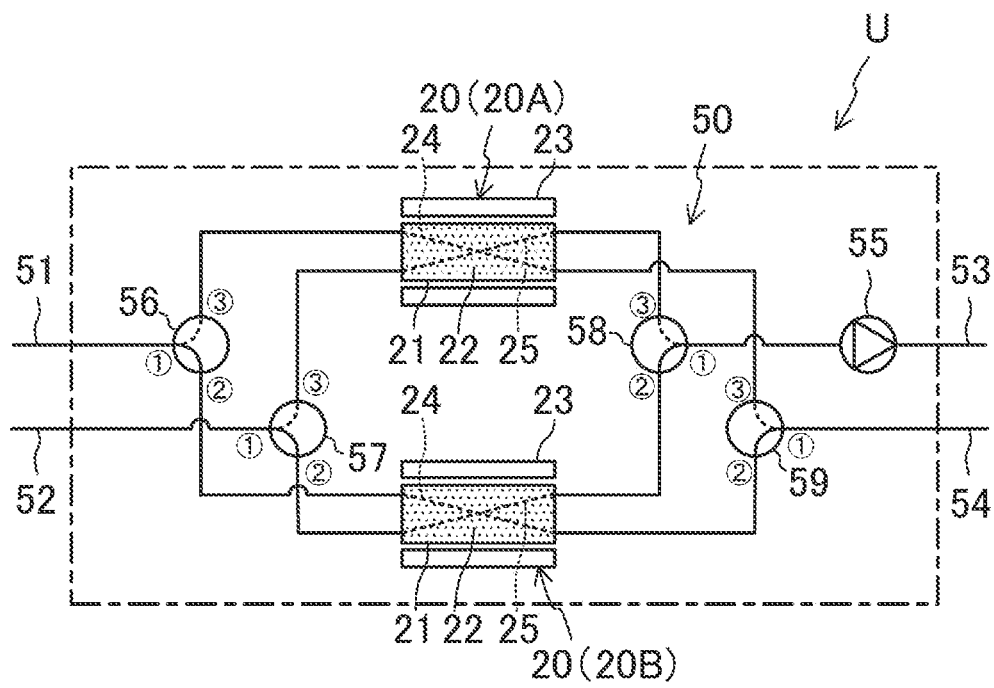
FIG. 2 is a schematic diagram of a magnetic refrigeration unit according to the first embodiment.

As illustrated in FIG. 2, the magnetic refrigeration unit (U) includes two magnetic refrigerators (20) as solid-state refrigerators, a low-temperature outflow pipe (51), a low-temperature inflow pipe (52), a high-temperature outflow pipe (53), a high-temperature inflow pipe (54), and a unit-side pump (55). The magnetic refrigeration unit (U) includes a low-temperature first three-way valve (56), a low-temperature second three-way valve (57), a high-temperature first three-way valve (58), and a high-temperature second three-way valve (59). The two magnetic refrigerators (20) are constituted by a first magnetic refrigerator (20A) and a second magnetic refrigerator (20B). The low-temperature outflow pipe (51) corresponds to a low-temperature outflow portion, and the low-temperature inflow pipe (52) corresponds to a low-temperature inflow portion. The high-temperature outflow pipe (53) corresponds to a high-temperature outflow portion, and the high-temperature inflow pipe (54) corresponds to a high-temperature inflow portion. The unit-side pump (55) and the plurality of three-way valves (56, 57, 58, 59) constitute a reciprocating transport mechanism (50).

Each magnetic refrigerator (20) includes a bed (21), a magnetic working substance (22) as a solid-state working substance, and a magnetic field modulator (23) as an inducer. The bed (21) is a hollow case or column. The inside of the bed (21) is filled with the magnetic working substance (22).

The magnetic working substance (22) generates heat when a magnetic field is applied or when an applied magnetic field strengthens. The magnetic working substance (22) absorbs heat when a magnetic field is removed or when an applied magnetic field weakens. As the material of the magnetic working substance (22), for example, $Gd_5(Ge_{0.5}Si_{0.5})_4$, $La(Fe_{1-x}Si_x)_{13}$, $La(Fe_{1-x}Co_xSi_y)_{13}$, $La(Fe_{1-x}Si_x)_{13}H_y$, $Mn(As_{0.9}Sb_{0.1})$, or the like can be used.

Figure 3:
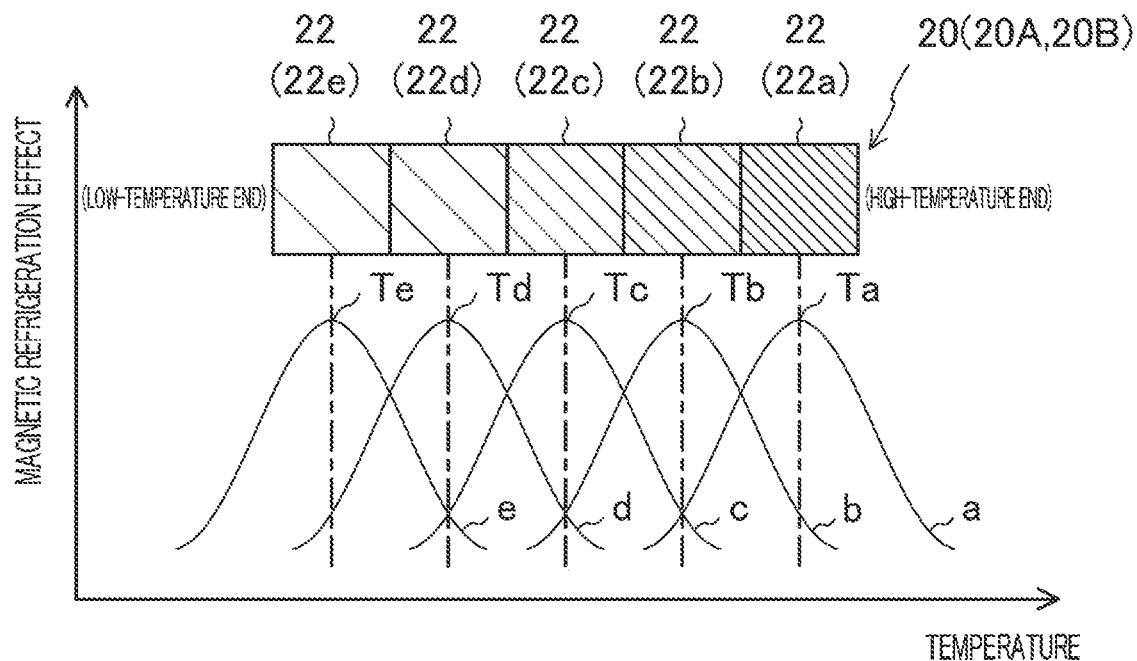
FIG. 3 is graph schematically representing the relationship between the temperature of a cascade magnetic refrigerator according to the first embodiment and the magnetic refrigeration effect.

Each magnetic refrigerator (20) is a cascade magnetic refrigerator including magnetic working substances (22) of a plurality of types. As illustrated in FIG. 3, the magnetic refrigerator (20) of the present embodiment includes, for example, five magnetic working substances (22). In the magnetic refrigerator (20), a first magnetic working substance (22a), a second magnetic working substance (22b), a third magnetic working substance (22c), a fourth magnetic working substance (22d), and a fifth magnetic working substance (22e) are arranged in order from a high-temperature end toward a low-temperature end thereof. The characteristics of the magnetic working substances (22) related to temperature and magnetic refrigeration effect differ from each other. To be specific, the Curie temperatures of these magnetic working substances (22) differ from each other. The Curie temperature is a temperature at which the magnetic refrigeration effect of a magnetic working substance is the highest.

A relationship Ta>Tb>Tc>Td>Te is satisfied, where Ta is the Curie temperature of the first magnetic working substance (22a), Tb is the Curie temperature of the second magnetic working substance (22b), Tc is the Curie temperature of the third magnetic working substance (22c), Td is the Curie temperature of the fourth magnetic working substance (22d), and Te is the Curie temperature of the fifth magnetic working substance (22e).

The magnetic field modulator (23) adjusts the strength of a magnetic field applied to the magnetic working substance (22). The magnetic field modulator (23) is an inducer that is configured to induce the caloric effect in the magnetic working substance (22) as a solid refrigerant substance. The magnetic field modulator (23) is constituted by, for example, an electromagnet that can modulate a magnetic field. The magnetic field modulator (23) performs a first modulation action and a second modulation action. With the first modulation action, a magnetic field is applied to the magnetic working substance (22), or a magnetic field applied to the magnetic working substance (22) is strengthened. With the second modulation action, a magnetic field applied to the magnetic working substance (22) is removed, or a magnetic field applied to the magnetic working substance (22) is weakened.

A first internal flow path (24) and a second internal flow path (25) are formed inside the bed (21) of each magnetic refrigerator (20). A low-temperature end of the first internal flow path (24) of the first magnetic refrigerator (20A) is connected to the low-temperature outflow pipe (51) via the low-temperature first three-way valve (56). A low-temperature end of the second internal flow path (25) of the first magnetic refrigerator (20A) is connected to a low-temperature inflow pipe (52) via the low-temperature second three-way valve (57). A high-temperature end of the first internal flow path (24) of the second magnetic refrigerator (20B) is connected to the high-temperature inflow pipe (54) via the high-temperature second three-way valve (59). A high-temperature end of the second internal flow path (25) of the second magnetic refrigerator (20B) is connected to the high-temperature outflow pipe (53) via the high-temperature first three-way valve (58).

The unit-side pump (55) is provided in the high-temperature outflow pipe (53). The unit-side pump (55) is a one-way pump. The unit-side pump (55) transports a heat medium toward the downstream side of the high-temperature outflow pipe (53).

A first port of the low-temperature first three-way valve (56) communicates with the low-temperature outflow pipe (51). A second port of the low-temperature first three-way valve (56) communicates with a low-temperature end of the first internal flow path (24) of the second magnetic refrigerator (20B). A third port of the low-temperature first three-way valve (56) communicates with the low-temperature end of the first internal flow path (24) of the first magnetic refrigerator (20A).

A first port of the low-temperature second three-way valve (57) communicates with the low-temperature inflow pipe (52). A second port of the low-temperature second three-way valve (57) communicates with a low-temperature end of the second internal flow path (25) of the second magnetic refrigerator (20B). A third port of the low-temperature second three-way valve (57) communicates with the low-temperature end of the second internal flow path (25) of the first magnetic refrigerator (20A).

A first port of the high-temperature first three-way valve (58) communicates with the high-temperature outflow pipe (53). A second port of the high-temperature first three-way valve (58) communicates with the high-temperature end of the second internal flow path (25) of the second magnetic refrigerator (20B). A third port of the high-temperature first three-way valve (58) communicates with a high-temperature end of the second internal flow path (25) of the first magnetic refrigerator (20A).

A first port of the high-temperature second three-way valve (59) communicates with the high-temperature inflow pipe (54). A second port of the high-temperature second three-way valve (59) communicates with the high-temperature end of the first internal flow path (24) of the second magnetic refrigerator (20B). A third port of the high-temperature second three-way valve (59) communicates with the high-temperature end of the first internal flow path (24) of the first magnetic refrigerator (20A).

Each three-way valve (56, 57, 58, 59) has the first port, the second port, and the third port. In the drawings, the first port of each three-way valve is denoted by an encircled "1", the second port of the three-way valve is denoted by an encircled "2", and the third port of the three-way valve is denoted by an encircled "3".

Each three-way valve (56, 57, 58, 59) is switched between a first state (a state shown by a solid line in FIG. 2) and a second state (a state shown by a broken line in FIG. 2). Each three-way valve (56, 57, 58, 59) in the first state allows the first port and the second port to communicate with each other. Each three-way valve (56, 57, 58, 59) in the second state allows the first port and the third port to communicate with each other.

Indoor Heat Exchanger

The indoor heat exchanger (11) illustrated in FIG. 1 is a utilization heat exchanger. The indoor heat exchanger (11) causes a heat medium and indoor air to exchange heat. One end of the indoor heat exchanger (11) is connected to a second port of a first four-way switching valve (F1) via piping. The other end of the indoor heat exchanger (11) is connected to a second port of a second four-way switching valve (F2) via piping.

Outdoor Heat Exchanger

The outdoor heat exchanger (12) is a heat-source heat exchanger. The outdoor heat exchanger (12) causes a heat medium and outdoor air to exchange heat. One end of the outdoor heat exchanger (12) is connected to a third port of the first four-way switching valve (F1) via piping. The other end of the outdoor heat exchanger (12) is connected to a third port of the second four-way switching valve (F2) via piping.

Switching Mechanism

The switching mechanism (15) switches between flow paths of a heat medium of the heat medium circuit (C). The switching mechanism (15) switches between flow paths of the heat medium at least in the air-heating operation and the defrosting operation. The switching mechanism (15) of the present embodiment switches between flow paths of the heat medium in the air-cooling operation, the air-heating operation, and the defrosting operation. The switching mechanism (15) is constituted by valves of various types.

To be specific, the switching mechanism (15) includes the first four-way switching valve (F1) and the second four-way switching valve (F2). Each four-way switching valve (F1, F2) has a first port, a second port, a third port, and a fourth port. In the drawings, the first port of each four-way switching valve is denoted by an encircled "1", the second port of the four-way switching valve is denoted by an encircled "2", the third port of the four-way switching valve is denoted by an encircled "3", and the fourth port of the four-way switching valve is denoted by an encircled "4".

Each four-way switching valve (F1, F2) is switched between a first state (a state shown by a solid line in FIG. 1) and a second state (a state shown by a broken line in FIG. 1). Each four-way switching valve (F1, F2) in the first state allows the first port and the second port to communicate with each other, and, at the same time, allows the third port and the fourth port to communicate with each other. Each four-way switching valve (F1, F2) in the second state allows the first port and the third port to communicate with each other, and, at the same time, allows the second port and the fourth port to communicate with each other.

The first port of the first four-way switching valve (F1) communicates with the high-temperature inflow pipe (54). The second port of the first four-way switching valve (F1) communicates with the indoor heat exchanger (11). The third port of the first four-way switching valve (F1) communicates with the outdoor heat exchanger (12). The fourth port of the first four-way switching valve (F1) communicates with the low-temperature inflow pipe (52).

The first port of the second four-way switching valve (F2) communicates with the high-temperature outflow pipe (53). The second port of the second four-way switching valve (F2) communicates with the indoor heat exchanger (11). The third port of the second four-way switching valve (F2) communicates with the outdoor heat exchanger (12). The fourth port of the second four-way switching valve (F2) communicates with the low-temperature outflow pipe (51).

Control Device

The control device (100) controls the magnetic refrigeration device (1). The control device (100) is constituted by a microcomputer and a memory device (to be specific, a semiconductor memory) that stores software for operating the microcomputer.

Figure 4:
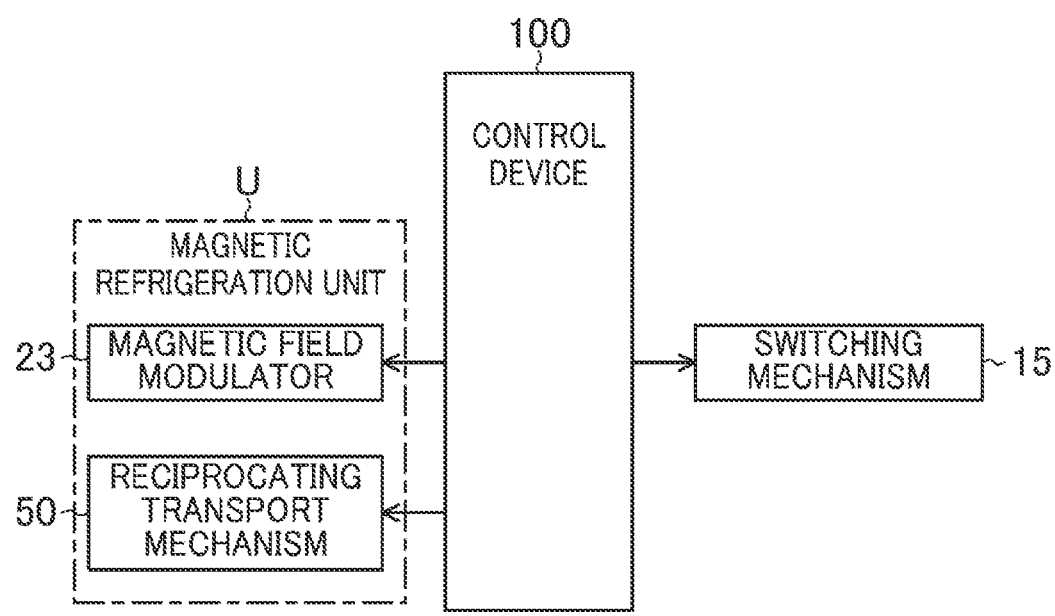
FIG. 4 is a block diagram illustrating the relationship between a control device and equipment that exchanges a signal with the control device.

As illustrated in FIG. 4, the control device (100) is connected to the magnetic refrigeration unit (U) and the switching mechanism (15) via a communication circuit. The control device (100) controls each of the magnetic field modulator (23), the reciprocating transport mechanism (30, 50), and the switching mechanism (15).

In the magnetic refrigeration device (1), the switching mechanism (15) and the control device (100) constitute an operation switching mechanism (15) that switches at least between the air-heating operation and the defrosting operation.

Operational Actions of Magnetic Refrigeration Device

The magnetic refrigeration device (1) performs an air-cooling operation, an air-heating operation, and a defrosting operation. With the air-cooling operation, air in an indoor space is cooled. The air-cooling operation corresponds to a cooling operation. With the air-heating operation, air in the indoor space is heated. The air-heating operation corresponds to a heating operation. With the defrosting operation, frost on the outdoor heat exchanger (12) is melted. Each operation will be described in detail.

Air-Cooling Operation

In the magnetic refrigeration unit (U), a first action and a second action are alternately and repeatedly performed. The period of switching between the first action and the second action is about one second.

Figure 5A:
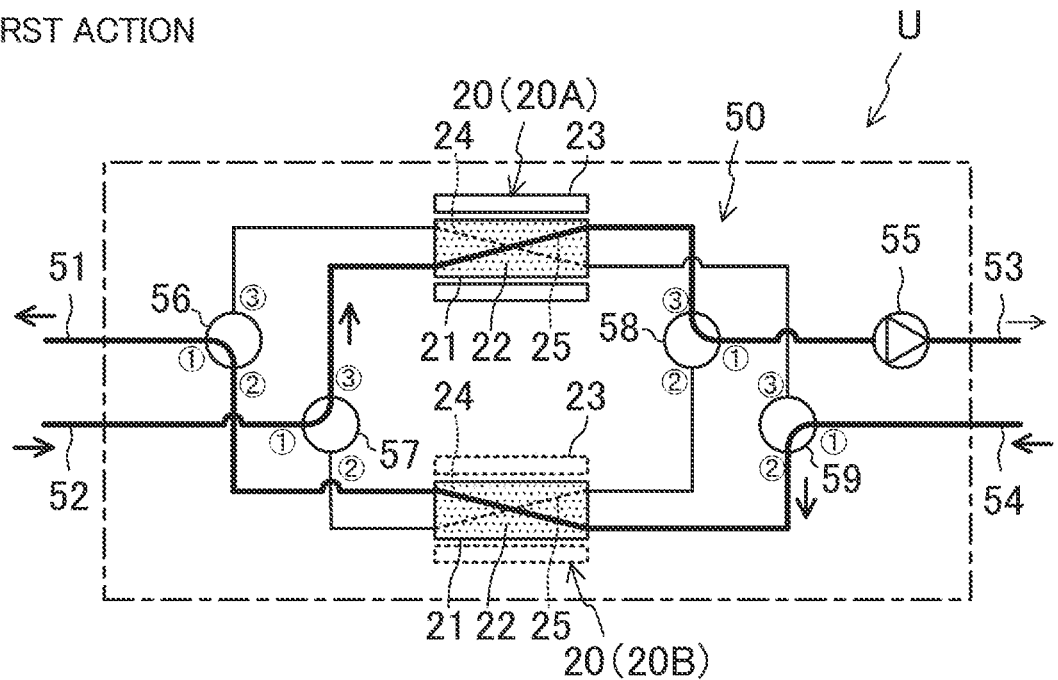
FIG. 5A and FIG. 5B show schematic diagrams of the magnetic refrigeration unit according to the first embodiment.

In the first action illustrated in FIG. 5A, the first magnetic refrigerator (20A) performs the first modulation action, and the second magnetic refrigerator (20B) performs the second modulation action. The low-temperature first three-way valve (56) is set to the first state, the low-temperature second three-way valve (57) is set to the second state, the high-temperature first three-way valve (58) is set to the second state, and the high-temperature second three-way valve (59) is set to the first state. The unit-side pump (55) operates.

Figure 5B:
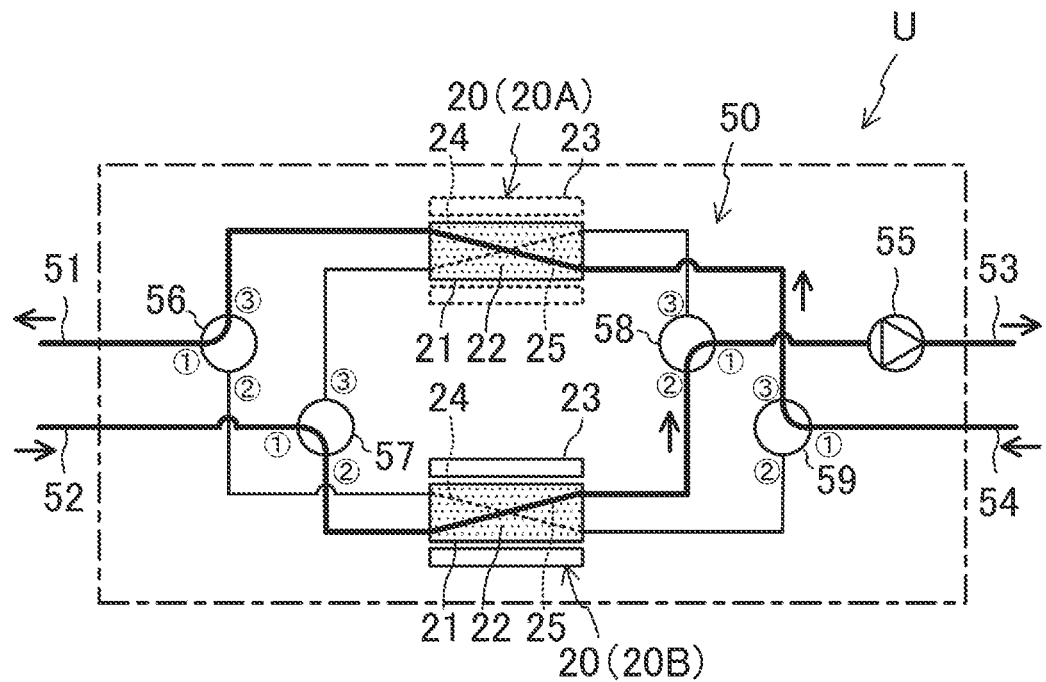

In second action illustrated in FIG. 5B, the first magnetic refrigerator (20A) performs the second modulation action, and the second magnetic refrigerator (20B) performs the first modulation action. The low-temperature first three-way valve (56) is set to the second state, the low-temperature second three-way valve (57) is set to the first state, the high-temperature first three-way valve (58) is set to the first state, and the high-temperature second three-way valve (59) is set to the second state. The unit-side pump (55) operates.

Figure 6:
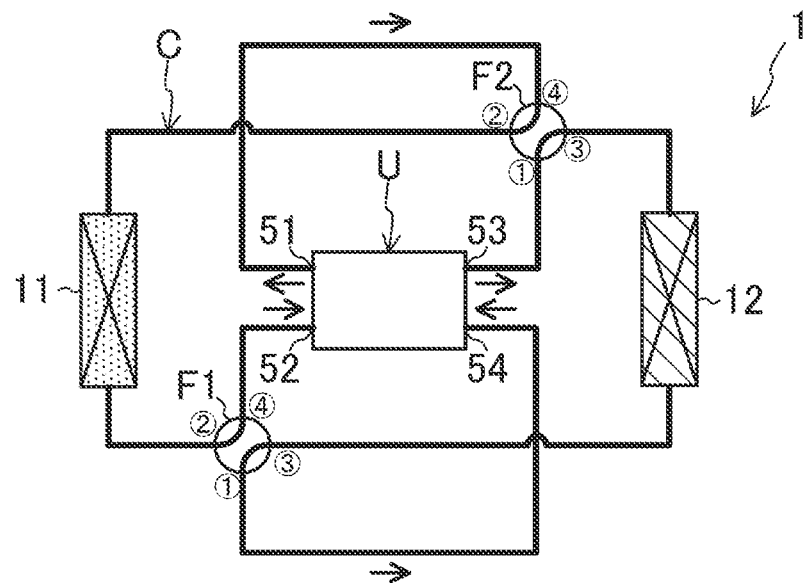
FIG. 6 is a piping diagram for illustrating an air-cooling operation of the magnetic refrigeration device according to the first embodiment.

In the air-cooling operation illustrated in FIG. 6, the first four-way switching valve (F1) is set to the second state, and the second four-way switching valve (F2) is set to the second state. For convenience, in the drawings, the flow of a heat medium in the first action and the flow of the heat medium in the second action are illustrated in the same figure. In the drawings, one of the first heat exchanger (11) and the second heat exchanger (12) in which the heat medium releases heat is hatched, and the other heat exchanger in which the heat medium absorbs heat is dotted.

In the air-cooling operation, the switching mechanism (15) forms a flow path such that a heat medium cooled by each magnetic refrigerator (20) flows in the low-temperature outflow pipe (51), the indoor heat exchanger (11), and the low-temperature inflow pipe (52), and a heat medium heated by each magnetic refrigerator (20) flows in the high-temperature outflow pipe (53), the outdoor heat exchanger (12), and the high-temperature inflow pipe (54).

The heat medium heated by the magnetic refrigeration unit (U) passes through the second four-way switching valve (F2), and flows in the outdoor heat exchanger (12). In the outdoor heat exchanger (12), the heat medium releases heat to outdoor air. The heat medium that has released heat in the outdoor heat exchanger (12) passes through the first four-way switching valve (F1), and returns to the magnetic refrigeration unit (U).

The heat medium cooled by the magnetic refrigeration unit (U) passes through the second four-way switching valve (F2), and flows in the indoor heat exchanger (11). In the indoor heat exchanger (11), the heat medium absorbs heat from indoor air. As a result, the indoor air is cooled. The heat medium that has absorbed heat in the indoor heat exchanger (11) passes through the first four-way switching valve (F1), and returns to the magnetic refrigeration unit (U).

Air-Heating Operation

In the magnetic refrigeration unit (U), the first action illustrated in FIG. 5A and the second action illustrated in FIG. 5B are alternately and repeatedly performed.

Figure 7:
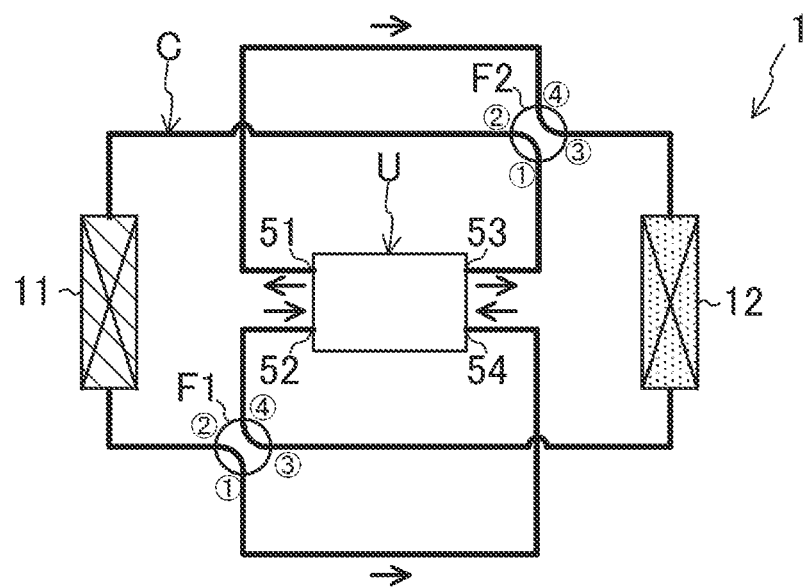
FIG. 7 is a piping diagram for illustrating an air-heating operation of the magnetic refrigeration device according to the first embodiment.

In the air-heating operation illustrated in FIG. 7, the first four-way switching valve (F1) is set to the first state, and the second four-way switching valve (F2) is set to the first state.

In the air-heating operation, the switching mechanism (15) forms a flow path such that a heat medium heated by each magnetic refrigerator (20) flows in the high-temperature outflow pipe (53), the indoor heat exchanger (11), and the high-temperature inflow pipe (54), and a heat medium cooled by each magnetic refrigerator (20) flows in the low-temperature outflow pipe (51), the outdoor heat exchanger (12), and the low-temperature inflow pipe (52).

The heat medium cooled by the magnetic refrigeration unit (U) passes through the second four-way switching valve (F2), and flows in the outdoor heat exchanger (12). In the outdoor heat exchanger (12), the heat medium absorbs heat from outdoor air. The heat medium that has absorbed heat in the outdoor heat exchanger (12) passes through the first four-way switching valve (F1), and returns to the magnetic refrigeration unit (U).

The heat medium heated by the magnetic refrigeration unit (U) passes through the second four-way switching valve (F2), and flows in the indoor heat exchanger (11). In the indoor heat exchanger (11), the heat medium releases heat to indoor air. As a result, the indoor air is heated. The heat medium that has released heat in the indoor heat exchanger (11) passes through the first four-way switching valve (F1), and returns to the magnetic refrigeration unit (U).

Defrosting Operation

In the defrosting operation, an action that is substantially similar to that of the air-cooling operation is performed. The defrosting operation is performed if a condition that the surface of the outdoor heat exchanger (12) becomes frosted is satisfied during, for example, an air-heating operation in winter.

Figure 8:
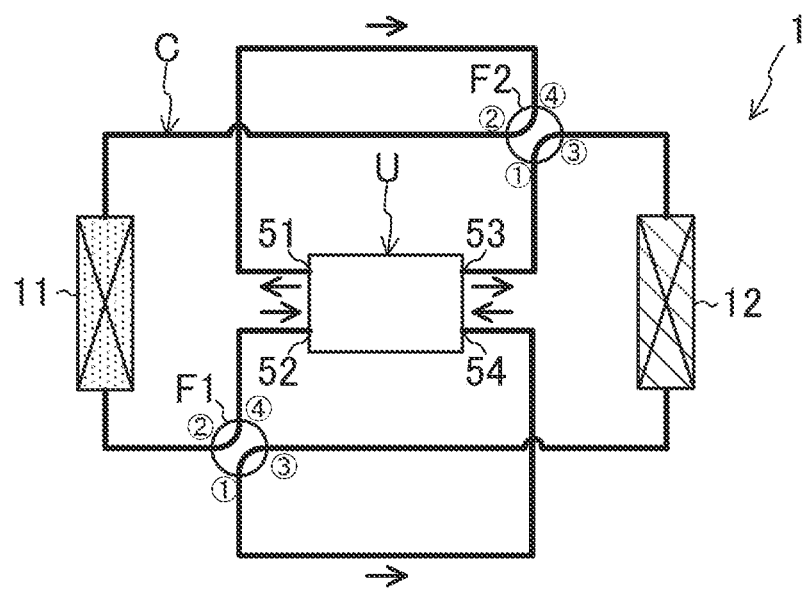
FIG. 8 is a piping diagram for illustrating a defrosting operation of the magnetic refrigeration device according to the first embodiment.

In the defrosting operation illustrated in FIG. 8, the first four-way switching valve (F1) is set to the second state, and the second four-way switching valve (F2) is set to the second state. In the defrosting operation, the first action and the second action are alternately and repeatedly performed. The period of switching between the first action and the second action is about one second.

In the defrosting operation, the switching mechanism (15) forms a flow path such that a heat medium cooled by each magnetic refrigerator (20) flows in the low-temperature outflow pipe (51), the indoor heat exchanger (11), and the low-temperature inflow pipe (52), and a heat medium heated by each magnetic refrigerator (20) flows in the high-temperature outflow pipe (53), the outdoor heat exchanger (12), and the high-temperature inflow pipe (54).

The heat medium heated by the magnetic refrigeration unit (U) passes through the second four-way switching valve (F2), and flows in the outdoor heat exchanger (12). At the outdoor heat exchanger (12), frost on the surface of the outdoor heat exchanger (12) is melted by the heat medium flowing therein. The heat medium that has been used to defrost the outdoor heat exchanger (12) passes through the first four-way switching valve (F1), and returns to the magnetic refrigeration unit (U).

The heat medium cooled by the magnetic refrigeration unit (U) passes through the second four-way switching valve (F2), and flows in the indoor heat exchanger (11). In the indoor heat exchanger (11), the heat medium absorbs heat from indoor air. The heat medium that has absorbed heat in the indoor heat exchanger (11) passes through the first four-way switching valve (F1), and returns to the magnetic refrigeration unit (U).

Regarding Temperature Gradient of Magnetic Refrigerator

After switching from the air-heating operation to the defrosting operation, the temperature gradient from the low-temperature end to the high-temperature end of the magnetic refrigerator (20) may decrease. To be specific, in the heating operation described above, a comparatively high-temperature heat medium flows in the indoor heat exchanger (11), and a comparatively low-temperature heat medium flows in the outdoor heat exchanger (12). When switched from the air-heating operation to the defrosting operation, the high-temperature heat medium on the indoor heat exchanger (11) side is moved to the low-temperature end side of the magnetic refrigerator (20) via the low-temperature inflow pipe (52). At the same time, the low-temperature heat medium on the outdoor heat exchanger (12) side is moved to the high-temperature end side of the magnetic refrigerator (20) via the high-temperature inflow pipe (54). As a result, as illustrated in FIG. 9, the temperature gradient from the low-temperature end to the high-temperature end of the magnetic refrigerator (20) may decrease from L1 to L2.

Also after switching from the defrosting operation to the air-heating operation, the temperature gradient from the low-temperature end to the high-temperature end of the magnetic refrigerator (20) may decrease. To be specific, in the defrosting operation described above, a comparatively high-temperature heat medium flows in the outdoor heat exchanger (12), and a comparatively low-temperature heat medium flows in the indoor heat exchanger (11). When switched from the defrosting operation to the air-heating operation, the high-temperature heat medium on the outdoor heat exchanger (12) side is moved to the low-temperature end side of the magnetic refrigerator (20) via the low-temperature inflow pipe (52). At the same time, the low-temperature heat medium on the indoor heat exchanger (11) side is moved to the high-temperature end side of the magnetic refrigerator (20) via the high-temperature inflow pipe (54). As a result, as illustrated in FIG. 9, the temperature gradient from the low-temperature end to the high-temperature end of the magnetic refrigerator (20) may decrease from L1 to L2.

Here, the temperature gradient denoted by L1 is a temperature gradient during a normal operation of the magnetic refrigeration unit (U). The temperature gradient L1 shows a trend such that the temperature increases from the low-temperature end toward the high-temperature end of the magnetic refrigerator (20). The temperature gradient L1 is a gradient along the Curie temperatures of the magnetic working substances (22a, 22b, 22c, 22d, 22e) of a plurality of types. In other words, when the actual temperature in the magnetic refrigerator (20) corresponds to the temperature gradient L1, the magnetic refrigeration effect of the magnetic refrigerator (20) can be sufficiently produced.

Figure 9:
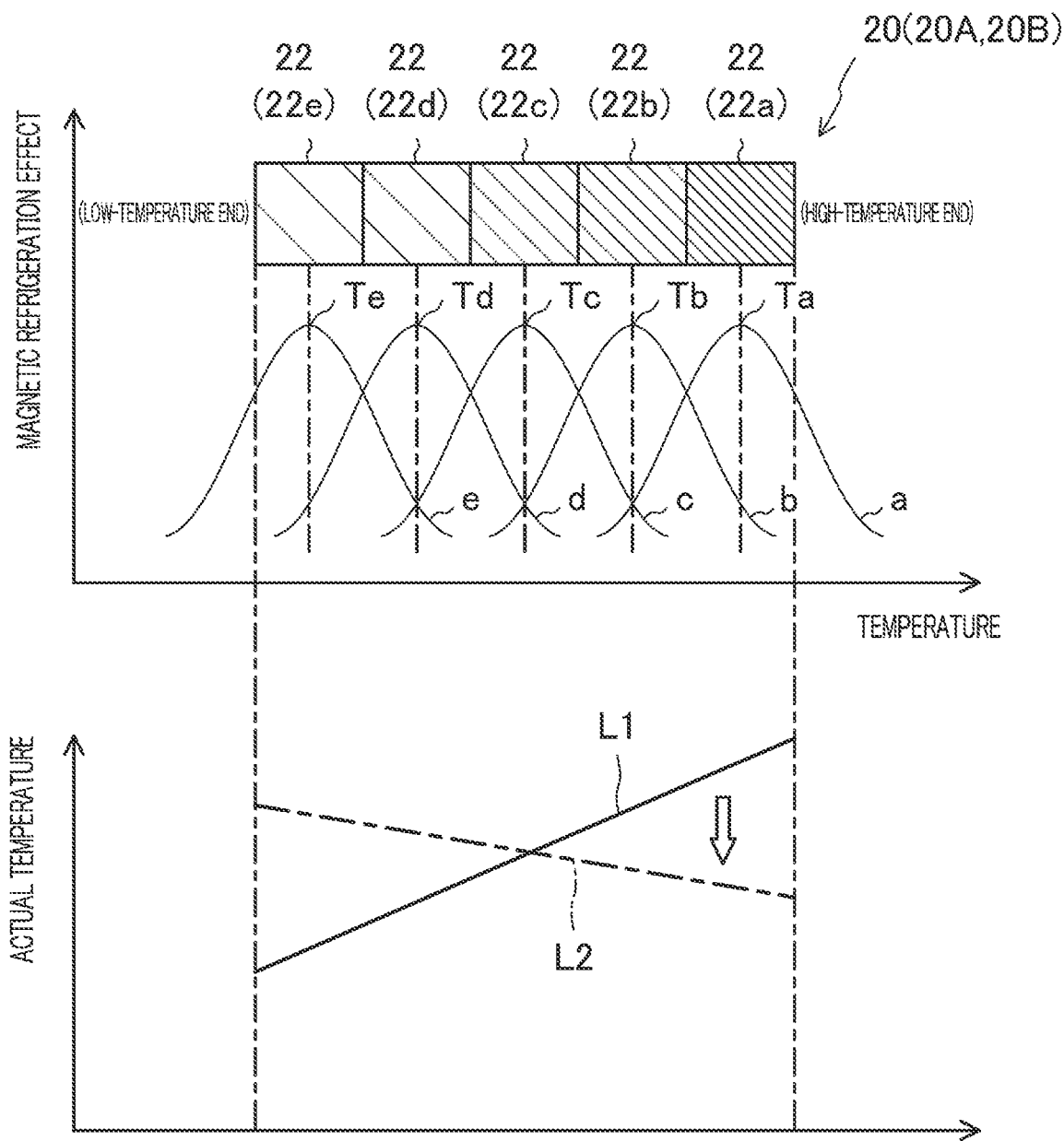
FIG. 9 is a graph representing the relationship between the temperature of the cascade magnetic refrigerator according to the first embodiment and the magnetic refrigeration effect, and an example of the temperature gradient of the magnetic refrigerator.

In the present embodiment, even if the temperature gradient of the magnetic refrigerator (20) decreases from L1 to, for example, L2, as illustrated in FIG. 9, the temperature of a middle portion between the low-temperature end and the high-temperature end of the magnetic refrigerator (20) does not change considerably. To be specific, the temperature of the third magnetic working substance (22c), which is one of the magnetic working substances (22) of a plurality of types corresponding to the middle portion, does not change considerably. Therefore, at least the third magnetic working substance (22c) can produce a desirable magnetic refrigeration effect, and the decreased temperature gradient gradually becomes closer to L1. As a result, in the defrosting operation, the outdoor heat exchanger (12) can be sufficiently defrosted. In the air-heating operation, the air-heating ability of the indoor heat exchanger (11) can be sufficiently utilized.

Advantageous Effects of First Embodiment

A feature of the present embodiment is that a magnetic refrigeration device (1) includes: at least one magnetic refrigerator (20) including a magnetic working substance (22), an internal flow path (24, 25) in which the magnetic working substance (22) is disposed, and a magnetic field modulator (23) that is configured to apply a magnetic field fluctuation to the magnetic working substance (22); at least one first heat exchanger (11, 16); at least one second heat exchanger (12); at least one heat medium circuit (C) to which the first heat exchanger (11, 16), the second heat exchanger (12), and the internal flow path (24, 25) are connected; a reciprocating transport mechanism (30, 50) that is configured to transport a heat medium of the heat medium circuit (C) in a reciprocating manner; and an operation switching mechanism (15, 100) that is configured to switch between a heating operation in which the heat medium heated by the magnetic refrigerator (20) is caused to release heat in the first heat exchanger (11, 16) and the heat medium cooled by the magnetic refrigerator (20) is caused to absorb heat in the second heat exchanger (12), and a defrosting operation in which the heat medium cooled by the magnetic refrigerator (20) is caused to absorb heat in the first heat exchanger (11, 16) and the heat medium heated by the magnetic refrigerator (20) is caused to release heat in the second heat exchanger (12).

With this feature, in the defrosting operation, the outdoor heat exchanger (12) can be defrosted by using heat of the heat medium heated by the magnetic refrigerator (20). In addition, the outdoor heat exchanger (12) can be defrosted by using heat absorbed into the heat medium in the indoor heat exchanger (11). Accordingly, heat for defrosting the outdoor heat exchanger (12) can be sufficiently obtained.

A feature of the present embodiment is that: the magnetic refrigerator (20) is a cascade magnetic refrigerator including magnetic working substances (22) of a plurality of types; the heat medium circuit (C) includes a high-temperature outflow portion (53), a high-temperature inflow portion (54), a low-temperature outflow portion (51), and a low-temperature inflow portion (52) each of which communicates with the internal flow path (24, 25) of the magnetic refrigerator (20); in the heating operation, a heat medium heated by the magnetic refrigerator (20) flows in the high-temperature outflow portion (53), the first heat exchanger (11, 16), and the high-temperature inflow portion (54), and a heat medium cooled by the magnetic refrigerator (20) flows in the low-temperature outflow portion (51), the second heat exchanger (12), and the low-temperature inflow portion (52); and, in the defrosting operation, a heat medium cooled by the magnetic refrigerator (20) flows in the low-temperature outflow portion (51), the first heat exchanger (11, 16), and the low-temperature inflow portion (52), and a heat medium heated by the magnetic refrigerator (20) flows in the high-temperature outflow portion (53), the second heat exchanger (12), and the high-temperature inflow portion (54).

With this feature, the outdoor heat exchanger (12) can be defrosted by using heat of the heat medium heated by the cascade magnetic refrigerator (20). As illustrated in FIG. 9, in the cascade magnetic refrigerator (20), the temperature gradient may decrease when switching between the heating operation (air-heating operation) and the defrosting operation. However, even if the temperature gradient decreases in this way, the temperature of the middle portion between the low-temperature end and the high-temperature end of the magnetic refrigerator (20) does not change considerably. Therefore, it is possible to obtain a desirable magnetic refrigeration effect in the middle portion (for example, the third magnetic working substance (22c)) of the magnetic refrigerator (20). As a result, with the magnetic refrigerator (20), it is possible to gradually recover the temperature gradient from the low-temperature end to the high-temperature end. Accordingly, it is possible to suppress considerable decrease in defrosting ability and air-heating ability.

First Modification of First Embodiment

Figure 10:
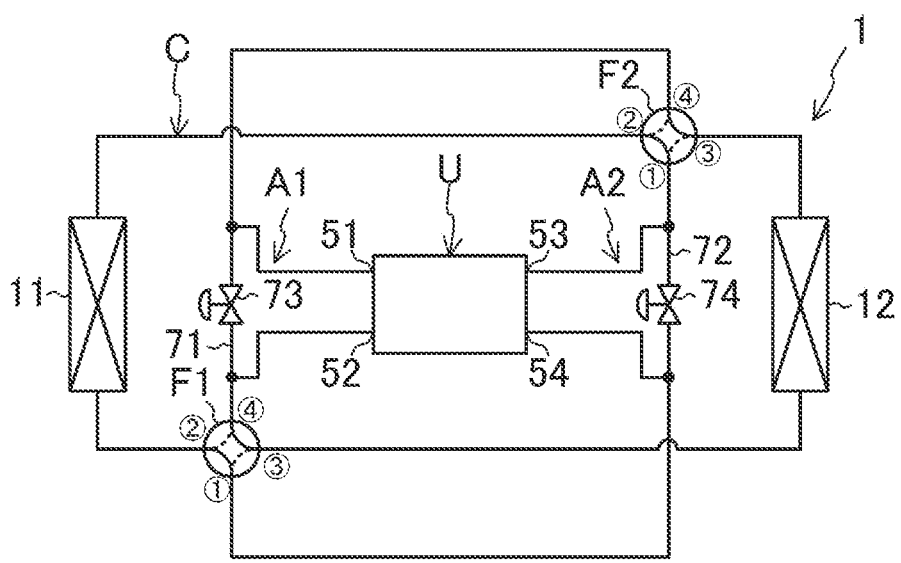
FIG. 10 is a piping diagram of a magnetic refrigeration device according to a first modification of the first embodiment.

In a first modification of the first embodiment illustrated FIG. 10, a suppression mechanism is added to the first embodiment. The suppression mechanism suppresses decrease in the temperature gradient in an interval from the high-temperature end to the low-temperature end of the cascade magnetic refrigerator (20) at the time of starting up the defrosting operation and at the time of starting up the air-heating operation. The suppression mechanism of the first modification includes a first heat-quantity adjuster (A1) and a second heat-quantity adjuster (A2).

The first heat-quantity adjuster (A1) includes a first bypass flow path (71) and a first control valve (73). The first heat-quantity adjuster (A1) reduces the heat quantity of a heat medium that flows into the low-temperature inflow pipe (52). The second heat-quantity adjuster (A2) includes a second bypass flow path (72) and a second control valve (74). The second heat-quantity adjuster (A2) increases the heat quantity of a heat medium that flows into the high-temperature inflow pipe (54).

One end of the first bypass flow path (71) is connected to the low-temperature outflow pipe (51). The other end of the first bypass flow path (71) is connected to the low-temperature inflow pipe (52). The first bypass flow path (71) allows a heat medium that has flowed out from the low-temperature outflow pipe (51) to bypass the indoor heat exchanger (11) and flow into the low-temperature inflow pipe (52).

The first control valve (73) is provided in the first bypass flow path (71). The first control valve (73) adjusts the flow-path resistance of the first bypass flow path (71). To be specific, the first control valve (73) is constituted by an on-off valve. The first control valve (73) may be a flow control valve whose opening degree can be finely adjusted.

One end of the second bypass flow path (72) is connected to the high-temperature outflow pipe (53). The other end of the second bypass flow path (72) is connected to the high-temperature inflow pipe (54). The second bypass flow path (72) allows a heat medium that has flowed out from the high-temperature outflow pipe (53) to bypass the outdoor heat exchanger (12) and flow into the high-temperature inflow pipe (54).

The second control valve (74) is provided in the second bypass flow path (72). The second control valve (74) adjusts the flow-path resistance of the first bypass flow path (71). To be specific, the second control valve (74) is constituted by an on-off valve. The second control valve (74) may be a flow control valve whose opening degree can be finely adjusted.

Operational Actions of Magnetic Refrigeration Device

The basic operation of the magnetic refrigeration device (1) according to the present modification is the same as the operation of the first embodiment described above. On the other hand, the air-heating operation of the present modification includes a normal action and a bypass action. The defrosting operation of the present modification includes a normal action and a bypass action.

Air-Cooling Operation

In the magnetic refrigeration unit (U), the first action and the second action are alternately and repeatedly performed.

Figure 11:
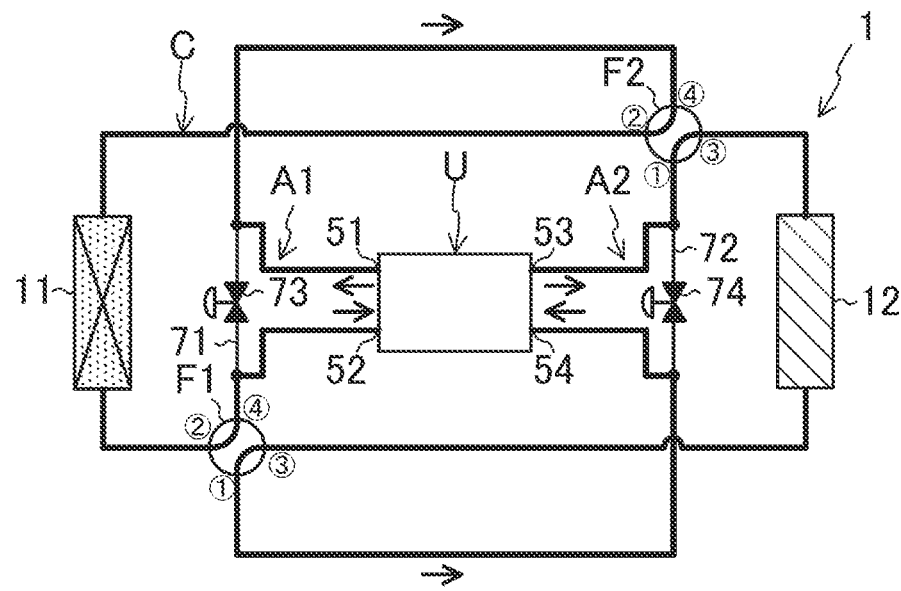
FIG. 11 is a piping diagram for illustrating an air-cooling operation of the magnetic refrigeration device according to the first modification of the first embodiment.

In the air-cooling operation illustrated in FIG. 11, the first four-way switching valve (F1) is set to the second state, and the second four-way switching valve (F2) is set to the second state. The first control valve (73) and the second control valve (74) are closed. In the drawings, the control valves (73, 74) in a closed state are shown in black, and the control valves (73, 74) in an open state are shown in white.

A heat medium heated by the magnetic refrigeration unit (U) passes through the second four-way switching valve (F2), and flows in the outdoor heat exchanger (12). In the outdoor heat exchanger (12), the heat medium releases heat to outdoor air. The heat medium that has released heat in the outdoor heat exchanger (12) passes through the first four-way switching valve (F1), and returns to the magnetic refrigeration unit (U).

A heat medium cooled by the magnetic refrigeration unit (U) passes through the second four-way switching valve (F2), and flows in the indoor heat exchanger (11). In the indoor heat exchanger (11), the heat medium absorbs heat from indoor air. As a result, the indoor air is cooled. The heat medium that has absorbed heat in the indoor heat exchanger (11) passes through the first four-way switching valve (F1), and returns to the magnetic refrigeration unit (U).

Normal Action of Air-Heating Operation

In the magnetic refrigeration unit (U), the first action and the second action are alternately and repeatedly performed.

Figure 12:
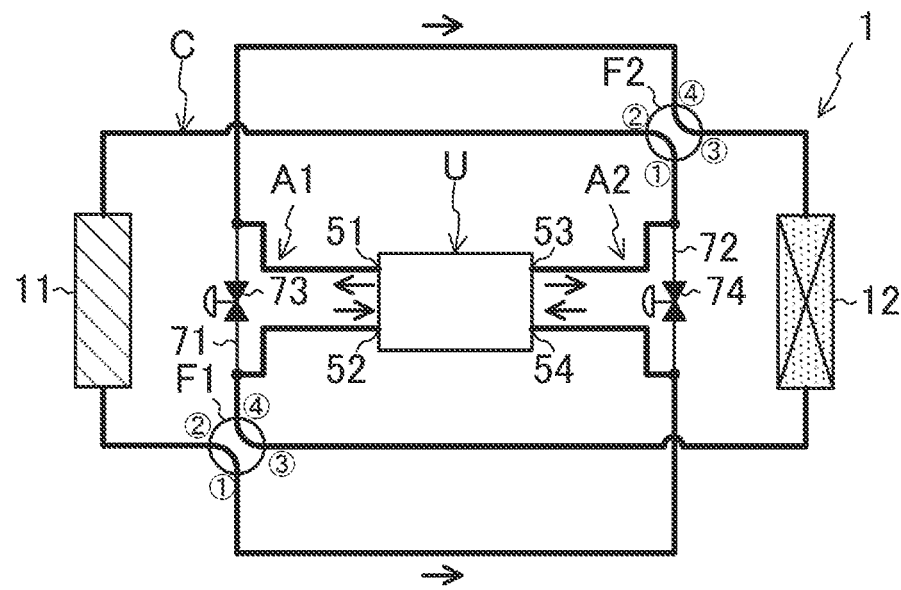
FIG. 12 is a piping diagram for illustrating an air-heating operation (normal action) of the magnetic refrigeration device according to the first modification of the first embodiment.

In the normal action of the air-heating operation illustrated in FIG. 12, the first four-way switching valve (F1) is set to the first state, and the second four-way switching valve (F2) is set to the first state. The first control valve (73) and the second control valve (74) are closed.

A heat medium cooled by the magnetic refrigeration unit (U) passes through the second four-way switching valve (F2), and flows in the outdoor heat exchanger (12). In the outdoor heat exchanger (12), the heat medium absorbs heat from outdoor air. The heat medium that has absorbed heat in the outdoor heat exchanger (12) passes through the first four-way switching valve (F1), and returns to the magnetic refrigeration unit (U).

A heat medium heated by the magnetic refrigeration unit (U) passes through the second four-way switching valve (F2), and flows in the indoor heat exchanger (11). In the indoor heat exchanger (11), the heat medium releases heat to indoor air. As a result, the indoor air is heated. The heat medium that has released heat in the indoor heat exchanger (11) passes through the first four-way switching valve (F1), and returns to the magnetic refrigeration unit (U).

Normal Action of Defrosting Operation

In the normal action of the defrosting operation, an action that is substantially similar to that of the air-cooling operation is performed. In the magnetic refrigeration unit (U), the first action and the second action are alternately and repeatedly performed.

Figure 13:
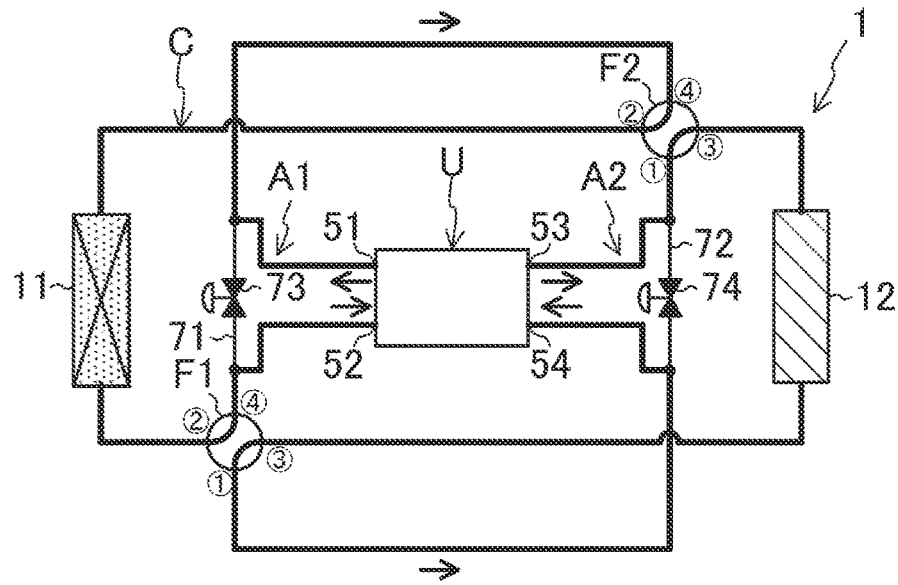
FIG. 13 is a piping diagram for illustrating a defrosting operation (normal action) of the magnetic refrigeration device according to the first modification of the first embodiment.

In the normal action of the defrosting operation illustrated in FIG. 13, the first four-way switching valve (F1) is set to the second state, and the second four-way switching valve (F2) is set to the second state. The first control valve (73) and the second control valve (74) are closed.

A heat medium heated by the magnetic refrigeration unit (U) passes through the second four-way switching valve (F2), and flows in the outdoor heat exchanger (12). At the outdoor heat exchanger (12), frost on the surface of the outdoor heat exchanger (12) is melted by the heat medium flowing therein. The heat medium that has been used to defrost the outdoor heat exchanger (12) passes through the first four-way switching valve (F1), and returns to the magnetic refrigeration unit (U).

A heat medium cooled by the magnetic refrigeration unit (U) passes through the second four-way switching valve (F2), and flows in the indoor heat exchanger (11). In the indoor heat exchanger (11), the heat medium absorbs heat from indoor air. The heat medium that has absorbed heat in the indoor heat exchanger (11) passes through the first four-way switching valve (F1), and returns to the magnetic refrigeration unit (U).

Regarding Temperature Gradient of Magnetic Refrigerator

As described above, after switching from the air-heating operation to the defrosting operation or after switching from the defrosting operation to the air-heating operation, the temperature gradient of the magnetic refrigerator (20) may decrease. As described above, even if the temperature gradient decreases from L1 to L2 (see FIG. 9), it is possible to obtain the magnetic refrigeration effect due to the magnetic working substance (22) in the middle portion of the magnetic refrigerator (20). However, in this case, it takes time for the temperature gradient of the magnetic refrigerator (20) to return to the original state, and the start-up time of the defrosting operation may increase. As a result, a problem may arise in that the operation time of the defrosting operation also increases. Likewise, the start-up time of the air-heating operation increases, and a problem may arise in that the comfort of an indoor space is impaired. Thus, with the present modification, in a defrosting operation after switching from an air-heating operation to the defrosting operation, the bypass action is performed and subsequently the normal action is performed. Likewise, with the present modification, in an air-heating operation after switching from a defrosting operation to the air-heating operation, the bypass action is performed and subsequently the normal action is performed.

Bypass Action of Defrosting Operation

When a command to perform the defrosting operation is input to the control device (100) during the air-heating operation, first, the control device (100) causes the bypass action of the defrosting operation to be performed.

Figure 14:
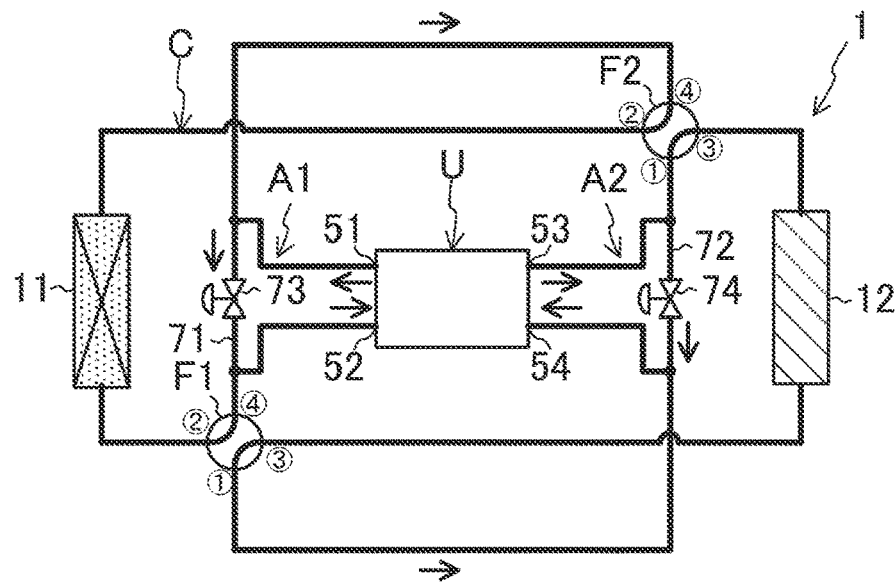
FIG. 14 is a piping diagram for illustrating a defrosting operation (bypass action) of the magnetic refrigeration device according to the first modification of the first embodiment.

In the bypass action of the defrosting operation illustrated in FIG. 14, the first four-way switching valve (F1) is set to the second state, and the second four-way switching valve (F2) is set to the second state. The first control valve (73) and the second control valve (74) are opened.

A part of the heat medium cooled by the magnetic refrigeration unit (U) flows in the first bypass flow path (71). In other words, a part of the heat medium cooled by the magnetic refrigeration unit (U) bypasses the indoor heat exchanger (11), and flows into the low-temperature inflow pipe (52). The remaining part of the heat medium cooled by the magnetic refrigeration unit (U) flows in the indoor heat exchanger (11), and flows into the low-temperature inflow pipe (52). Therefore, with the bypass action of the defrosting operation, the heat quantity of the heat medium that flows into the low-temperature inflow pipe (52) can be reduced. In this way, increase in the temperature of the magnetic working substance (22) on the low-temperature end side of the magnetic refrigerator (20) can be suppressed.

A part of the heat medium heated by the magnetic refrigeration unit (U) flows in the second bypass flow path (72). In other words, a part of the heat medium heated by the magnetic refrigeration unit (U) bypasses the outdoor heat exchanger (12), and flows into the high-temperature inflow pipe (54). The remaining part of the heat medium heated by the magnetic refrigeration unit (U) flows in the outdoor heat exchanger (12), and flows into the high-temperature inflow pipe (54). Therefore, with the bypass action of the defrosting operation, the heat quantity of the heat medium that flows into the high-temperature inflow pipe (54) can be increased. In this way, decrease in the temperature of the magnetic working substance (22) on the high-temperature end side of the magnetic refrigerator (20) can be suppressed.

In the way described above, with the bypass action of the defrosting operation, decrease in the temperature gradient of the magnetic refrigerator (20) can be suppressed. In addition, the outdoor heat exchanger (12) can be defrosted by causing the remaining part of the heat medium to flow in the outdoor heat exchanger (12). As a result, the magnetic refrigeration effect of the magnetic refrigerator (20) can be rapidly produced, the start-up time of the defrosting operation can be reduced, and thus the operation time of the defrosting operation can be reduced.

If a predetermined condition is satisfied in the bypass action of the defrosting operation, the operation is switched to the aforementioned normal action of the defrosting operation. This condition is a condition such that the temperature gradient of the magnetic refrigerator (20) has reached a steady state. To be specific, this condition is that, for example, the temperature of the heat medium that flows into the low-temperature inflow pipe (52) is lower than a predetermined temperature, or that the temperature of the heat medium that flows into the high-temperature inflow pipe (54) is higher than a predetermined temperature.

Bypass Action of Air-Heating Operation

When a command to perform the air-heating operation is input to the control device (100) during the defrosting operation, first, the control device (100) causes the bypass action of the air-heating operation to be performed.

Figure 15:
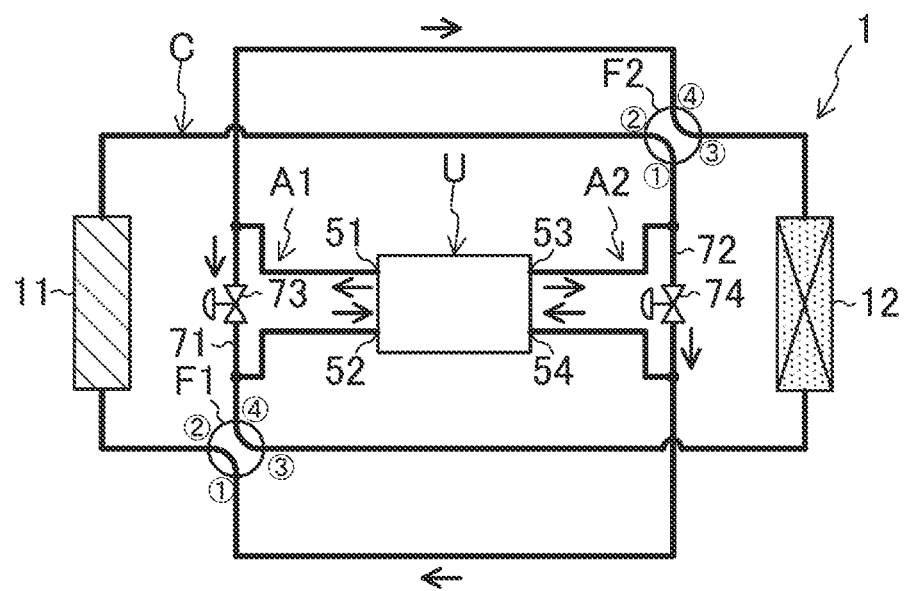
FIG. 15 is a piping diagram for illustrating an air-heating operation (bypass action) of the magnetic refrigeration device according to the first modification of the first embodiment.

In the bypass action of the air-heating operation illustrated in FIG. 15, the first four-way switching valve (F1) is set to the first state, and the second four-way switching valve (F2) is set to the first state. The first control valve (73) and the second control valve (74) are opened.

A part of the heat medium cooled by the magnetic refrigeration unit (U) flows in the first bypass flow path (71). In other words, a part of the heat medium cooled by the magnetic refrigeration unit (U) bypasses the outdoor heat exchanger (12), and flows into the low-temperature inflow pipe (52). The remaining part of the heat medium cooled by the magnetic refrigeration unit (U) flows in the outdoor heat exchanger (12), and flows into the low-temperature inflow pipe (52). Therefore, with the bypass action of the air-heating operation, the heat quantity of the heat medium that flows into the low-temperature inflow pipe (52) can be reduced. In this way, increase in the temperature of the magnetic working substance (22) on the low-temperature end side of the magnetic refrigerator (20) can be suppressed.

A part of the heat medium heated by the magnetic refrigeration unit (U) flows in the second bypass flow path (72). In other words, a part of the heat medium heated by the magnetic refrigeration unit (U) bypasses the indoor heat exchanger (11), and flows into the high-temperature inflow pipe (54). The remaining part of the heat medium heated by the magnetic refrigeration unit (U) flows in the indoor heat exchanger (11), and flows into the high-temperature inflow pipe (54). Therefore, with the bypass action of the air-heating operation, the heat quantity of the heat medium that flows into the high-temperature inflow pipe (54) can be increased. In this way, decrease in the temperature of the magnetic working substance (22) on the high-temperature end side of the magnetic refrigerator (20) can be suppressed.

In the way described above, with the bypass action of the air-heating operation, decrease in the temperature gradient of the magnetic refrigerator (20) can be suppressed. In addition, an indoor space can be heated by the indoor heat exchanger (11) by causing the remaining part of the heat medium to flow in the indoor heat exchanger (11). As a result, the magnetic refrigeration effect of the magnetic refrigerator (20) can be rapidly produced, and the start-up time of the air-heating operation can be reduced.

If a predetermined condition is satisfied in the bypass action of the air-heating operation, the operation is switched to the aforementioned normal action of the air-heating operation. This condition is a condition such that the temperature gradient of the magnetic refrigerator (20) has reached a steady state. To be specific, this condition is that, for example, the temperature of the heat medium that flows into the low-temperature inflow pipe (52) is lower than a predetermined temperature, or that the temperature of the heat medium that flows into the high-temperature inflow pipe (54) is higher than a predetermined temperature.

Advantageous Effects of First Modification of First Embodiment

A feature of the present modification is that the magnetic refrigeration device (1) includes a suppression mechanism that is configured to suppress decrease in a temperature gradient in an interval from a high-temperature end to a low-temperature end of the magnetic refrigerator (20) at least one of after switching from the heating operation to the defrosting operation and after switching from the defrosting operation to the heating operation.

With this feature, after switching from the heating operation (air-heating operation) to the defrosting operation, decrease in the temperature gradient of the magnetic refrigerator (20) can be suppressed. As a result, the start-up time of the defrosting operation can be reduced, and thus the operation time of the defrosting operation can be reduced. Likewise, after switching from the defrosting operation to the air-heating operation, decrease in the temperature gradient of the magnetic refrigerator (20) can be suppressed. As a result, the start-up time of the air-heating operation can be reduced, and the comfort of an indoor space can be improved.

A feature of the present modification is that: the suppression mechanism includes at least one of a first heat-quantity adjuster (A1) that is configured to reduce a heat quantity of a heat medium that flows into the low-temperature inflow portion (52); and a second heat-quantity adjuster (A2) that is configured to increase a heat quantity of a heat medium that flows into the high-temperature inflow portion (54).

With this feature, by reducing the heat quantity of the heat medium that flows into the low-temperature inflow pipe (52), increase in the temperature of the low-temperature end of the magnetic refrigerator (20) can be suppressed. Thus, decrease in the temperature gradient of the magnetic refrigerator (20) can be suppressed. By increasing the heat quantity of the heat medium that flows into the high-temperature inflow pipe (54), decrease in the temperature of the high-temperature end of the magnetic refrigerator (20) can be suppressed. Thus, decrease in the temperature gradient of the magnetic refrigerator (20) can be suppressed.

A feature of the present modification is that: the first heat-quantity adjuster (A1) includes a first bypass flow path (71) that allows a heat medium that has flowed out from the low-temperature outflow portion (51) to bypass the first heat exchanger (11, 16) or the second heat exchanger (12) and flow into the low-temperature inflow portion (52), and a first control valve (73) that adjusts a flow-path resistance of the first bypass flow path (71); and the second heat-quantity adjuster (A2) includes a second bypass flow path (72) that allows a heat medium that has flowed out from the high-temperature outflow portion (53) to bypass the first heat exchanger (11, 16) or the second heat exchanger (12) and flow into the high-temperature inflow portion (54), and a second control valve (74) that adjusts a flow-path resistance of the second bypass flow path (72).

With this feature, by opening the first control valve (73) in the bypass action of the defrosting operation, it is possible to move the heat medium that has flowed out from the low-temperature outflow pipe (51) to the low-temperature inflow pipe (52) via the first bypass flow path (71). At the same time, by opening the second control valve (74) in the bypass action of the defrosting operation, it is possible to move the heat medium that has flowed out from the high-temperature outflow pipe (53) to the high-temperature inflow pipe (54) via the second bypass flow path (72). Thus, increase in the temperature of the low-temperature end and decrease in the temperature of the high-temperature end of the magnetic refrigerator (20) can be suppressed, and decrease in the temperature gradient of the magnetic refrigerator (20) can be sufficiently suppressed.

In addition, with the bypass action of the defrosting operation, it is possible to move the remaining part of the heat medium that has flowed out from the high-temperature outflow pipe (53) to the outdoor heat exchanger (12). Therefore, the outdoor heat exchanger (12) can be defrosted by using this heat medium.

With this feature, by opening the first control valve (73) in the bypass action of the air-heating operation, it is possible to move the heat medium that has flowed out from the low-temperature outflow pipe (51) to the low-temperature inflow pipe (52) via the first bypass flow path (71). At the same time, by opening the second control valve (74) in the bypass action of the air-heating operation, it is possible to move the heat medium that has flowed out from the high-temperature outflow pipe (53) to the high-temperature inflow pipe (54) via the second bypass flow path (72). Thus, increase in the temperature of the low-temperature end and decrease in the temperature of the high-temperature end of the magnetic refrigerator (20) can be suppressed, and decrease in the temperature gradient of the magnetic refrigerator (20) can be sufficiently suppressed.

In the first modification of the first embodiment, one of the first heat-quantity adjuster (A1) and the second heat-quantity adjuster (A2) may be omitted. The aforementioned bypass action may be performed in only the defrosting operation, among the defrosting operation and the air-heating operation. The aforementioned bypass action may be performed in only the air-heating operation, among the defrosting operation and the air-heating operation.

Second Modification of First Embodiment

A second modification of the first embodiment has a heat medium circuit (C) similar to that of the first embodiment (see FIG. 1). The second modification of the first embodiment has a suppression mechanism different from that of the first embodiment. The suppression mechanism of the second modification includes the reciprocating transport mechanism (50). To be more specific, the suppression mechanism includes the unit-side pump (55). The unit-side pump (55) is configured as a variable-capacity pump whose flow rate is adjustable.

In the second modification, after switching from the air-heating operation to the defrosting operation, an action of reducing the flow rate of a heat medium is performed by the reciprocating transport mechanism (50). After switching from the defrosting operation to the air-heating operation, an action of reducing the flow rate of a heat medium is performed by the reciprocating transport mechanism (50). These actions will be referred to as "flow-rate reducing actions".

Flow-Rate Reducing Action of Defrosting Operation

In the defrosting operation after switching from the air-heating operation to the defrosting operation, the flow-rate reducing action is performed, and then the normal action is performed.

In the flow-rate reducing action of the defrosting operation, the flow rate V1 of a heat medium transported to the unit-side pump (55) is controlled to be low. Here, the flow rate V1 is lower than the flow rate V2 in the normal action of the defrosting operation. Therefore, with the flow-rate reducing action of the defrosting operation, the flow rate of a comparatively high-temperature heat medium that is moved from the indoor heat exchanger (11) to the low-temperature inflow pipe (52) decreases. At the same time, the flow rate of a comparatively low-temperature heat medium that is moved from the outdoor heat exchanger (12) to the high-temperature inflow pipe (54) decreases.

In the way described above, with the flow-rate reducing action of the defrosting operation, decrease in the temperature gradient of the magnetic refrigerator (20) can be suppressed. As a result, the magnetic refrigeration effect of the magnetic refrigerator (20) can be rapidly produced, the start-up time of the defrosting operation can be reduced, and thus the operation time of the defrosting operation can be reduced.

Flow-Rate Reducing Action of Air-Heating Operation

In the air-heating operation after switching from the defrosting operation to the air-heating operation, the flow-rate reducing action is performed, and then the normal action is performed.

In the flow-rate reducing action of the air-heating operation, the flow rate V3 of a heat medium transported to the unit-side pump (55) is controlled to be low. Here, the flow rate V3 is lower than the flow rate V4 in the normal action of the air-heating operation. Therefore, with the flow-rate reducing action of the air-heating operation, the flow rate of a comparatively high-temperature heat medium that is moved from the outdoor heat exchanger (12) to the low-temperature inflow pipe (52) decreases. At the same time, the flow rate of a comparatively low-temperature heat medium that is moved from the indoor heat exchanger (11) to the high-temperature inflow pipe (54) decreases.

In the way described above, with the flow-rate reducing action of the air-heating operation, decrease in the temperature gradient of the magnetic refrigerator (20) can be suppressed. As a result, the magnetic refrigeration effect of the magnetic refrigerator (20) can be rapidly produced, and the start-up time of the air-heating operation can be reduced.

Advantageous Effects of Second Modification of First Embodiment

A feature of the present modification is that: the suppression mechanism includes the reciprocating transport mechanism (50); and the reciprocating transport mechanism (50) is configured to suppress decrease in the temperature gradient of the magnetic refrigerator (20) by reducing a flow rate of the heat medium.

With this feature, by reducing the flow rate in the unit-side pump (55) in the flow-rate reducing action of the defrosting operation, decrease in the temperature gradient of the magnetic refrigerator (20) can be suppressed. By reducing the flow rate of the unit-side pump (55) in the flow-rate reducing action of the air-heating operation, decrease in the temperature gradient of the magnetic refrigerator (20) can be suppressed. The heat medium circuit (C) does not become complex.

In the second modification of the first embodiment, the aforementioned flow-rate reducing action may be performed only in the defrosting operation, among the defrosting operation and the air-heating operation. The aforementioned flow-rate reducing action may be performed only in the air-heating operation, among the defrosting operation and the air-heating operation.

The suppression mechanism may have another configuration, provided that the suppression mechanism can suppress decrease in the temperature gradient of the magnetic refrigerator (20). The suppression mechanism may be a heater that heats a portion near the high-temperature end of the magnetic refrigerator (20). The suppression mechanism may be a cooler that cools a portion near the low-temperature end of the magnetic refrigerator (20).

Third Modification of First Embodiment

Figure 16:
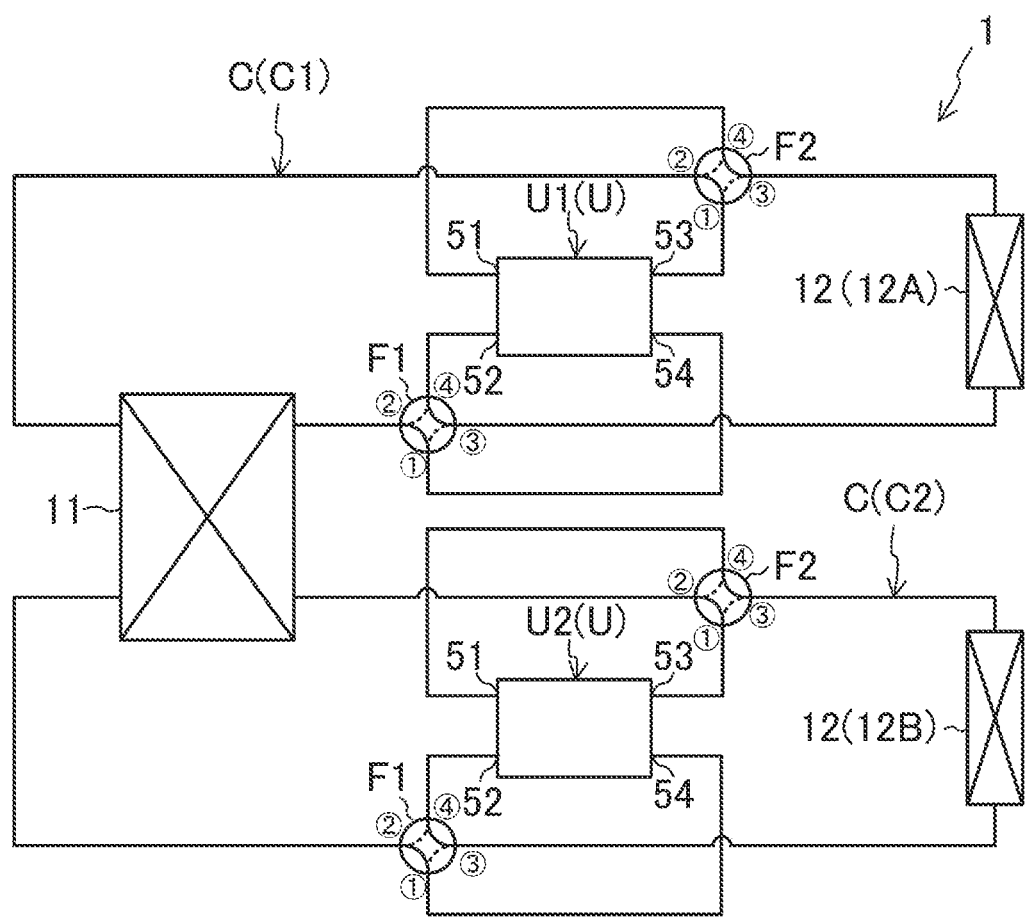
FIG. 16 is a piping diagram of a magnetic refrigeration device according to a third modification of the first embodiment.

A third modification of the first embodiment differs from the first embodiment in the configuration of the heat medium circuit (C). As illustrated in FIG. 16, the present modification includes a plurality of heat medium circuits (C). The plurality of heat medium circuits (C) are constituted by a first heat medium circuit (C1) and a second heat medium circuit (C2).

The basic configuration of each of the first heat medium circuit (C1) and the second heat medium circuit (C2) is the same as the configuration of the heat medium circuit (C) of the first embodiment. The first heat medium circuit (C1) includes a first magnetic refrigeration unit (U1), a first outdoor heat exchanger (12A), a first four-way switching valve (F1), and a second four-way switching valve (F2). The second heat medium circuit (C2) includes a second magnetic refrigeration unit (U2), a second outdoor heat exchanger (12B), a first four-way switching valve (F1), and a second four-way switching valve (F2).

In the present modification, one indoor heat exchanger (11) is shared by the first heat medium circuit (C1) and the second heat medium circuit (C2). In other words, a flow path that communicates with the first heat medium circuit (C1) and a flow path that communicates with the second heat medium circuit (C2) are formed in the indoor heat exchanger (11).

Operational Actions of Magnetic Refrigeration Device

The third modification of the first embodiment performs an air-cooling operation, an air-heating operation, and a defrosting operation. The defrosting operation includes a first defrosting action and a second defrosting action.

Air-Cooling Operation

In each magnetic refrigeration unit (U), the first action and the second action are alternately and repeatedly performed, as in the first embodiment.

Figure 17:
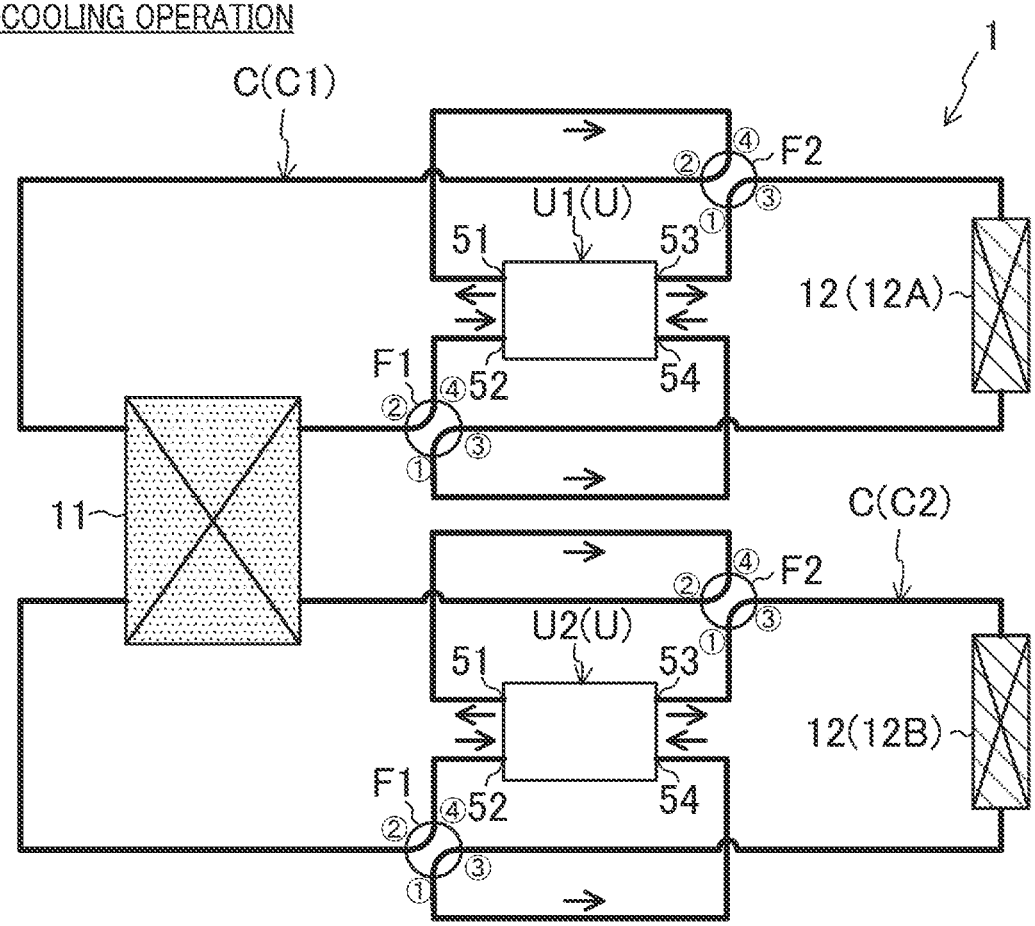
FIG. 17 is a piping diagram for illustrating an air-cooling operation of the magnetic refrigeration device according to the third modification of the first embodiment.

In the air-cooling operation illustrated in FIG. 17, the first four-way switching valve (F1) of the first heat medium circuit (C1) is set to the second state, the second four-way switching valve (F2) of the first heat medium circuit (C1) is set to the second state, the first four-way switching valve (F1) of the second heat medium circuit (C2) is set to the second state, and the second four-way switching valve (F2) of the second heat medium circuit (C2) is set to the second state.

A heat medium cooled by the first magnetic refrigeration unit (U1) passes through the second four-way switching valve (F2), and flows in the indoor heat exchanger (11). In the indoor heat exchanger (11), the heat medium absorbs heat from indoor air. As a result, the indoor air is cooled. The heat medium that has absorbed heat in the indoor heat exchanger (11) passes through the first four-way switching valve (F1), and returns to the first magnetic refrigeration unit (U1).

A heat medium heated by the first magnetic refrigeration unit (U1) passes through the second four-way switching valve (F2), and flows in the first outdoor heat exchanger (12A). In the first outdoor heat exchanger (12A), the heat medium releases heat to outdoor air. The heat medium that has released heat in the first outdoor heat exchanger (12A) passes through the first four-way switching valve (F1), and returns to the first magnetic refrigeration unit (U1).

A heat medium cooled by the second magnetic refrigeration unit (U2) passes through the second four-way switching valve (F2), and flows in the indoor heat exchanger (11). In the indoor heat exchanger (11), the heat medium absorbs heat from indoor air. As a result, the indoor air is cooled. The heat medium that has absorbed heat in the indoor heat exchanger (11) passes through the first four-way switching valve (F1), and returns to the second magnetic refrigeration unit (U2).

A heat medium heated by the second magnetic refrigeration unit (U2) passes through the second four-way switching valve (F2), and flows in the second outdoor heat exchanger (12B). In the second outdoor heat exchanger (12B), the heat medium releases heat to outdoor air. The heat medium that has released heat in the second outdoor heat exchanger (12B) passes through the first four-way switching valve (F1), and returns to the second magnetic refrigeration unit (U2).

Air-Heating Operation

In each magnetic refrigeration unit (U), the first action and the second action are alternately and repeatedly performed, as in the first embodiment.

Figure 18:
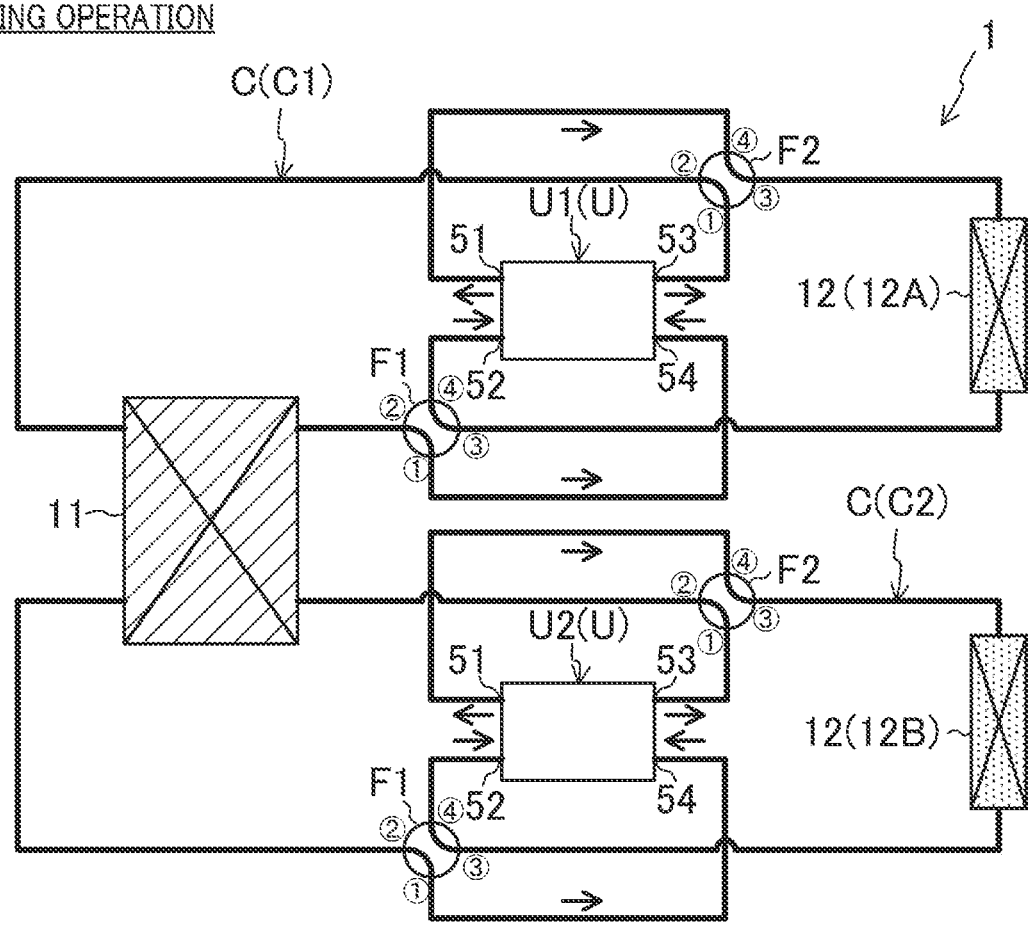
FIG. 18 is a piping diagram for illustrating an air-heating operation of the magnetic refrigeration device according to the third modification of the first embodiment.

In the air-heating operation illustrated in FIG. 18, the first four-way switching valve (F1) of the first heat medium circuit (C1) is set to the first state, the second four-way switching valve (F2) of the first heat medium circuit (C1) is set to the first state, the first four-way switching valve (F1)

of the second heat medium circuit (C2) is set to the first state, and the second four-way switching valve (F2) of the second heat medium circuit (C2) is set to the first state.

A heat medium cooled by the first magnetic refrigeration unit (U1) passes through the second four-way switching valve (F2), and flows in the first outdoor heat exchanger (12A). In the first outdoor heat exchanger (12A), the heat medium absorbs heat from outdoor air. The heat medium that has absorbed heat in the first outdoor heat exchanger (12A) passes through the first four-way switching valve (F1), and returns to the first magnetic refrigeration unit (U1).

A heat medium heated by the first magnetic refrigeration unit (U1) passes through the second four-way switching valve (F2), and flows in the indoor heat exchanger (11). In the indoor heat exchanger (11), the heat medium releases heat to indoor air. As a result, the indoor air is heated. The heat medium that has released heat in the indoor heat exchanger (11) passes through the first four-way switching valve (F1), and returns to the first magnetic refrigeration unit (U1).

A heat medium cooled by the second magnetic refrigeration unit (U2) passes through the second four-way switching valve (F2), and flows in the second outdoor heat exchanger (12B). In the second outdoor heat exchanger (12B), the heat medium absorbs heat from outdoor air. The heat medium that has absorbed heat in the second outdoor heat exchanger (12B) passes through the first four-way switching valve (F1), and returns to the second magnetic refrigeration unit (U2).

A heat medium heated by the second magnetic refrigeration unit (U2) passes through the second four-way switching valve (F2), and flows in the indoor heat exchanger (11). In the indoor heat exchanger (11), the heat medium releases heat to indoor air. As a result, the indoor air is heated. The heat medium that has released heat in the indoor heat exchanger (11) passes through the first four-way switching valve (F1), and returns to the second magnetic refrigeration unit (U2).

Defrosting Operation

The defrosting operation includes a first defrosting action and a second defrosting action. In these defrosting actions, an outdoor heat exchanger (12) that is to be defrosted and an outdoor heat exchanger (12) that causes a heat medium to absorb heat differ from each other. In the defrosting operation of the present modification, the first defrosting action and the second defrosting action are each performed at least once.

To be specific, in the first defrosting action, the first outdoor heat exchanger (12A) is defrosted, and a heat medium absorbs heat in the second outdoor heat exchanger (12B). In the second defrosting action, the second outdoor heat exchanger (12B) is defrosted, and a heat medium absorbs heat in the first outdoor heat exchanger (12A).

In these defrosting actions, a partial heating operation and a partial defrosting operation are simultaneously performed. The partial heating operation is an operation in which a heat medium heated by the magnetic refrigerator (20) of one or some of the magnetic refrigeration units (U) is caused to release heat in the indoor heat exchanger (11) and a heat medium cooled by the magnetic refrigerator (20) of the one or some of the magnetic refrigeration units (U) is caused to absorb heat in one or some of the outdoor heat exchangers (12). The partial defrosting operation is an operation in which a heat medium heated by the magnetic refrigerator (20) of another or others of the magnetic refrigeration units (U) is caused to release heat in another or others of the outdoor heat exchangers (12) to be defrosted. The partial heating operation corresponds to the first operation, and the partial defrosting operation corresponds to the second operation.

First Defrosting Action

In each magnetic refrigeration unit (U), the first action and the second action are alternately and repeatedly performed, as in the first embodiment. In the first defrosting action, the partial defrosting operation is performed in the first heat medium circuit (C1), and the partial heating operation is performed in the second heat medium circuit (C2).

Figure 19:
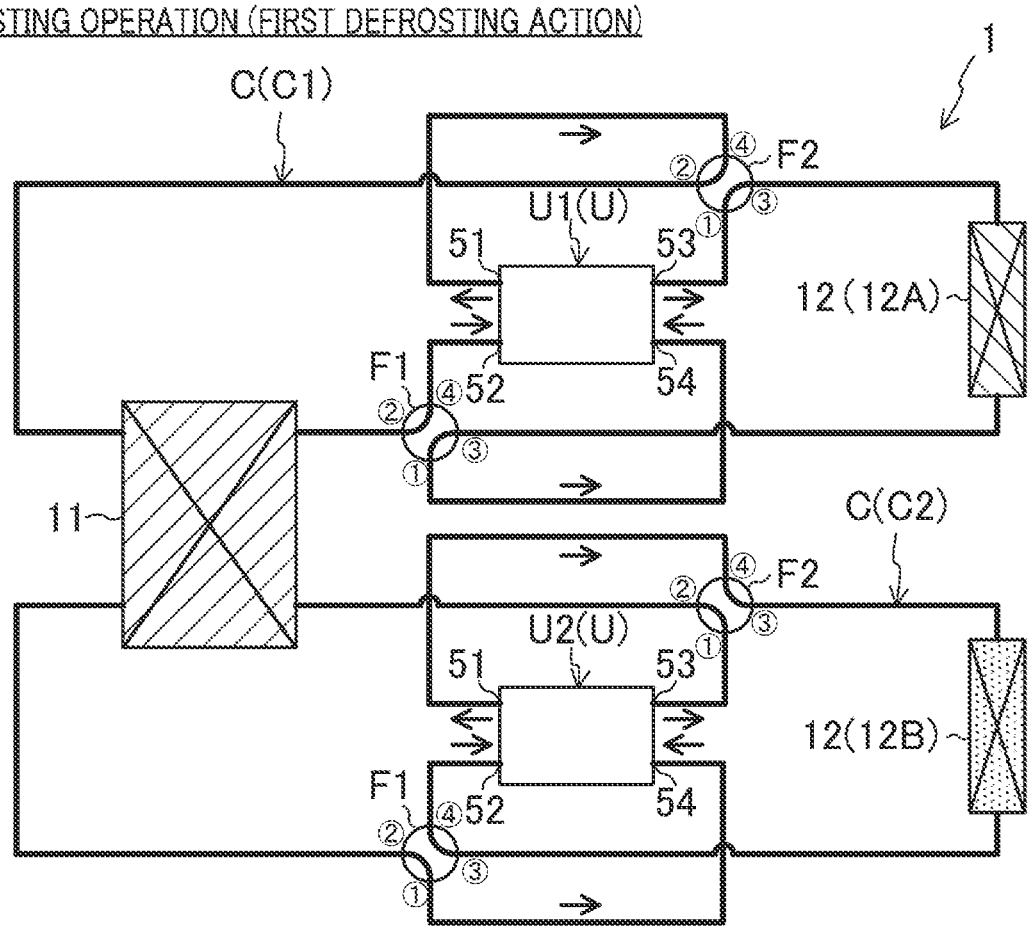
FIG. 19 is a piping diagram for illustrating a defrosting operation (first defrosting action) of the magnetic refrigeration device according to the third modification of the first embodiment.

In the first defrosting action illustrated in FIG. 19, the first four-way switching valve (F1) of the first heat medium circuit (C1) is set to the second state, the second four-way switching valve (F2) of the first heat medium circuit (C1) is set to the second state, the first four-way switching valve (F1) of the second heat medium circuit (C2) is set to the first state, and the second four-way switching valve (F2) of the second heat medium circuit (C2) is set to the first state.

A heat medium cooled by the first magnetic refrigeration unit (U1) passes through the second four-way switching valve (F2), and flows in the indoor heat exchanger (11). In the indoor heat exchanger (11), the heat medium absorbs heat from indoor air. The heat medium that has absorbed heat in the indoor heat exchanger (11) passes through the first four-way switching valve (F1), and returns to the first magnetic refrigeration unit (U1).

A heat medium heated by the first magnetic refrigeration unit (U1) passes through the second four-way switching valve (F2), and flows in the first outdoor heat exchanger (12A). In the first outdoor heat exchanger (12A), the heat medium releases heat to outdoor air, and defrosting of the first outdoor heat exchanger (12A) is performed. The heat medium that has released heat in the first outdoor heat exchanger (12A) passes through the first four-way switching valve (F1), and returns to the first magnetic refrigeration unit (U1).

A heat medium cooled by the second magnetic refrigeration unit (U2) passes through the second four-way switching valve (F2), and flows in the second outdoor heat exchanger (12B). In the second outdoor heat exchanger (12B), the heat medium absorbs heat from outdoor air. The heat medium that has absorbed heat in the second outdoor heat exchanger (12B) passes through the first four-way switching valve (F1), and returns to the second magnetic refrigeration unit (U2).

A heat medium heated by the second magnetic refrigeration unit (U2) passes through the second four-way switching valve (F2), and flows in the indoor heat exchanger (11). In the indoor heat exchanger (11), the heat medium releases heat to indoor air. As a result, the indoor air is heated. The heat medium that has released heat in the indoor heat exchanger (11) passes through the first four-way switching valve (F1), and returns to the second magnetic refrigeration unit (U2).

In this way, with the first defrosting action, the first outdoor heat exchanger (12A) can be defrosted while heating of the indoor space is substantially continued by the indoor heat exchanger (1/).

Second Defrosting Action

In each magnetic refrigeration unit (U), the first action and the second action are alternately and repeatedly performed, as in the first embodiment. In the second defrosting action, the partial defrosting operation is performed in the second heat medium circuit (C2), and the partial heating operation is performed in the first heat medium circuit (C1).

Figure 20:
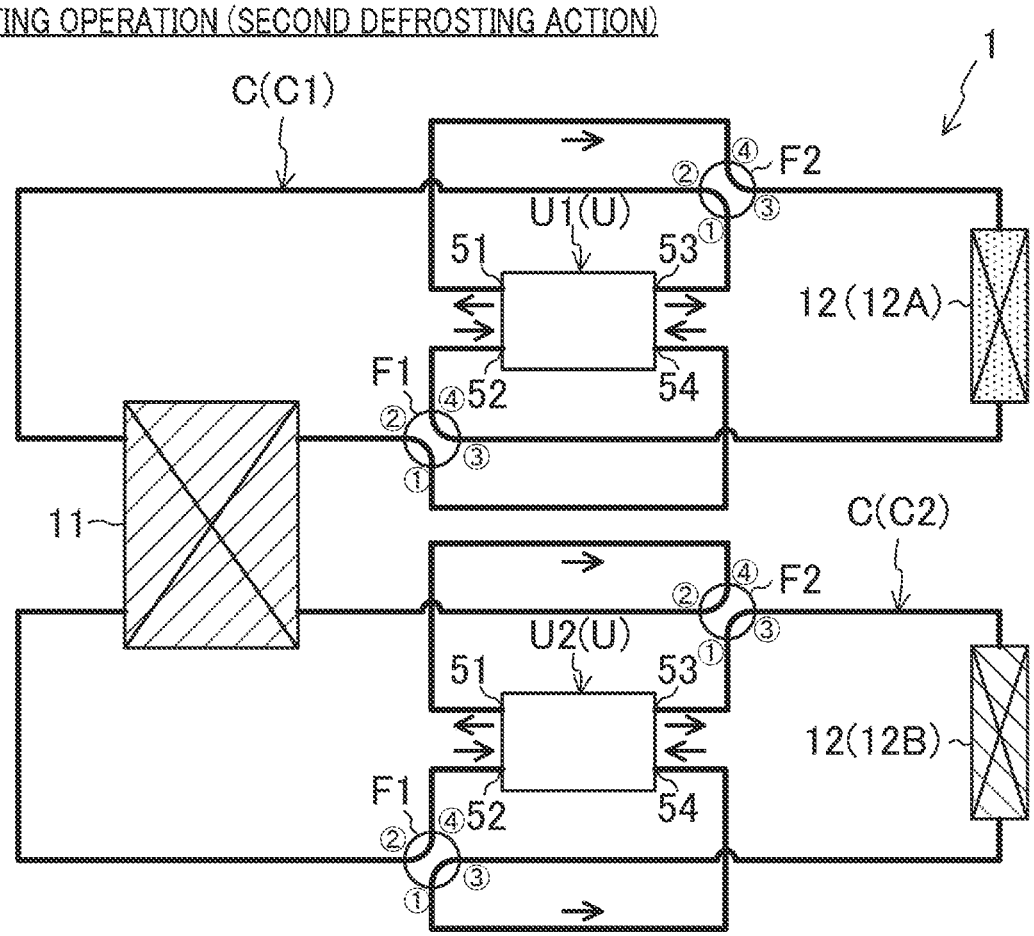
FIG. 20 is a piping diagram for illustrating a defrosting operation (second defrosting action) of the magnetic refrigeration device according to the third modification of the first embodiment.

In the second defrosting action illustrated in FIG. 20, the first four-way switching valve (F1) of the first heat medium circuit (C1) is set to the first state, the second four-way switching valve (F2) of the first heat medium circuit (C1) is set to the first state, the first four-way switching valve (F1) of the second heat medium circuit (C2) is set to the second state, and the second four-way switching valve (F2) of the second heat medium circuit (C2) is set to the second state.

A heat medium cooled by the first magnetic refrigeration unit (U1) passes through the second four-way switching valve (F2), and flows in the first outdoor heat exchanger (12A). In the first outdoor heat exchanger (12A), the heat medium absorbs heat from outdoor air. The heat medium that has absorbed heat in the first outdoor heat exchanger (12A) passes through the first four-way switching valve (F1), and returns to the first magnetic refrigeration unit (U1).

A heat medium heated by the first magnetic refrigeration unit (U1) passes through the second four-way switching valve (F2), and flows in the indoor heat exchanger (11). In the indoor heat exchanger (11), the heat medium releases heat to indoor air. As a result, the indoor air is heated. The heat medium that has released heat in the indoor heat exchanger (11) passes through the first four-way switching valve (F1), and returns to the first magnetic refrigeration unit (U1).

A heat medium cooled by the second magnetic refrigeration unit (U2) passes through the second four-way switching valve (F2), and flows in the indoor heat exchanger (11). In the indoor heat exchanger (11), the heat medium absorbs heat from indoor air. The heat medium that has absorbed heat in the indoor heat exchanger (11) passes through the first four-way switching valve (F1), and returns to the second magnetic refrigeration unit (U2).

A heat medium heated by the second magnetic refrigeration unit (U2) passes through the second four-way switching valve (F2), and flows in the second outdoor heat exchanger (12B). In the second outdoor heat exchanger (12B), the heat medium releases heat to outdoor air, and defrosting of the second outdoor heat exchanger (12B) is performed. The heat medium that has released heat in the second outdoor heat exchanger (12B) passes through the first four-way switching valve (F1), and returns to the second magnetic refrigeration unit (U2).

In this way, with the second defrosting action, the second outdoor heat exchanger (12B) can be defrosted while heating of the indoor space is substantially continued by the indoor heat exchanger (11).

Output Control of Magnetic Refrigeration Unit during Defrosting Operation

In each defrosting action, a heat medium cooled by the magnetic refrigeration unit (U) flows in the indoor heat exchanger (11). To be specific, in the first defrosting action, a heat medium cooled by the magnetic refrigerator (20) of the first magnetic refrigeration unit (U1) flows in the indoor heat exchanger (11). In the second defrosting action, a heat medium cooled by the magnetic refrigerator (20) of the second magnetic refrigeration unit (U2) flows in the indoor heat exchanger (11). Therefore, in each defrosting action, the air-heating ability of the indoor heat exchanger (11) may decrease, and comfort of an indoor space may be impaired. Thus, in the present modification, the output of the magnetic refrigeration unit (U) is controlled as follows in each defrosting action.

In the first defrosting action, the output of the second magnetic refrigeration unit (U2) is made larger than the output of the first magnetic refrigeration unit (U1). To be specific, the frequency f2 of the second magnetic refrigeration unit (U2) is made higher than the frequency f1 of the first magnetic refrigeration unit (U1). Here, the frequency is the number of times by which the first action and the second action are switched per unit time. In other words, the frequency is the reciprocal of the period by which the first action and the second action are switched. In the present modification, the frequency f2 of the second magnetic refrigeration unit (U2) is set to 4 Hz, and the frequency f1 of the first magnetic refrigeration unit (U1) is set to 2 Hz. Thus, in the first defrosting action, the heating ability of the indoor heat exchanger (11) due to the second magnetic refrigeration unit (U2) is high, and the cooling ability of the indoor heat exchanger (11) due to the first magnetic refrigeration unit (U1) is low. As a result, it is possible to suppress decrease in the air-cooling ability of the indoor heat exchanger (11) in the first defrosting action.

In the second defrosting action, the output of the first magnetic refrigeration unit (U1) is made larger than the output of the second magnetic refrigeration unit (U2). To be specific, the frequency f1 of the first magnetic refrigeration unit (U1) is made higher than the frequency f2 of the second magnetic refrigeration unit (U2). In the present modification, the frequency f1 of the first magnetic refrigeration unit (U1) is set to 4 Hz, and the frequency f2 of the second magnetic refrigeration unit (U2) is set to 2 Hz. Thus, in the second defrosting action, the heating ability of the indoor heat exchanger (11) due to the first magnetic refrigeration unit (U1) is high, and the cooling ability of the indoor heat exchanger (11) due to the second magnetic refrigeration unit (U2) is low. As a result, it is possible to suppress decrease in the air-heating ability of the indoor heat exchanger (11) in the second defrosting action.

In this way, in the defrosting operation of the present modification, the output of one or some of the magnetic refrigeration units (U) corresponding to the partial heating operation are made larger than the output of another or others of the magnetic refrigeration units (U) corresponding to the partial defrosting operation. Thus, it is possible to suppress decrease in air-heating ability in the defrosting operation.

Advantageous Effects of Third Modification of First Embodiment

A feature of the present modification is that: the at least one magnetic refrigerator (20) is constituted by a plurality of magnetic refrigerators (20); the at least one heat medium circuit (C) is constituted by a plurality of heat medium circuits (C); the at least one second heat exchanger (12) is constituted by a plurality of second heat exchangers (12); in the defrosting operation, a plurality of defrosting actions are performed in such a way as to change a second heat exchanger (12) to be defrosted; and in each of the defrosting actions, a first operation and a second operation are simultaneously performed, the first operation being an operation in which a heat medium heated by one or some of the magnetic refrigerators (20) is caused to release heat in the first heat exchanger (11, 16) and a heat medium cooled by the one or some of the magnetic refrigerators (20) is caused to absorb heat in one or some of the second heat exchangers (12), the second operation being an operation in which a heat medium heated by another or others of the magnetic refrigerators (20) is caused to release heat in another or others of the second heat exchangers (12) to be defrosted.

With this feature, at the same time as indoor air is heated by the indoor heat exchanger (11) in the partial heating operation (first operation), the outdoor heat exchanger (12) can be defrosted in the partial defrosting operation (second operation). In each defrosting action, an outdoor heat exchanger (12) that is to be defrosted changes in turn. As a result, all outdoor heat exchangers (12) can be defrosted, while heating of the indoor space is substantially continued.

The number of the plurality of heat medium circuits (C) in the present modification is not limited to two, and may be greater than or equal to N (N≥3). In this case, the number of outdoor heat exchangers to be defrosted is greater than or equal to M (M≥3). In the defrosting operation, a plurality of defrosting actions are performed in such a way as to change an outdoor heat exchanger (12) to be defrosted. Two or more outdoor heat exchangers (12) may be defrosted in a certain defrosting action. For example, if the number of outdoor heat exchangers (12) is three, in a certain defrosting action, two of the outdoor heat exchangers (12) may be defrosted and a heat medium may be caused to absorb heat in the remaining one outdoor heat exchanger (12). The same applies to other modifications (to be described in detail below) in each of which a plurality of defrosting actions are performed.

Fourth Modification of First Embodiment

Figure 21:
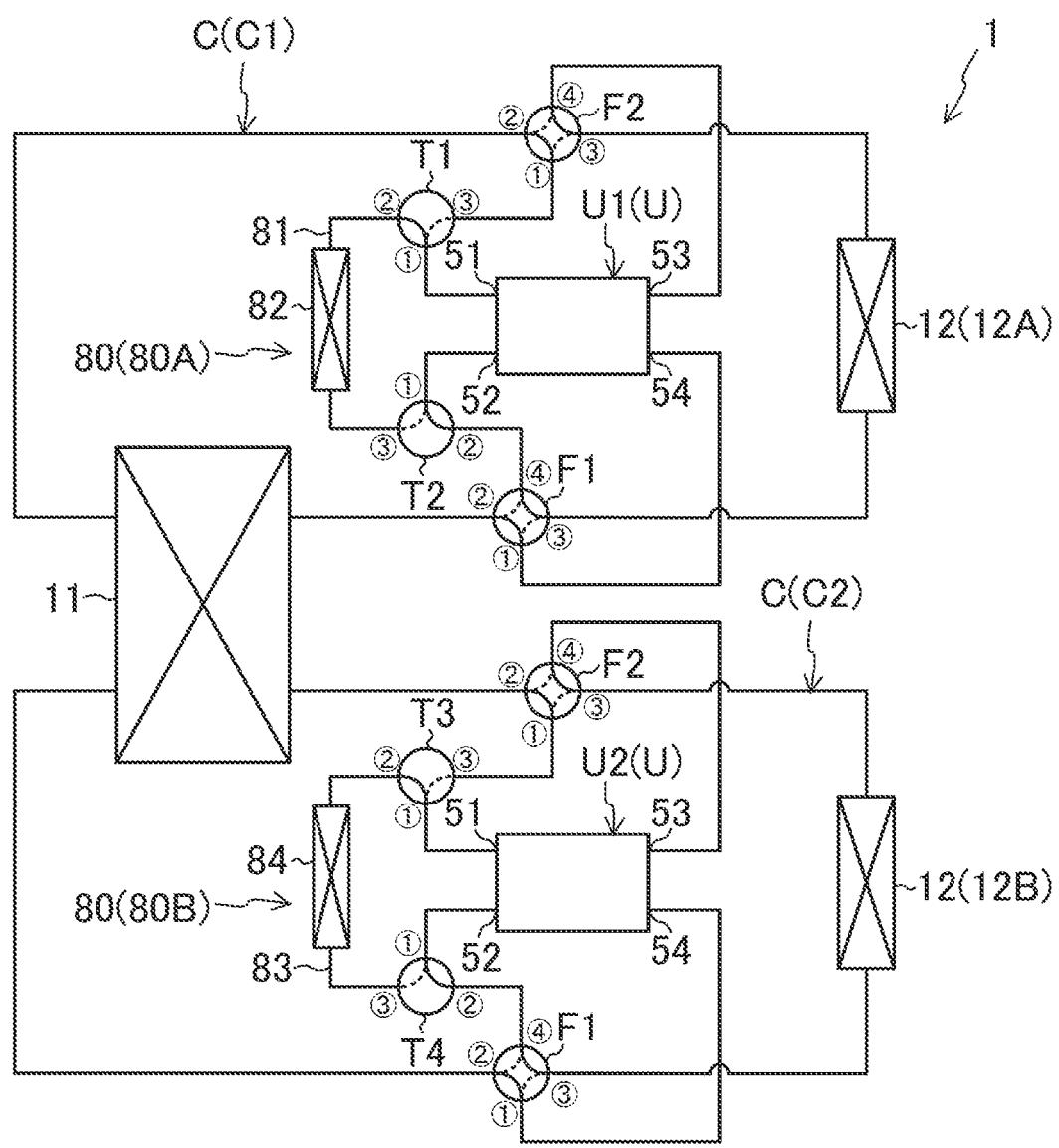
FIG. 21 is a piping diagram of a magnetic refrigeration device according to a fourth modification of the first embodiment.

In a fourth modification of the first embodiment, an auxiliary circuit (80) is added to each heat medium circuit (C) of the third modification of the first embodiment. As illustrated in FIG. 21, a plurality of auxiliary circuits (80) are constituted by a first auxiliary circuit (80A) and a second auxiliary circuit (80B). The first auxiliary circuit (80A) is provided in the first heat medium circuit (C1). The second auxiliary circuit (80B) is provided in the second heat medium circuit (C2).

The first auxiliary circuit (80A) includes a first three-way valve (T1), a second three-way valve (T2), a first pipe (81), and a first auxiliary heat exchanger (82).

A first port of the first three-way valve (T1) communicates with the low-temperature outflow pipe (51) of the first magnetic refrigeration unit (U1). A second port of the first three-way valve (T1) communicates with one end of the first pipe (81). A third port of the first three-way valve (T1) communicates with a first port of the second four-way switching valve (F2) of the first heat medium circuit (C1).

A first port of the second three-way valve (T2) communicates with the low-temperature inflow pipe (52) of the first magnetic refrigeration unit (U1). A second port of the second three-way valve (T2) communicates with a fourth port of the first four-way switching valve (F1) of the first heat medium circuit (C1). A third port of the second three-way valve (T2) communicates with the other end of the first pipe (81).

The first pipe (81) is connected between the first three-way valve (T1) and the second three-way valve (T2). The first auxiliary heat exchanger (82) is provided in the first pipe (81) The first auxiliary heat exchanger (82) is disposed in an outdoor space. The first auxiliary heat exchanger (82) causes outdoor air and a heat medium to exchange heat.

The second auxiliary circuit (80B) includes a third three-way valve (T3), a fourth three-way valve (T4), a second pipe (83), and a second auxiliary heat exchanger (84).

A first port of the third three-way valve (T3) communicates with the low-temperature outflow pipe (51) of the second magnetic refrigeration unit (U2). A second port of the third three-way valve (T3) communicates with one end of the second pipe (83). A third port of the third three-way valve (T3) communicates with a first port of the second four-way switching valve (F2) of the second heat medium circuit (C2).

A first port of the fourth three-way valve (T4) communicates with the low-temperature inflow pipe (52) of the second magnetic refrigeration unit (U2). A second port of the fourth three-way valve (T4) communicates with a fourth port of the first four-way switching valve (F1) of the second heat medium circuit (C2). A third port of the fourth three-way valve (T4) communicates with the other end of the second pipe (83).

The second pipe (83) is connected between the third three-way valve (T3) and the fourth three-way valve (T4). The second auxiliary heat exchanger (84) is provided in the second pipe (83). The second auxiliary heat exchanger (84) is disposed in the outdoor space. The second auxiliary heat exchanger (84) causes outdoor air and a heat medium to exchange heat.

Operational Actions of Magnetic Refrigeration Device

The fourth modification of the first embodiment performs an air-cooling operation, an air-heating operation, and a defrosting operation. The defrosting operation includes a first defrosting action and a second defrosting action.

Air-Cooling Operation

Illustration of the air-cooling operation of the fourth modification of the first embodiment, which is basically similar to the air-cooling operation of the third modification of the first embodiment, will be omitted.

In the first heat medium circuit (C1) during the air-cooling operation, the first four-way switching valve (F1) is set to the second state, the second four-way switching valve (F2) is set to the first state, the first three-way valve (T1) is set to the second state, and the second three-way valve (T2) is set to the first state. In the first magnetic refrigeration unit (U1), the first action and the second action are alternately and repeatedly performed. Thus, in the first heat medium circuit (C1), a heat medium releases heat in the first outdoor heat exchanger (12A), and a heat medium absorbs heat in the indoor heat exchanger (11).

In the second heat medium circuit (C2) during the air-cooling operation, the first four-way switching valve (F1) is set to the second state, the second four-way switching valve (F2) is set to the first state, the third three-way valve (T3) is set to the second state, and the fourth three-way valve (T4) is set to the first state. In the second magnetic refrigeration unit (U2), the first action and the second action are alternately and repeatedly performed. Thus, in the second heat medium circuit (C2), a heat medium releases heat in the second outdoor heat exchanger (12B), and a heat medium absorbs heat in the indoor heat exchanger (11).

Air-Heating Operation

Illustration of the air-heating operation of the fourth modification, which is basically similar to the air-heating operation of the third modification, will be omitted.

In the first heat medium circuit (C1) during the air-heating operation, the first four-way switching valve (F1) is set to the first state, the second four-way switching valve (F2) is set to the second state, the first three-way valve (T1) is set to the second state, and the second three-way valve (T2) is set to the first state. In the first magnetic refrigeration unit (U1), the first action and the second action are alternately and repeatedly performed. Thus, in the first heat medium circuit (C1), a heat medium absorbs heat in the first outdoor heat exchanger (12A), and a heat medium releases heat in the indoor heat exchanger (11).

In the second heat medium circuit (C2) during the air-heating operation, the first four-way switching valve (F1) is set to the first state, the second four-way switching valve (F2) is set to the second state, the third three-way valve (T3) is set to the second state, and the fourth three-way valve (T4) is set to the first state. In the second magnetic refrigeration unit (U2), the first action and the second action are alternately and repeatedly performed. Thus, in the second heat medium circuit (C2), a heat medium absorbs heat in the second outdoor heat exchanger (12B), and a heat medium releases heat in the indoor heat exchanger (11)

Defrosting Operation

The defrosting operation includes a first defrosting action and a second defrosting action. In these defrosting actions, an outdoor heat exchanger (12) that is to be defrosted and an outdoor heat exchanger (12) that causes a heat medium to absorb heat differ from each other. In the defrosting operation of the present modification, the first defrosting action and the second defrosting action are each performed at least once.

In a partial defrosting operation of the defrosting operation of the present modification, a heat medium cooled by the magnetic refrigerator (20) of one or some of the magnetic refrigeration units (U) bypasses the indoor heat exchanger (11) and absorbs heat in the auxiliary heat exchanger (82, 84).

First Defrosting Action

In each magnetic refrigeration unit (U), the first action and the second action are alternately and repeatedly performed, as in the first embodiment. In the first defrosting action, a partial defrosting operation is performed in the first heat medium circuit (C1), and a partial heating operation is performed in the second heat medium circuit (C2).

Figure 22:
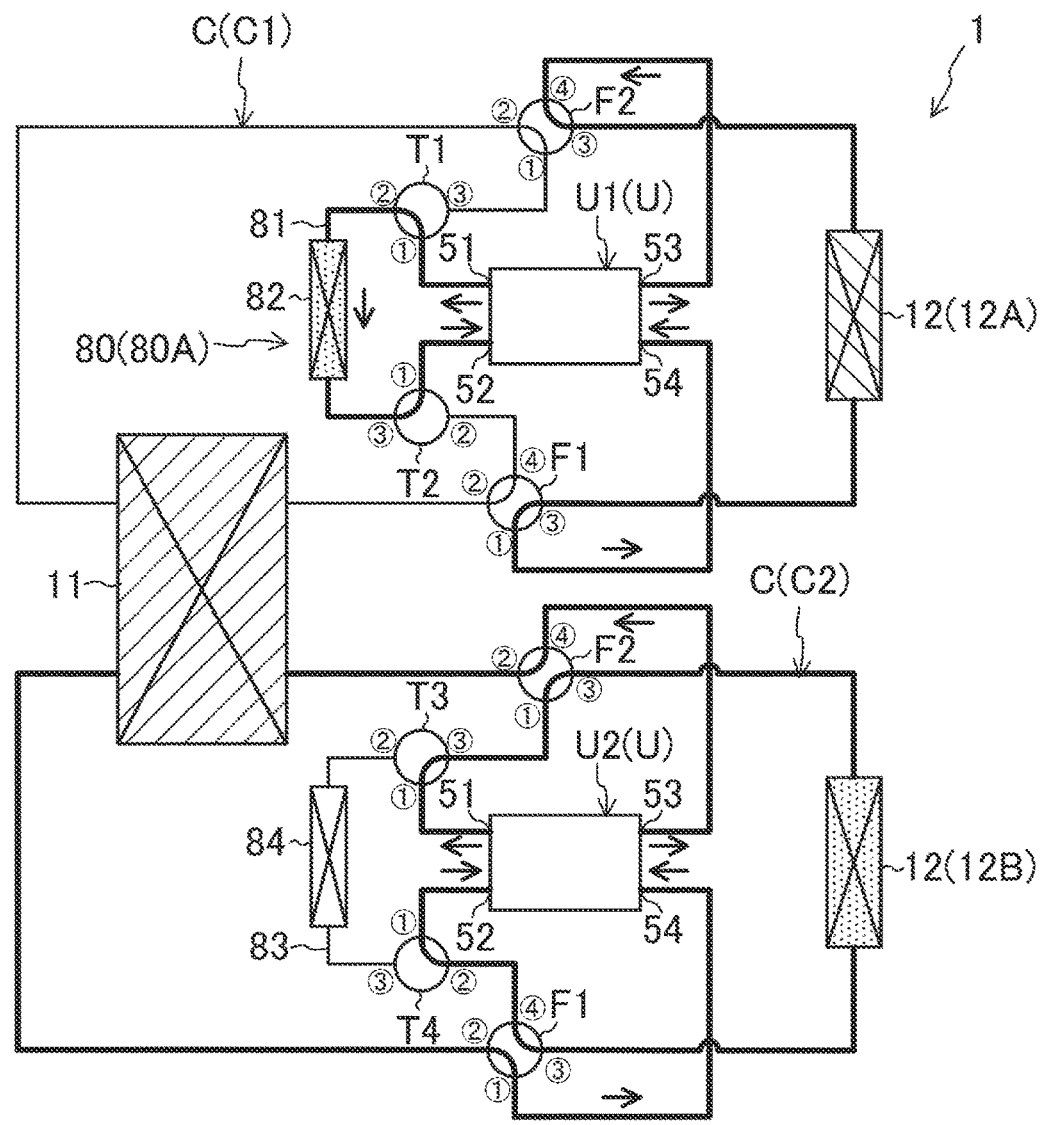
FIG. 22 is a piping diagram for illustrating a defrosting operation (first defrosting action) of the magnetic refrigeration device according to the fourth modification of the first embodiment.

In the first defrosting action illustrated in FIG. 22, the first four-way switching valve (F1) of the first heat medium circuit (C1) is set to the second state, the second four-way switching valve (F2) of the first heat medium circuit (C1) is set to the first state, the first four-way switching valve (F) of the second heat medium circuit (C2) is set to the first state, and the second four-way switching valve (F2) of the second heat medium circuit (C2) is set to the second state. The first three-way valve (T1) is set to the first state, the second three-way valve (T2) is set to the second state, the third three-way valve (T3) is set to the second state, and the fourth three-way valve (T4) is set to the first state.

A heat medium cooled by the first magnetic refrigeration unit (U1) passes through the first three-way valve (T1), flows into the first pipe (81), and flows in the first auxiliary heat exchanger (82). In the first auxiliary heat exchanger (82), a heat medium absorbs heat from outdoor air. The heat medium that has absorbed heat in the first auxiliary heat exchanger (82) passes through the second three-way valve (T2), and returns from the low-temperature inflow pipe (52) to the first magnetic refrigeration unit (U1).

A heat medium heated by the first magnetic refrigeration unit (U1) passes through the second four-way switching valve (F2), and flows in the first outdoor heat exchanger (12A). In the first outdoor heat exchanger (12A), the heat medium releases heat to outdoor air, and defrosting of the first outdoor heat exchanger (12A) is performed. The heat medium that has released heat in the first outdoor heat exchanger (12A) passes through the first four-way switching valve (F1), and returns to the first magnetic refrigeration unit (U1).

A heat medium cooled by the second magnetic refrigeration unit (U2) passes through the second four-way switching valve (F2), and flows in the second outdoor heat exchanger (12B). In the second outdoor heat exchanger (12B), the heat medium absorbs heat from outdoor air. The heat medium that has absorbed heat in the second outdoor heat exchanger (12B) passes through the first four-way switching valve (F1), and returns to the second magnetic refrigeration unit (U2).

A heat medium heated by the second magnetic refrigeration unit (U2) passes through the second four-way switching valve (F2), and flows in the indoor heat exchanger (11). In the indoor heat exchanger (11), the heat medium releases heat to indoor air. As a result, the indoor air is heated. The heat medium that has released heat in the indoor heat exchanger (11) passes through the first four-way switching valve (F1), and returns to the second magnetic refrigeration unit (U2).

In this way, with the first defrosting action, the first outdoor heat exchanger (12A) can be defrosted while heating of the indoor space is substantially continued by the indoor heat exchanger (11). In addition, in the partial defrosting operation, a heat medium cooled by the first magnetic refrigeration unit (U1) bypasses the indoor heat exchanger (11) and flows in the first auxiliary heat exchanger (82). Therefore, decrease in the air-heating ability of the indoor heat exchanger (11) can be suppressed.

Second Defrosting Action

In each magnetic refrigeration unit (U), the first action and the second action are alternately and repeatedly performed, as in the first embodiment. In the second defrosting action, a partial heating operation is performed in the first heat medium circuit (C1), and a partial defrosting operation is performed in the second heat medium circuit (C2).

Figure 23:
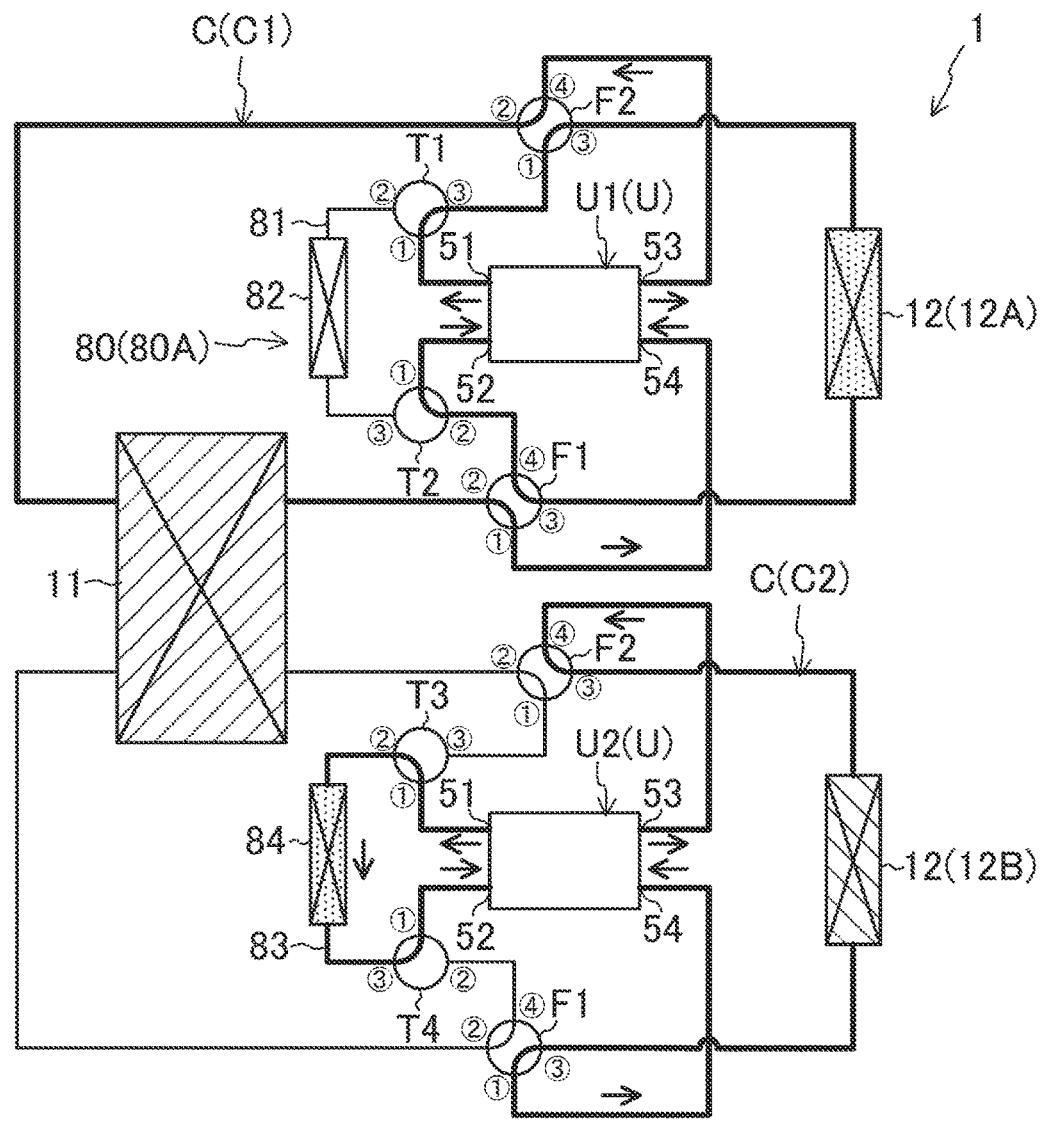
FIG. 23 is a piping diagram for illustrating a defrosting operation (second defrosting action) of the magnetic refrigeration device according to the fourth modification of the first embodiment.

In the second defrosting action illustrated in FIG. 23, the first four-way switching valve (F1) of the first heat medium circuit (C1) is set to the first state, the second four-way switching valve (F2) of the first heat medium circuit (C1) is set to the second state, the first four-way switching valve (F1) of the second heat medium circuit (C2) is set to the second state, and the second four-way switching valve (F2) of the second heat medium circuit (C2) is set to the first state. The first three-way valve (T1) is set to the second state, the second three-way valve (T2) is set to the first state, the third three-way valve (T3) is set to the first state, and the fourth three-way valve (T4) is set to the second state.

A heat medium cooled by the first magnetic refrigeration unit (U1) passes through the second four-way switching valve (F2), and flows in the first outdoor heat exchanger (12A). In the first outdoor heat exchanger (12A), the heat medium absorbs heat from outdoor air. The heat medium that has absorbed heat in the first outdoor heat exchanger (12A) passes through the first four-way switching valve (F1), and returns to the first magnetic refrigeration unit (U1).

A heat medium heated by the first magnetic refrigeration unit (U1) passes through the second four-way switching valve (F2), and flows in the indoor heat exchanger (11). In the indoor heat exchanger (11), the heat medium releases heat to indoor air. As a result, the indoor air is heated. The heat medium that has released heat in the indoor heat exchanger (11) passes through the first four-way switching valve (F1), and returns to the first magnetic refrigeration unit (U1).

A heat medium cooled by the second magnetic refrigeration unit (U2) passes through the third three-way valve (T3), flows into the second pipe (83), and flows in the second auxiliary heat exchanger (84). In the second auxiliary heat exchanger (84), the heat medium absorbs heat from outdoor air. The heat medium that has absorbed heat in the second auxiliary heat exchanger (84) passes through the fourth three-way valve (T4), and returns from the low-temperature inflow pipe (52) to the second magnetic refrigeration unit (U2).

A heat medium heated by the second magnetic refrigeration unit (U2) passes through the second four-way switching valve (F2), and flows in the second outdoor heat exchanger (12B). In the second outdoor heat exchanger (12B), the heat medium releases heat to outdoor air, and defrosting of the second outdoor heat exchanger (12B) is performed. The heat medium that has released heat in the second outdoor heat exchanger (12B) passes through the first four-way switching valve (F1), and returns to the second magnetic refrigeration unit (U2).

In this way, with the second defrosting action, the second outdoor heat exchanger (12B) can be defrosted while heating of the indoor space is substantially continued by the indoor heat exchanger (11). In addition, in the partial defrosting operation, a heat medium cooled by the second magnetic refrigeration unit (U2) bypasses the indoor heat exchanger (11) and flows in the second auxiliary heat exchanger (84). Therefore, decrease in the air-heating ability of the indoor heat exchanger (11) can be suppressed.

Advantageous Effects of Fourth Modification of First Embodiment

A feature of the present modification is that: the plurality of heat medium circuits (C) each include an auxiliary heat exchanger (82, 84); and, in the second operation, a heat medium cooled by the other or others of the solid-state coolers (20) is caused to bypass the first heat exchanger (11, 16) and absorb heat in the auxiliary heat exchanger (82, 84), and a heat medium heated by the other or others of the solid-state coolers (20) is caused to release heat in another or others of the second heat exchangers (12) to be defrosted.

With this feature, in the partial defrosting operation (second operation), the heat medium cooled by the magnetic refrigerator (20) bypasses the indoor heat exchanger (11) and absorbs heat in the auxiliary heat exchanger (82, 84). Therefore, in the partial defrosting operation, the heat medium does not absorb heat from indoor air, and decrease in the air-heating ability of the indoor heat exchanger (11) can be suppressed.

Fifth Modification of First Embodiment

Figure 24:
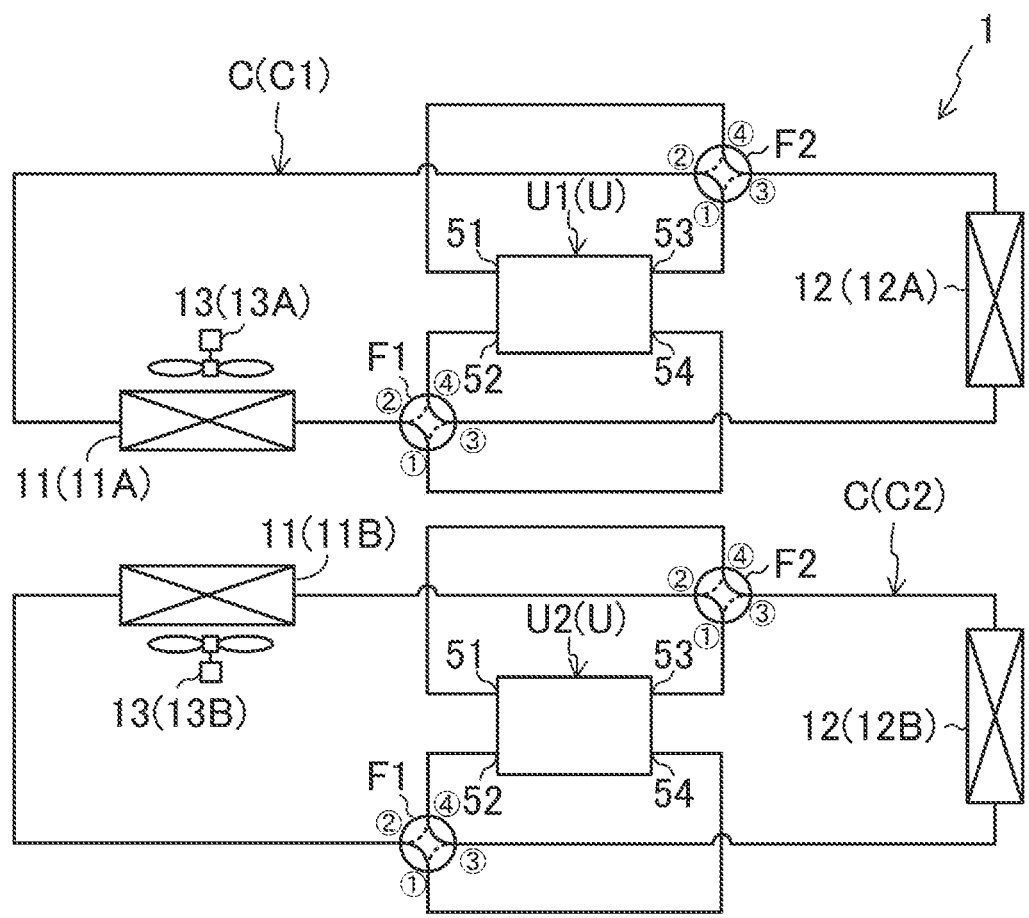
FIG. 24 is a piping diagram of a magnetic refrigeration device according to a fifth modification of the first embodiment.

A fifth modification of the first embodiment illustrated in FIG. 24 differs from the third modification of the first embodiment in the configuration of the indoor heat exchanger (11). The magnetic refrigeration device (1) according to the present modification includes a plurality of indoor heat exchangers (11). The plurality of indoor heat exchangers (11) are provided in correspondence with the plurality of heat medium circuits (C). To be specific, the plurality of indoor heat exchangers (11) are constituted by a first indoor heat exchanger (11A) and a second indoor heat exchanger (11B). The first indoor heat exchanger (11A) corresponds to the first heat medium circuit (C1). The second indoor heat exchanger (11B) corresponds to the second heat medium circuit (C2). The first indoor heat exchanger (11A) and the second indoor heat exchanger (11B) air-condition the same indoor space.

The magnetic refrigeration device (1) includes a plurality of fans (13) The plurality of fans (13) are constituted by a first fan (13A) and a second fan (13B). The first fan (13A) corresponds to the first indoor heat exchanger (11A). Air transported by the first fan (13A) passes through the first indoor heat exchanger (11A) and is supplied to the indoor space. Air transported by the second fan (13B) passes through the second indoor heat exchanger (11B) and is supplied to the indoor space.

Operational Actions of Magnetic Refrigeration Device

The fifth modification of the first embodiment performs an air-cooling operation, an air-heating operation, and a defrosting operation. The defrosting operation includes a first defrosting action and a second defrosting action.

Air-Cooling Operation

Illustration of the air-cooling operation of the fifth modification of the first embodiment, which is basically similar to the air-cooling operation of the third modification of the first embodiment, will be omitted.

In the air-cooling operation, the first four-way switching valve (F1) of the first heat medium circuit (C1) is set to the second state, the second four-way switching valve (F2) of the first heat medium circuit (C1) is set to the second state, the first four-way switching valve (F1) of the second heat medium circuit (C2) is set to the second state, the second four-way switching valve (F2) of the second heat medium circuit (C2) is set to the second state. The first fan (13A) and the second fan (13B) operate. In each magnetic refrigeration unit (U), the first action and the second action are alternately and repeatedly performed.

In the first heat medium circuit (C1), a heat medium releases heat in the first outdoor heat exchanger (12A), and a heat medium absorbs heat in the first indoor heat exchanger (1 IA). In the second heat medium circuit (C2), a heat medium releases heat in the second outdoor heat exchanger (12B), and a heat medium absorbs heat in the first indoor heat exchanger (11A).

Air-Heating Operation

Illustration of the air-heating operation of the fourth modification of the first embodiment, which is basically similar to the air-heating operation of the third modification of the first embodiment, will be omitted.

In the air-heating operation, the first four-way switching valve (F1) of the first heat medium circuit (C1) is set to the first state, the second four-way switching valve (F2) of the first heat medium circuit (C1) is set to the first state, the first four-way switching valve (F1) of the second heat medium circuit (C2) is set to the first state, and the second four-way switching valve (F2) of the second heat medium circuit (C2) is set to the first state. The first fan (13A) and the second fan (13B) operate. In each magnetic refrigeration unit (U), the first action and the second action are alternately and repeatedly performed.

In the first heat medium circuit (C1), a heat medium absorbs heat in the first outdoor heat exchanger (12A), and a heat medium releases heat in the first indoor heat exchanger (11A). In the second heat medium circuit (C2), a heat medium absorbs heat in the second outdoor heat exchanger (12B), and a heat medium releases heat in the second indoor heat exchanger (11B).

Defrosting Operation

The defrosting operation includes a first defrosting action and a second defrosting action. In these defrosting actions, an outdoor heat exchanger (12) that is to be defrosted and an outdoor heat exchanger (12) that causes a heat medium to absorb heat differ from each other. In the defrosting operation of the present modification, the first defrosting action and the second defrosting action are each performed at least once.

First Defrosting Action

In each magnetic refrigeration unit (U), the first action and the second action are alternately and repeatedly performed, as in the first embodiment. In the first defrosting action, a partial defrosting operation is performed in the first heat medium circuit (C1), and a partial heating operation is performed in the second heat medium circuit (C2).

Figure 25:
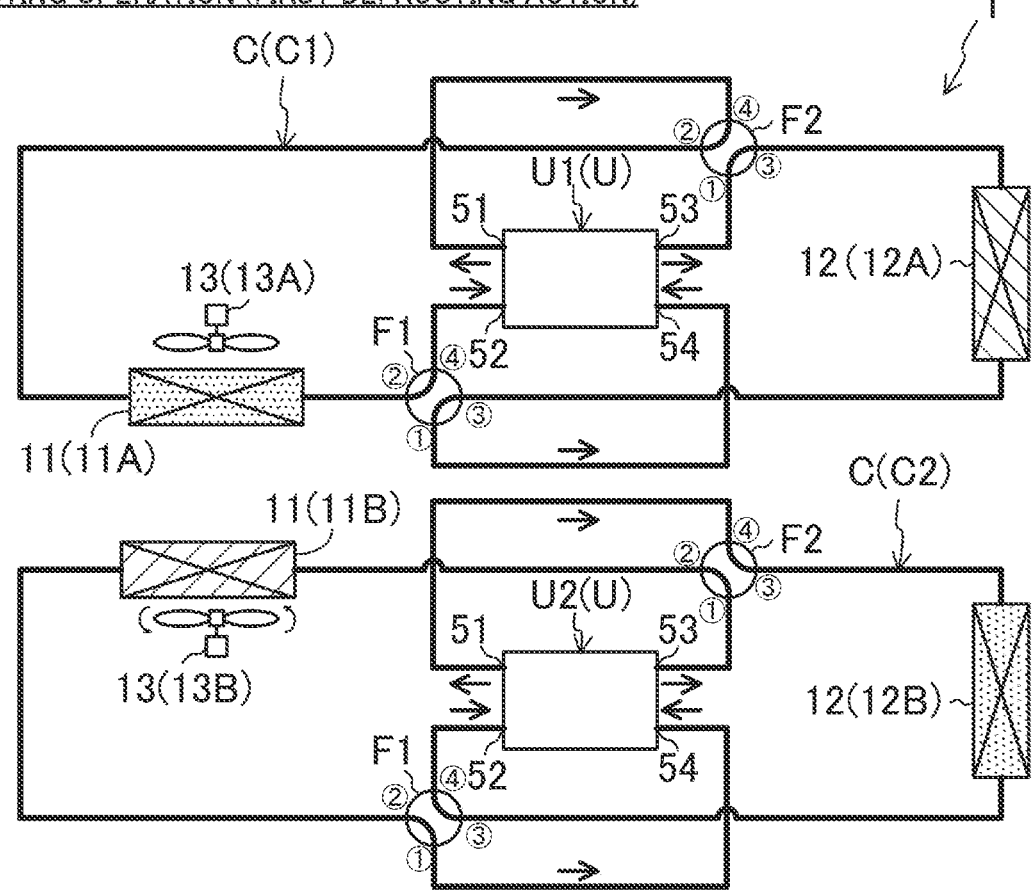
FIG. 25 is a piping diagram for illustrating a defrosting operation (first defrosting action) of the magnetic refrigeration device according to the fifth modification of the first embodiment.

In the first defrosting action illustrated in FIG. 25, the first four-way switching valve (F1) of the first heat medium circuit (C1) is set to the second state, the second four-way switching valve (F2) of the first heat medium circuit (C1) is set to the second state, the first four-way switching valve (F1) of the second heat medium circuit (C2) is set to the first state, and the second four-way switching valve (F2) of the second heat medium circuit (C2) is set to the first state.

In the first defrosting action, the first fan (13A) stops. The first fan (13A) corresponds to the first indoor heat exchanger (11A) in which a heat medium absorbs heat in the partial defrosting operation. The second fan (13B) operates. The second fan (13B) corresponds to the second indoor heat exchanger (11B) in which a heat medium releases heat in the partial heating operation.

A heat medium cooled by the first magnetic refrigeration unit (U1) passes through the second four-way switching valve (F2), and flows in the first indoor heat exchanger (11A). In the first indoor heat exchanger (11A), the heat medium absorbs heat from indoor air. The first fan (13A) corresponding to the first indoor heat exchanger (11A) is stopped. Therefore, heat exchange between the heat medium and the air in the first indoor heat exchanger (11A) is suppressed. The air cooled by the first indoor heat exchanger (11A) is not supplied to the indoor space. The heat medium that has absorbed heat in the first indoor heat exchanger (11A) passes through the first four-way switching valve (F1), and returns to the first magnetic refrigeration unit (U1).

A heat medium heated by the first magnetic refrigeration unit (U1) passes through the second four-way switching valve (F2), and flows in the first outdoor heat exchanger (12A). In the first outdoor heat exchanger (12A), the heat medium releases heat to outdoor air, and defrosting of the first outdoor heat exchanger (12A) is performed. The heat medium that has released heat in the first outdoor heat exchanger (12A) passes through the first four-way switching valve (F1), and returns to the first magnetic refrigeration unit (U1).

A heat medium cooled by the second magnetic refrigeration unit (U2) passes through the second four-way switching valve (F2), and flows in the second outdoor heat exchanger (12B). In the second outdoor heat exchanger (12B), the heat medium absorbs heat from outdoor air. The heat medium that has absorbed heat in the second outdoor heat exchanger (12B) passes through the first four-way switching valve (F1), and returns to the second magnetic refrigeration unit (U2).

A heat medium heated by the second magnetic refrigeration unit (U2) passes through the second four-way switching valve (F2), and flows in the second indoor heat exchanger (11B). In the second indoor heat exchanger (11B), the heat medium releases heat to indoor air. The second fan (13B) corresponding to the second indoor heat exchanger (11B) is operating. Therefore, the air heated by the second indoor heat exchanger (11B) is supplied to an indoor space. The heat medium that has released heat in the second indoor heat exchanger (11B) passes through the first four-way switching valve (F1), and returns to the second magnetic refrigeration unit (U2).

In this way, with the first defrosting action, the first outdoor heat exchanger (12A) can be defrosted, while heating of the indoor space is substantially continued by the second indoor heat exchanger (11B). Because the first fan (13A) corresponding to the first indoor heat exchanger (11A) is stopped, it is possible to suppress supply of cooled air to the indoor space.

Second Defrosting Action

In each magnetic refrigeration unit (U), the first action and the second action are alternately and repeatedly performed, as in the first embodiment. In the second defrosting action, the partial defrosting operation is performed in the second heat medium circuit (C2), and the partial heating operation is performed in the first heat medium circuit (C1).

Figure 26:
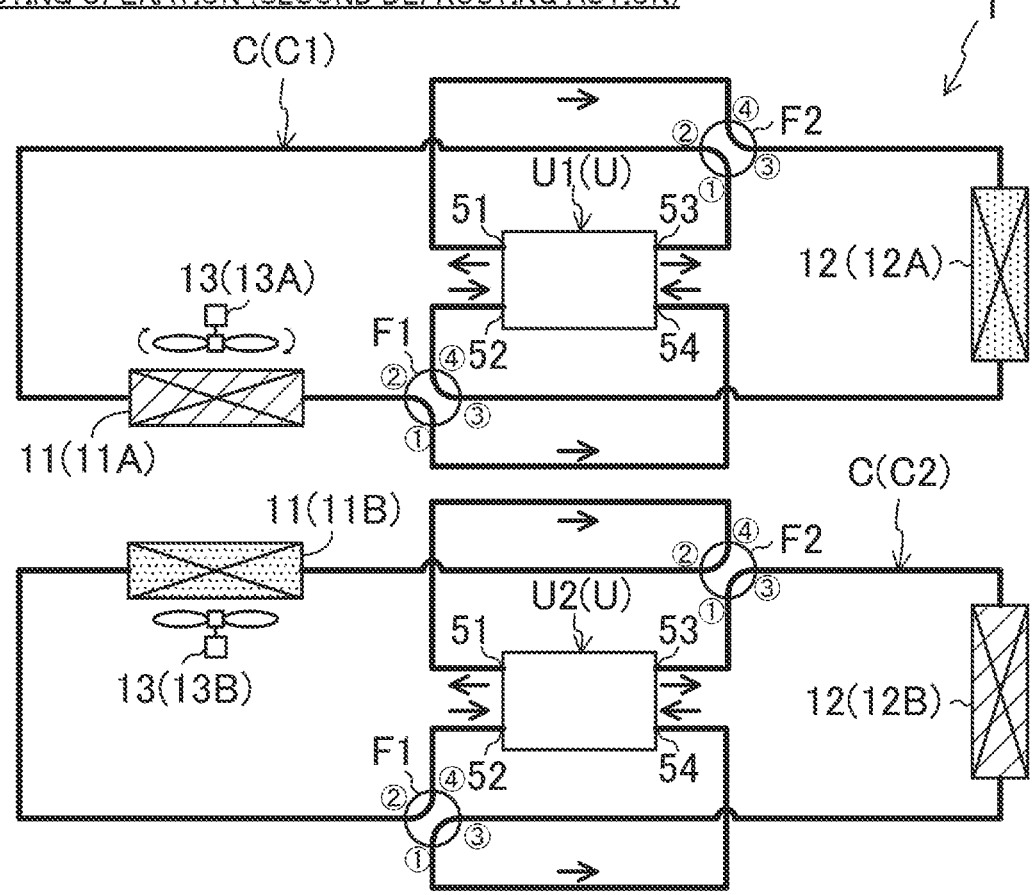
FIG. 26 is a piping diagram for illustrating a defrosting operation (second defrosting action) of the magnetic refrigeration device according to the fifth modification of the first embodiment.

In the second defrosting action illustrated in FIG. 26, the first four-way switching valve (F1) of the first heat medium circuit (C1) is set to the first state, the second four-way switching valve (F2) of the first heat medium circuit (C1) is set to the first state, the first four-way switching valve (F1) of the second heat medium circuit (C2) is set to the second state, and the second four-way switching valve (F2) of the second heat medium circuit (C2) is set to the second state.

In the second defrosting action, the second fan (13B) stops. The second fan (13B) corresponds to the second indoor heat exchanger (11B) in which a heat medium absorbs heat in the partial defrosting operation. The first fan (13A) operates. The first fan (13A) corresponds to the first indoor heat exchanger (11A) in which a heat medium releases heat in the partial heating operation.

A heat medium cooled by the first magnetic refrigeration unit (U1) passes through the second four-way switching valve (F2), and flows in the first outdoor heat exchanger (12A). In the first outdoor heat exchanger (12A), the heat medium absorbs heat from outdoor air. The heat medium that has absorbed heat in the first outdoor heat exchanger (12A) passes through the first four-way switching valve (F1), and returns to the first magnetic refrigeration unit (U1).

A heat medium heated by the first magnetic refrigeration unit (U1) passes through the second four-way switching valve (F2), and flows in the first indoor heat exchanger (11A). In the first indoor heat exchanger (11A), the heat medium releases heat to indoor air. The first fan (13A) corresponding to the first indoor heat exchanger (11A) is operating. Therefore, the air heated by the first indoor heat exchanger (11A) is supplied to an indoor space. The heat medium that has released heat in the first indoor heat exchanger (11A) passes through the first four-way switching valve (F1), and returns to the first magnetic refigeration unit (U1).

A heat medium cooled by the second magnetic refrigeration unit (U2) passes through the second four-way switching valve (F2), and flows in the second indoor heat exchanger (11B). The heat medium absorbs heat from indoor air in the second indoor heat exchanger (11B). The second fan (13B) corresponding to the second indoor heat exchanger (11B) is stopped. Therefore, heat exchange between the heat medium and the air in the second indoor heat exchanger (11B) is suppressed. The air cooled by the second indoor heat exchanger (11B) is not supplied to the indoor space. The heat medium that has absorbed heat in the second indoor heat exchanger (11B) passes through the first four-way switching valve (F1), and returns to the second magnetic refrigeration unit (U2).

A heat medium heated by the second magnetic refrigeration unit (U2) passes through the second four-way switching valve (F2), and flows in the second outdoor heat exchanger (12B). In the second outdoor heat exchanger (12B), the heat medium releases heat to outdoor air, and defrosting of the second outdoor heat exchanger (12B) is performed. The heat medium that has released heat in the second outdoor heat exchanger (12B) passes through the first four-way switching valve (F1), and returns to the second magnetic refrigeration unit (U2).

In this way, with the second defrosting action, the second outdoor heat exchanger (12B) can be defrosted, while heating of the indoor space is substantially continued by the first indoor heat exchanger (11A). Because the second fan (13B) corresponding to the second indoor heat exchanger (11B) is stopped, it is possible to suppress supply of cooled air to the indoor space.

Advantageous Effects of Fifth Modification of First Embodiment

A feature of the present modification is that: the magnetic refrigeration device (1) includes fans (13) each of which is configured to transport air that passes through a corresponding one of the plurality of first heat exchangers (11, 16) and that is supplied to an indoor space; in the first operation, one or some of the fans (13) corresponding to the one or some of the first heat exchangers (11, 16) is/are operated; and in the second operation, an airflow rate of each of one or more fans (13) corresponding to the other or others of the first heat exchangers (11, 16) is made lower than an airflow rate of each of one or more fans (13) corresponding to the one or some of the first heat exchangers (11, 16) or one or more fans (13) corresponding to the other or others of the first heat exchangers (11, 16) is/are stopped.

With this feature, in the in partial defrosting operation, because the fan (13) corresponding to the indoor heat exchanger (11) in which a heat medium absorbs heat is stopped, it is possible to suppress cooling of indoor air in the indoor heat exchanger (11). In the partial heating operation, because the fan (13) corresponding the indoor heat exchanger (11) in which a heat medium releases heat is operated, the indoor air can be sufficiently heated by the indoor heat exchanger (11).

In the above example, in the partial defrosting operation, the fan (13) corresponding to the indoor heat exchanger (11) in which the heat medium absorbs heat is stopped. However, the airflow rate of the fan (13) may be reduced. In this case, the airflow rate of the fan (13) is made lower that the airflow rate of a fan (13) corresponding to another indoor heat exchanger (11). Thus, it is possible to suppress cooling of indoor air in the indoor heat exchanger (11) in which the heat medium absorbs heat. In addition, the indoor air can be sufficiently heated in the indoor heat exchanger (11) in which the heat medium releases heat.

Sixth Modification of First Embodiment

Figure 27:
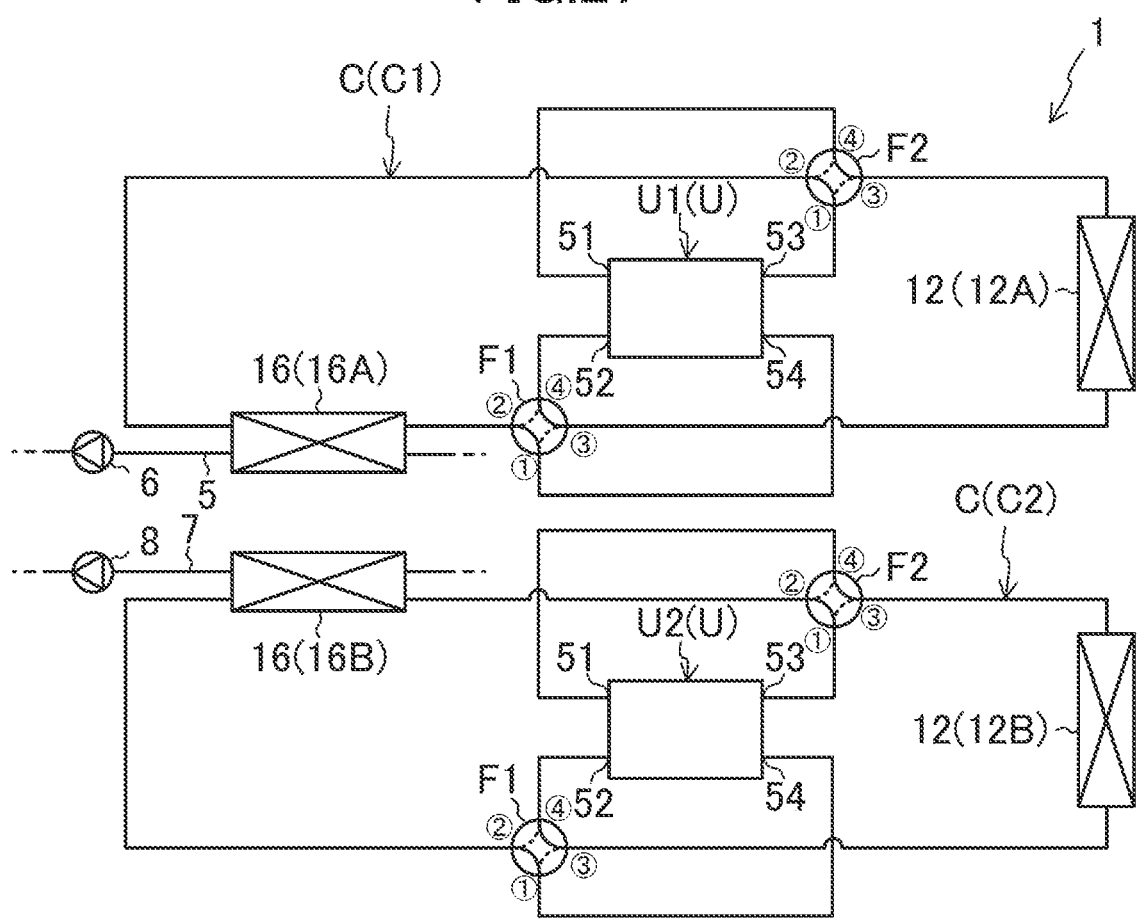
FIG. 27 is a piping diagram of a magnetic refrigeration device according to a sixth modification of the first embodiment.

A sixth modification of the first embodiment illustrated in FIG. 27 differs from the fifth modification of the first embodiment in the configuration of the first heat exchanger. The first heat exchanger of the fifth modification is an air heat exchanger (the indoor heat exchanger (11)) that is configured to cause a heat medium of the heat medium circuit (C) and air to exchange heat. In contrast, the first heat exchanger of the sixth modification is a utilization heat exchanger (16) that is configured to cause a heat medium of the heat medium circuit (C) and a heat medium in another heat medium flow path to exchange heat. A first utilization heat exchanger (16A) is provided in the first heat medium circuit (C1). A second utilization heat exchanger (16B) is provided in the second heat medium circuit (C2).

The first utilization heat exchanger (16A) includes a heat-transfer flow path that communicates with the first heat medium circuit (C1) and a heat-transfer flow path that communicates with a first secondary flow path (5). The first utilization heat exchanger (16A) causes a heat medium in the first heat medium circuit (C1) and a heat medium in the first secondary flow path (5) to exchange heat. A first fluid pump (6) is provided in the first secondary flow path (5). The heat medium that flows in the first secondary flow path (5) includes water, a refrigerant, brine, and the like.

Likewise, the second utilization heat exchanger (16B) includes a heat-transfer flow path that communicates with the second heat medium circuit (C2) and a heat-transfer flow path that communicates with a second secondary flow path (7). The second utilization heat exchanger (16B) causes a heat medium in the second heat medium circuit (C2) and a heat medium in the second secondary flow path (7) to exchange heat. A second fluid pump (8) is provided in the second secondary flow path (7). The heat medium that flows in the second secondary flow path (7) includes water, a refrigerant, brine, and the like.

The heat medium in the first secondary flow path (5) and the heat medium in the second secondary flow path (7) cool or heat the same target.

Operational Actions of Magnetic Refrigeration Device

The magnetic refrigeration device (1) according to the present modification performs a cooling operation, a heating operation, and a defrosting operation in a switching manner.

Cooling Operation

The flow of a heat medium in the cooling operation of the present modification is basically the same as the flow of a heat medium in the air-cooling operation of the fifth modification of the first embodiment. Description of details will be omitted.

In the cooling operation, the first fluid pump (6) and the second fluid pump (8) are operated. In the first utilization heat exchanger (16A) during the cooling operation, the heat medium in the first heat medium circuit (C1) absorbs heat from the heat medium in the first secondary flow path (5). As a result, the heat medium in the first secondary flow path (5) is cooled. In the second utilization heat exchanger (16B) during the cooling operation, the heat medium in the second heat medium circuit (C2) absorbs heat from the heat medium of the second secondary flow path (7). As a result, the heat medium in the second secondary flow path (7) is cooled.

Heating Operation

The flow of a heat medium in the heating operation of the present modification is basically the same as the flow of a heat medium in the air-heating operation the fifth modification of the first embodiment. Description of details will be omitted.

In the heating operation, the first fluid pump (6) and the second fluid pump (8) are operated. In the first utilization heat exchanger (16A) during the heating operation, the heat medium in the first heat medium circuit (C1) releases heat to the heat medium in the first secondary flow path (5). As a result, the heat medium in the first secondary flow path (5) is heated. In the second utilization heat exchanger (16B) during the heating operation, the heat medium in the second heat medium circuit (C2) releases heat to the heat medium in the second secondary flow path (7). As a result, the heat medium in the second secondary flow path (7) is heated.

Defrosting Operation

The defrosting operation includes a first defrosting action and a second defrosting action.

First Defrosting Action

The flow of a heat medium in the first defrosting action of the present modification is basically the same as the flow of a heat medium in the first defrosting action of the fifth modification of the first embodiment. In the first defrosting action, the partial defrosting operation is performed in the first heat medium circuit (C1), and the partial heating operation is performed in the second heat medium circuit (C2). Description of details will be omitted.

In the first defrosting action, the first fluid pump (6) is stopped. The first fluid pump (6) corresponds to the first utilization heat exchanger (16A) in which a heat medium absorbs heat in the partial defrosting operation. The second fluid pump (8) operates. The second fluid pump (8) corresponds to the second utilization heat exchanger (16B) in which a heat medium releases heat in the partial heating operation. Therefore, in the first utilization heat exchanger (16A), it is possible to suppress cooling of the heat medium in the first secondary flow path (5). As a result, decrease in the ability of each of the first secondary flow path (5) and the second secondary flow path (7) to heat a heating target can be suppressed.

Second Defrosting Action

The flow of a heat medium in the second defrosting action of the present modification is basically the same as the flow of a heat medium in the second defrosting action the fifth modification of the first embodiment. In the second defrosting action, the partial defrosting operation is performed in the second heat medium circuit (C2), and the partial heating operation is performed in the first heat medium circuit (C1). Description of details will be omitted.

In the second defrosting action, the second fluid pump (8) stops. The second fluid pump (8) corresponds to the second utilization heat exchanger (16B) in which a heat medium absorbs heat in the partial defrosting operation. The first fluid pump (6) operates. The first fluid pump (6) corresponds to the first utilization heat exchanger (16A) in which a heat medium releases heat in the partial heating operation. Therefore, in the second utilization heat exchanger (16B), it is possible to suppress cooling of the heat medium in the second secondary flow path (7). As a result, decrease in the ability of each of the first secondary flow path (5) and the second secondary flow path (7) to heat a heating target can be suppressed.

In the above example, the fluid pump (6, 8) that corresponds to the utilization heat exchanger (16A, 16B) in which the heat medium absorbs heat in the in partial defrosting operation is stopped. However, the flow rate of the fluid pump (6, 8) may be reduced. In this case, the flow rate of the fluid pump (6, 8) is made lower than the flow rate of the fluid pump (6, 8) that corresponds to another utilization heat exchanger (16A, 16B). Thus, in the utilization heat exchanger (16A, 16B) in which the heat medium absorbs heat, it is possible to suppress cooling of the heat medium in the secondary flow path (5, 7).

Second Embodiment

Figure 28:
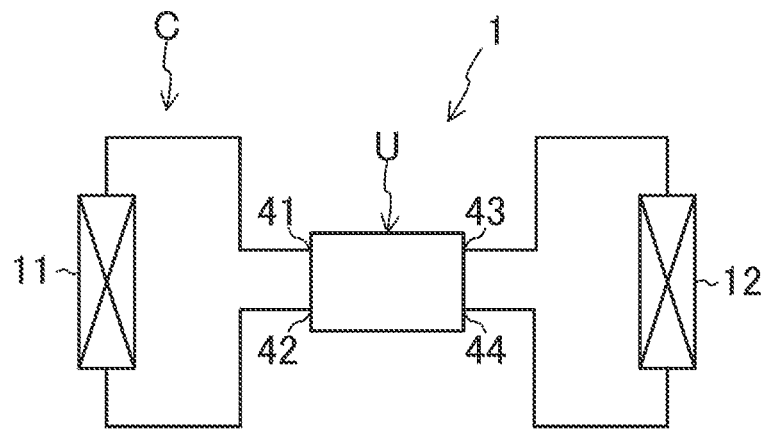
FIG. 28 is a piping diagram of a magnetic refrigeration device according to a second embodiment.
Figure 29:
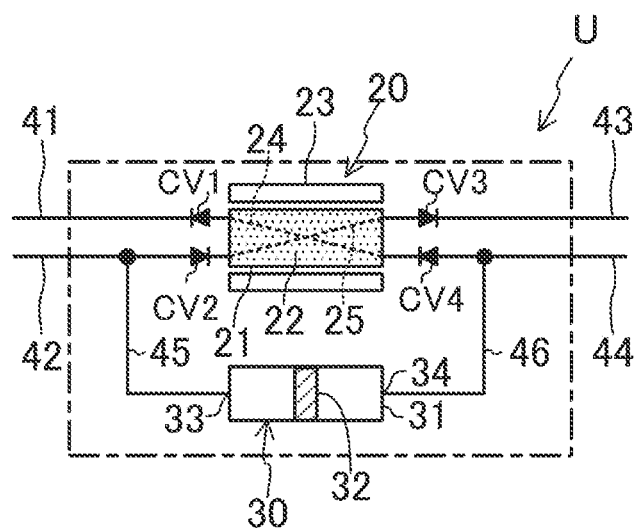
FIG. 29 is a schematic diagram of a magnetic refrigeration unit according to the second embodiment.

A second embodiment includes a single-layer magnetic refrigerator (20). As illustrated in FIGS. 28 and 29, a magnetic refrigeration device (1) according to the second embodiment differs from the magnetic refrigeration device (1) according to the first embodiment in the configurations of the magnetic refrigeration unit (U) and the heat medium circuit (C). The difference from the first embodiment will be mainly described.

As illustrated in FIG. 28, a heat medium circuit (C) of the second embodiment does not have the four-way switching valves (F1, F2) of the first embodiment.

As illustrated in FIG. 29, the magnetic refrigeration unit (U) includes a magnetic refrigerator (20), a reciprocating pump (30), a first outflow pipe (41), a first inflow pipe (42), a second outflow pipe (43), a second inflow pipe (44), first pump-side piping (45), and second pump-side piping (46). The first outflow pipe (41) corresponds to a first outflow portion, and the first inflow pipe (42) corresponds to a first inflow portion. The second outflow pipe (43) corresponds to a second outflow portion, and the second inflow pipe (44) corresponds to a second outflow portion.

The magnetic refrigerator (20) includes a bed (21), a magnetic working substance (22), and a magnetic field modulator (23).

Figure 30:
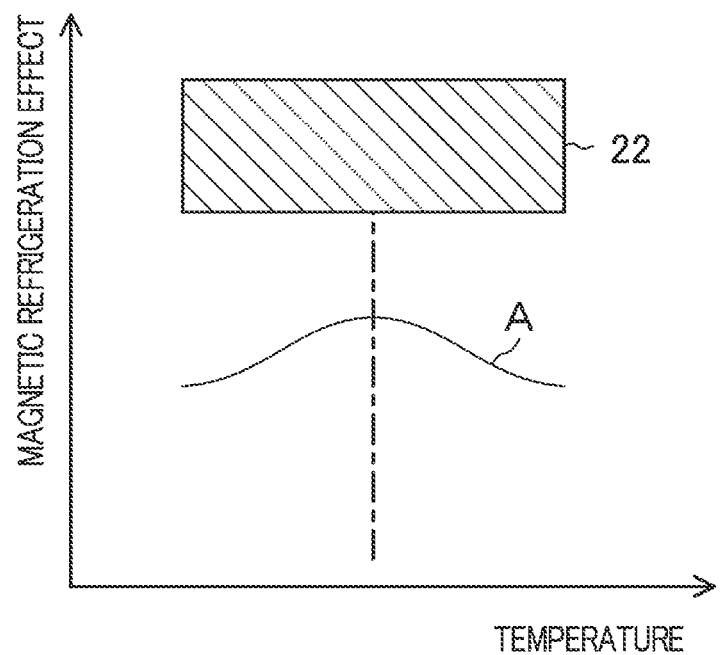
FIG. 30 is a graph schematically representing the relationship between the temperature of a single-layer magnetic refrigerator according to the second embodiment and the magnetic refrigeration effect.

The magnetic refrigerator (20) is a single-layer magnetic refrigerator including a magnetic working substance (22) of one type. The magnetic working substance (22) of one type has a relationship between temperature and magnetic refrigeration effect as shown by, for example, a curve A in FIG. 30. The Curie temperature of the magnetic working substance (22) of one type is set to a normal temperature of a heat medium that flows in each internal flow path (24, 25).

A first internal flow path (24) and a second internal flow path (25) are formed in the bed (21). A first outflow pipe (41) is connected to one end of the first internal flow path (24). A second inflow pipe (44) is connected to the other end of the first internal flow path (24). The first inflow pipe (42) is connected to one end of the second internal flow path (25). The second outflow pipe (43) is connected to the other end of the second internal flow path (25).

A first check valve (CV1) is provided in the first outflow pipe (41). A second check valve (CV2) is provided in the first inflow pipe (42). A third check valve (CV3) is provided in the second outflow pipe (43). A fourth check valve (CV4) is provided in the second inflow pipe (44).

The first check valve (CV1) allows a flow of a heat medium in a direction from the first internal flow path (24) of the magnetic refrigerator (20) toward the indoor heat exchanger (11), and prohibits a flow of the heat medium in the opposite direction. The second check valve (CV2) allows a flow of a heat medium in a direction from the indoor heat exchanger (11) toward the second internal flow path (25) of the magnetic refrigerator (20), and prohibits a flow of the heat medium in the opposite direction. The third check valve (CV3) allows a flow of a heat medium in a direction from the second internal flow path (25) of the magnetic refrigerator (20) toward the outdoor heat exchanger (12), and prohibits a flow of the heat medium in the opposite direction. The fourth check valve (CV4) allows a flow of a heat medium in a direction from the outdoor heat exchanger (12) toward the second internal flow path (25) of the magnetic refrigerator (20), and prohibits a flow of the heat medium in the opposite direction.

The reciprocating pump (30) transports a heat medium of the heat medium circuit (C) in a reciprocating manner. The reciprocating pump (30) corresponds to a reciprocating transport mechanism. The reciprocating pump (30) is constituted by a piston pump. The reciprocating pump (30) includes a pump case (31), a piston (32), and a driving mechanism (not shown). The piston (32) is disposed in the pump case (31). The piston (32) divides the inside of the pump case (31) into two chambers. The reciprocating pump (30) has a first port (33) and a second port (34). One of the chambers of the pump case (31) communicates with the first port (33), and the other chamber communicates with the second port (34).

One end of the first pump-side piping (45) is connected to the first port (33). The other end of the first pump-side piping (45) is connected to a part of the first inflow pipe (42) on the upstream side of the second check valve (CV2). One end of the second pump-side piping (46) is connected to the second port (34). The other end of the second pump-side piping (46) is connected to a part of the second inflow pipe (44) on the upstream side of the fourth check valve (CV4).

The driving mechanism includes a rod that is coupled to the piston (32), a crank that is coupled to the rod, and a motor that drives the crank. The rod reciprocates as the motor rotationally drives the crank. Thus, the piston (32) reciprocates in the pump case (31).

To be specific, in the reciprocating pump (30), a first transport action and a second transport action are alternately and repeatedly performed. With the first transport action (see FIGS. 31(A) and 32(A)), the piston (32) moves toward the first port (33). Thus, a heat medium is discharged from the first port (33). The discharged heat medium flows in the first inflow pipe (42), the second internal flow path (25), and the second outflow pipe (43) in order. With the second transport action (see FIGS. 31(B) and 32(B)), the piston (32) moves toward the second port (34). Thus, a heat medium is discharged from the second port (34). The discharged heat medium flows in the second inflow pipe (44), the first internal flow path (24), and the first outflow pipe (41) in order.

The magnetic refrigeration device (1) according to the second embodiment includes a control device (100). The control device (100) controls the magnetic refrigeration unit (U).

Operational Actions of Magnetic Refrigeration Device

The magnetic refrigeration device (1) according to the second embodiment performs an air-cooling operation, an air-heating operation, and a defrosting operation.

Air-Cooling Operation

In the air-cooling operation, a third action and a fourth action are alternately and repeatedly performed.

Figure 31A:
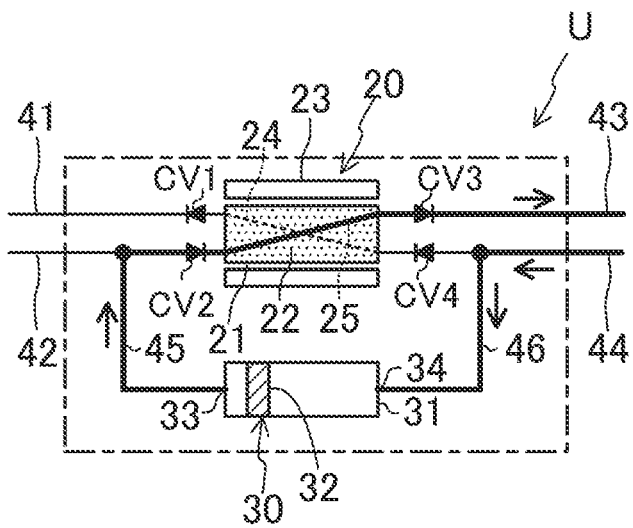
FIG. 31A and FIG. 31B show schematic diagrams of the magnetic refrigeration unit according to the second embodiment.
Figure 31A:

As illustrated in FIG. 31A, in the third action, the first modulation action of the magnetic field modulator (23) and the first transport action of the reciprocating pump (30) are simultaneously performed. With the third action, a heat medium is heated in the second internal flow path (25) of the magnetic refrigerator (20). The heated heat medium flows out from the second outflow pipe (43). At the same time, a heat medium of the heat medium circuit (C) flows into the second port (34) of the pump case (31).

Figure 31B:
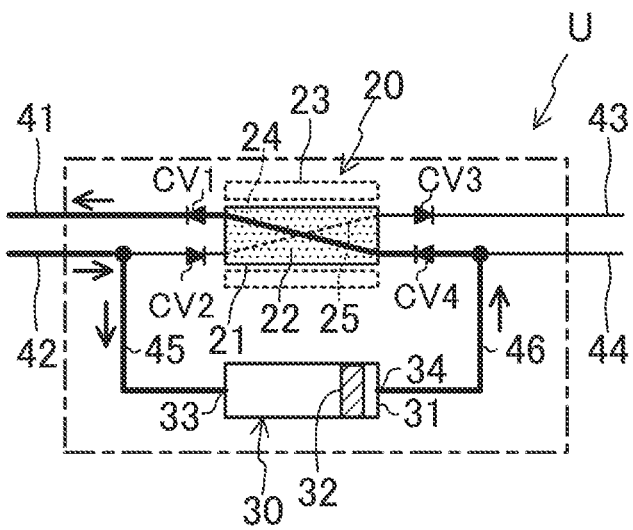

As illustrated in FIG. 31B, in the fourth action, the second modulation action of the magnetic field modulator (23) and the second transport action of the reciprocating pump (30) are simultaneously performed. With the fourth action, a heat medium is cooled in the first internal flow path (24) of the magnetic refrigerator (20). The cooled heat medium flows out from the first outflow pipe (41). At the same time, a heat medium of the heat medium circuit (C) flows into the first port (33) of the pump case (31).

Figure 33:
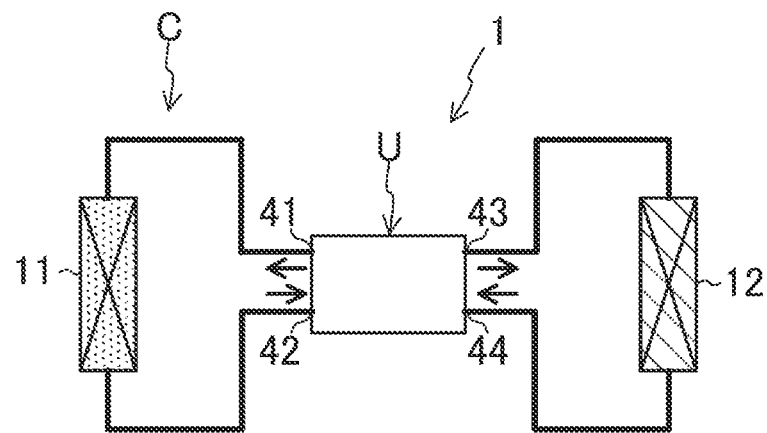
FIG. 33 is a piping diagram for illustrating an air-cooling operation of the magnetic refrigeration device according to the second embodiment.

As illustrated in FIG. 33, a heat medium heated by the magnetic refrigeration unit (U) flows in the outdoor heat exchanger (12). In the outdoor heat exchanger (12), the heat medium releases heat to outdoor air. The heat medium that has released heat in the outdoor heat exchanger (12) returns to the magnetic refrigeration unit (U).

A heat medium cooled by the magnetic refrigeration unit (U) flows in the indoor heat exchanger (11). In the indoor heat exchanger (11), the heat medium absorbs heat from indoor air. As a result, the indoor air is cooled. The heat medium that has absorbed heat in the indoor heat exchanger (11) returns to the magnetic refrigeration unit (U).

Air-Heating Operation

In the magnetic refrigeration unit (U), a fifth action and a sixth action are alternately and repeatedly performed.

Figure 32A:
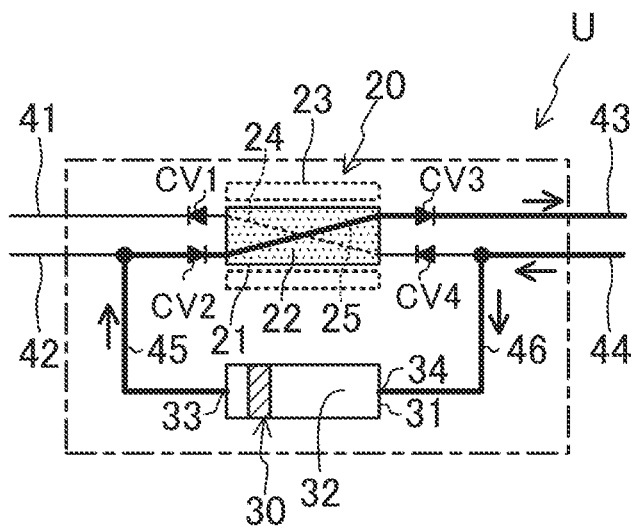
FIG. 32A and FIG. 32B show schematic diagrams of the magnetic refrigeration unit according to the second embodiment.
Figure 32A:
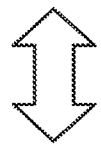

As illustrated in FIG. 32A, in the fifth action, the second modulation action of the magnetic field modulator (23) and the first transport action of the reciprocating pump (30) are simultaneously performed. With the fifth action, a heat medium is cooled in the second internal flow path (25) of the magnetic refrigerator (20). The cooled heat medium flows out from the second outflow pipe (43). At the same time, a heat medium of the heat medium circuit (C) flows into the second port (34) of the pump case (31).

Figure 32B:
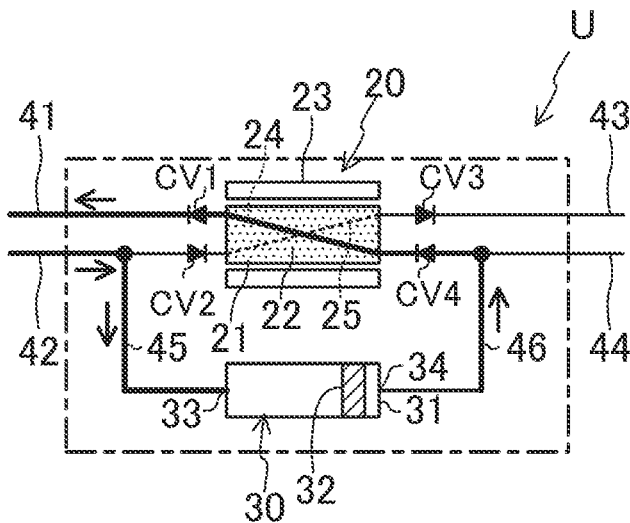

As illustrated in FIG. 32B, in the sixth action, the first modulation action of the magnetic field modulator (23) and the second transport action of the reciprocating pump (30) are simultaneously performed. With the sixth action, a heat medium is heated in the first internal flow path (24) of the magnetic refrigerator (20). The heated heat medium flows out from the first outflow pipe (41). At the same time, a heat medium of the heat medium circuit (C) flows into the first port (33) of the pump case (31).

Figure 34:
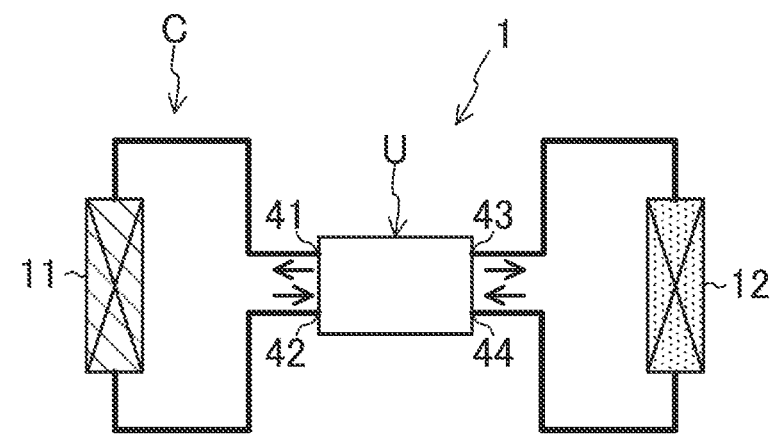
FIG. 34 is a piping diagram for illustrating an air-heating operation of the magnetic refrigeration device according to the second embodiment.

As illustrated in FIG. 34, the heat medium cooled by the magnetic refrigeration unit (U) flows in the outdoor heat exchanger (12). In the outdoor heat exchanger (12), the heat medium absorbs heat from outdoor air. The heat medium that has absorbed heat in the outdoor heat exchanger (12) returns to the magnetic refrigeration unit (U).

A heat medium heated by the magnetic refrigeration unit (U) flows in the indoor heat exchanger (11). In the indoor heat exchanger (11), the heat medium releases heat to indoor air. As a result, the indoor air is heated. The heat medium that has released heat in the indoor heat exchanger (11) returns to the magnetic refrigeration unit (U).

Defrosting Operation

Figure 35:
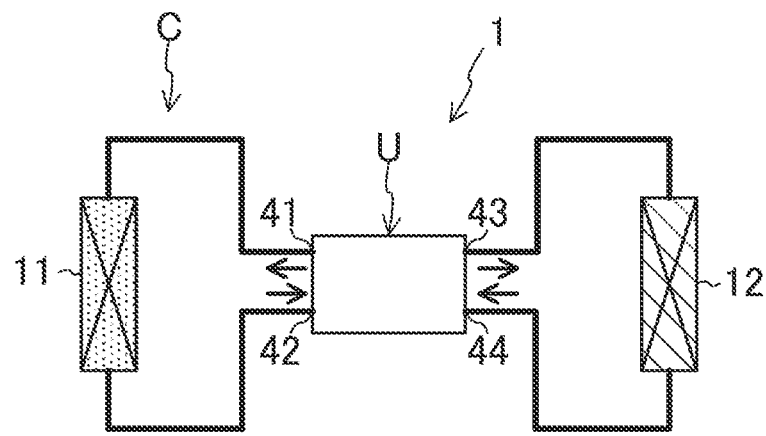
FIG. 35 is a piping diagram for illustrating a defrosting operation of the magnetic refrigeration device according to the second embodiment.

In the defrosting operation illustrated in FIG. 35, actions that are basically the same as those of the air-cooling operation are performed. In the magnetic refrigeration unit (U), the third action and the fourth action are alternately and repeatedly performed.

A heat medium heated by the magnetic refrigeration unit (U) flows in the outdoor heat exchanger (12). At the outdoor heat exchanger (12), frost on the surface of the outdoor heat exchanger (12) is melted by the heat medium flowing therein. The heat medium that has been used to defrost the outdoor heat exchanger (12) returns to the magnetic refrigeration unit (U).

A heat medium cooled by the magnetic refrigeration unit (U) flows in the indoor heat exchanger (11). In the indoor heat exchanger (11), the heat medium absorbs heat from indoor air. The heat medium that has absorbed heat in the indoor heat exchanger (11) returns to the magnetic refrigeration unit (U).

Regarding Temperature Gradient of Magnetic Refrigerator

After switching from the air-heating operation to the defrosting operation or after switching from the defrosting operation to the air-heating operation, the temperature gradient of the magnetic refrigerator (20) may decrease, as in the first embodiment. However, because the magnetic refrigerator (20) of the second embodiment is a single-layer magnetic refrigerator, the magnetic refrigeration effect thereof does not considerably influence change in the temperature gradient. This is because the influence of temperature on the magnetic refrigeration effect of the single-layer magnetic refrigerator (20) is small, compared with the cascade magnetic refrigerator (20). Therefore, at the start of a defrosting operation or at the start of an air-heating operation, the magnetic refrigeration effect of the magnetic refrigerator (20) does not considerably decrease.

Advantageous Effects of Second Embodiment

A feature of the present modification is that: the magnetic refrigerator (20) is a single-layer magnetic refrigerator (20) including a magnetic working substance (22) of one type; the heat medium circuit (C) includes a first outflow portion (41), a first inflow portion (42), a second outflow portion (43), and a second inflow portion (44) each of which communicates with the internal flow path (24, 25) of the magnetic refrigerator (20); in the heating operation, a heat medium heated by the magnetic refrigerator (20) flows in the first outflow portion (41), the first heat exchanger (11, 16), and the first inflow portion (42), and a heat medium cooled by the magnetic refrigerator (20) flows in the second outflow portion (43), the second heat exchanger (12), and the second inflow portion (44); and, in the defrosting operation, a heat medium cooled by the magnetic refrigerator (20) flows in the first outflow portion (41), the first heat exchanger (11, 16), and the first inflow portion (42), and a heat medium heated by the magnetic refrigerator (20) flows in the second outflow portion (43), the second heat exchanger (12), and the second inflow portion (44).

With this feature, in the defrosting operation, heat of the heat medium heated by the single-layer magnetic refrigerator (20) can be used to defrost the outdoor heat exchanger (12). In the defrosting operation, heat absorbed into the heat medium in the indoor heat exchanger (11) can also be used to defrost the outdoor heat exchanger (12).

The magnetic refrigeration effect of the single-layer magnetic refrigerator (20) does not decrease considerably due to the temperature of the inside thereof. Therefore, even if the temperature gradient of the magnetic refrigerator (20) decreases due to switching between the air-heating operation and the defrosting operation, the magnetic refrigeration effect does not decrease considerably.

First Modification of Second Embodiment

Figure 36:
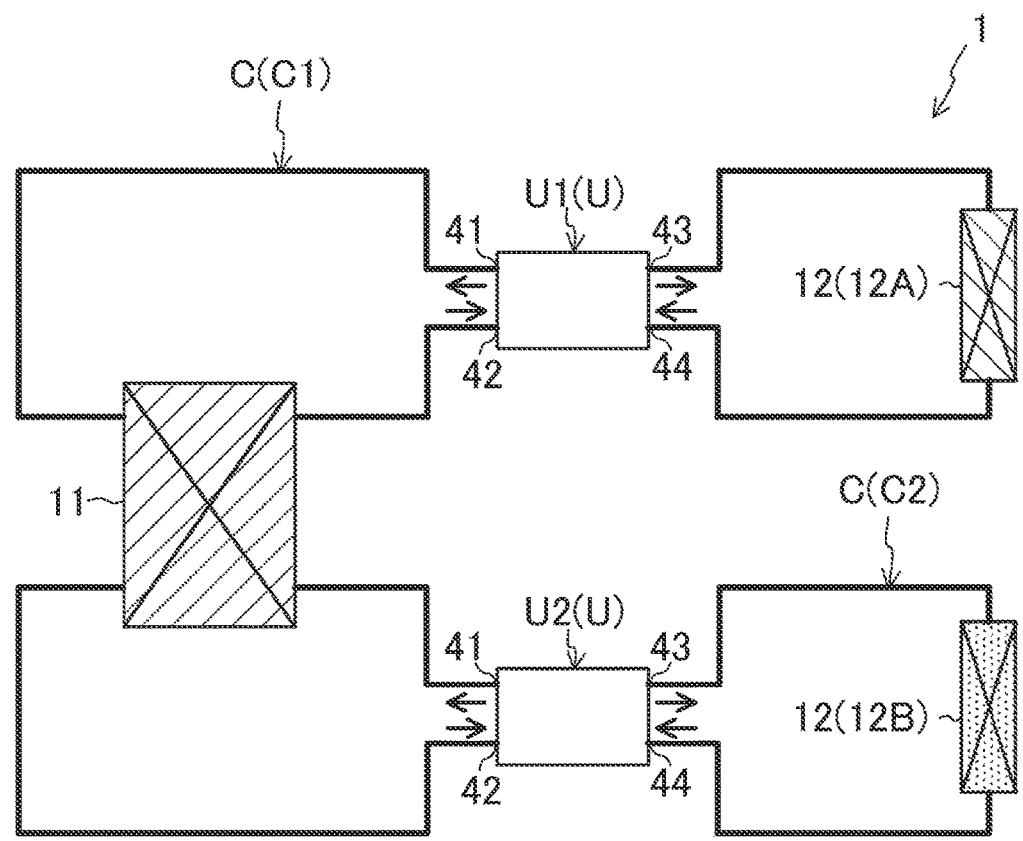
FIG. 36 is a piping diagram for illustrating a defrosting operation (first defrosting action) of a magnetic refrigeration device according to a first modification of the second embodiment.

A first modification of the second embodiment corresponds to the third modification of the first embodiment. As illustrated in FIG. 36, a magnetic refrigeration device (1) according to the present modification includes a first heat medium circuit (C1) and a second heat medium circuit (C2). The first heat medium circuit (C1) includes a first magnetic refrigeration unit (U1) and a first outdoor heat exchanger (12A). The second heat medium circuit (C2) includes a second magnetic refrigeration unit (U2) and a second outdoor heat exchanger (12B). One indoor heat exchanger (11) is shared by the first heat medium circuit (C1) and the second heat medium circuit (C2).

Operational Actions of Magnetic Refrigeration Device

The first modification of the second embodiment performs an air-cooling operation, an air-heating operation, and a defrosting operation. The defrosting operation includes a first defrosting action and a second defrosting action.

Air-Cooling Operation

In the air-cooling operation, the third action and the fourth action are alternately and repeatedly performed in the first magnetic refrigeration unit (U1) and the second magnetic refrigeration unit (U2). A heat medium heated by the first magnetic refrigeration unit (U1) releases heat in the first outdoor heat exchanger (12A). A heat medium cooled by the first magnetic refrigeration unit (U1) absorbs heat in the indoor heat exchanger (11). A heat medium heated by the second magnetic refrigeration unit (U2) releases heat in the second outdoor heat exchanger (12B). A heat medium cooled by the second magnetic refrigeration unit (U2) absorbs heat in the indoor heat exchanger (11).

Air-Heating Operation

In the air-heating operation, the fifth action and the sixth action are alternately and repeatedly performed in the first magnetic refrigeration unit (U1) and the second magnetic refrigeration unit (U2). A heat medium cooled by the first magnetic refrigeration unit (U1) absorbs heat in the first outdoor heat exchanger (12A). A heat medium heated by the first magnetic refigeration unit (U1) releases heat in the indoor heat exchanger (11). A heat medium cooled by the second magnetic refrigeration unit (U2) absorbs heat in the second outdoor heat exchanger (12B). A heat medium heated by the second magnetic refrigeration unit (U2) releases heat in the indoor heat exchanger (11).

Defrosting Operation

The defrosting operation includes a first defrosting action and a second defrosting action. In the first defrosting action, defrosting of the first outdoor heat exchanger (12A) is performed, and air-heating is performed by the indoor heat exchanger (11). In the second defrosting action, defrosting of the second outdoor heat exchanger (12B) is performed, and air-heating is performed by the indoor heat exchanger (11).

First Defrosting Action

In the first defrosting action illustrated in FIG. 36, the third action and the fourth action are alternately and repeatedly performed in the first magnetic refrigeration unit (U1). The fifth action and the sixth action are alternately and repeatedly performed in the second magnetic refrigeration unit (U2).

A heat medium heated by the first magnetic refrigeration unit (U1) releases heat in the first outdoor heat exchanger (12A). Thus, defrosting of the first outdoor heat exchanger (12A) is performed. A heat medium cooled by the first magnetic refrigeration unit (U1) absorbs heat in the indoor heat exchanger (11).

A heat medium cooled by the second magnetic refrigeration unit (U2) absorbs heat in the second outdoor heat exchanger (12B). A heat medium heated by the second magnetic refrigeration unit (U2) releases heat in the indoor heat exchanger (11).

Second Defrosting Action

Figure 37:
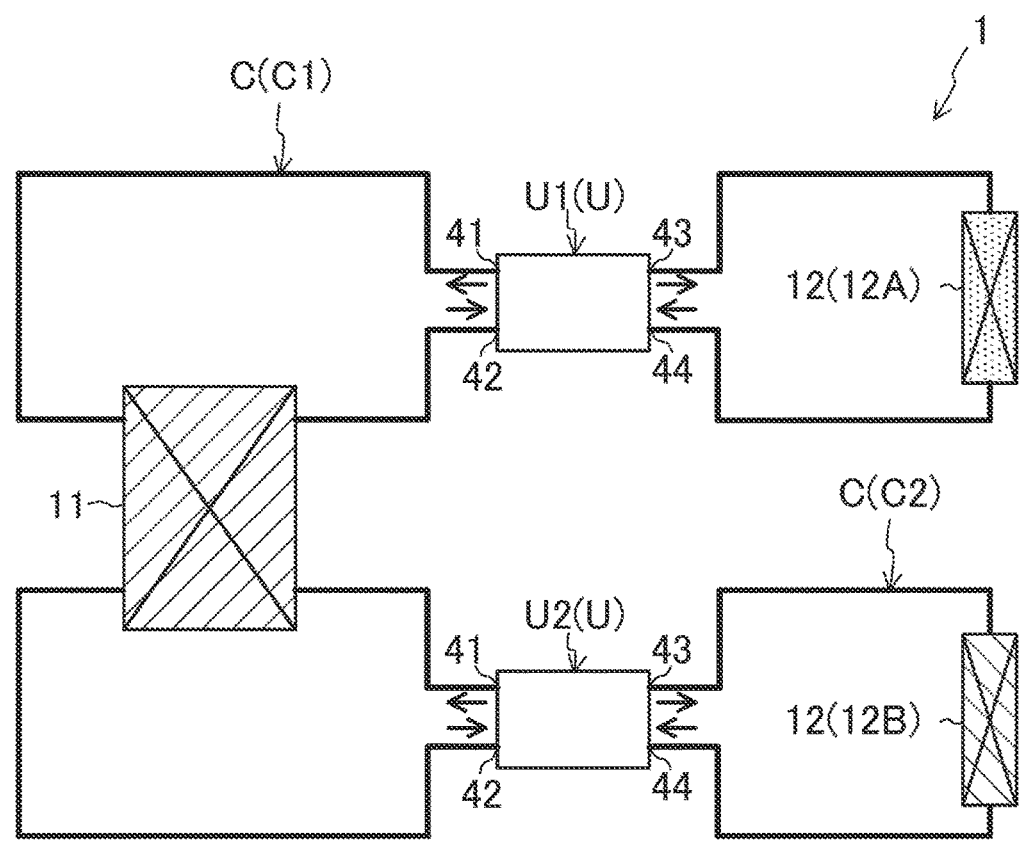
FIG. 37 is a piping diagram for illustrating a defrosting operation (second defrosting action) of the magnetic refrigeration device according to the first modification of the second embodiment.

In the second defrosting action illustrated in FIG. 37, the fifth action and the sixth action are alternately and repeatedly performed in the first magnetic refrigeration unit (U1). The third action and the fourth action are alternately and repeatedly performed in the second magnetic refrigeration unit (U2).

A heat medium cooled by the first magnetic refrigeration unit (U1) absorbs heat in the first outdoor heat exchanger (12A). A heat medium heated by the first magnetic refrigeration unit (U1) releases heat in the indoor heat exchanger (11).

A heat medium heated by the second magnetic refrigeration unit (U2) releases heat in the second outdoor heat exchanger (12B). Thus, defrosting of the second outdoor heat exchanger (12B) is performed. A heat medium cooled by the second magnetic refrigeration unit (U2) absorbs heat in the indoor heat exchanger (11).

Output Control of Magnetic Refrigeration Unit During Defrosting Operation

In the first defrosting action, the output of the second magnetic refrigeration unit (U2) is made larger than the output of the first magnetic refrigeration unit (U1). To be specific, the frequency f2 of the second magnetic refrigeration unit (U2) is made higher than the frequency f1 of the first magnetic refrigeration unit (U1). As a result, it is possible to suppress decrease in the air-heating ability of the indoor heat exchanger (11) in the first defrosting action.

In the second defrosting action, the output of the first magnetic refrigeration unit (U1) is made larger than the output of the second magnetic refrigeration unit (U2). To be specific, the frequency f1 of the first magnetic refrigeration unit (U1) is made higher than the frequency f2 of the second magnetic refrigeration unit (U2). As a result, it is possible to suppress decrease in the air-heating ability of the indoor heat exchanger (11) in the second defrosting action.

Second Modification of Second Embodiment

Figure 38:
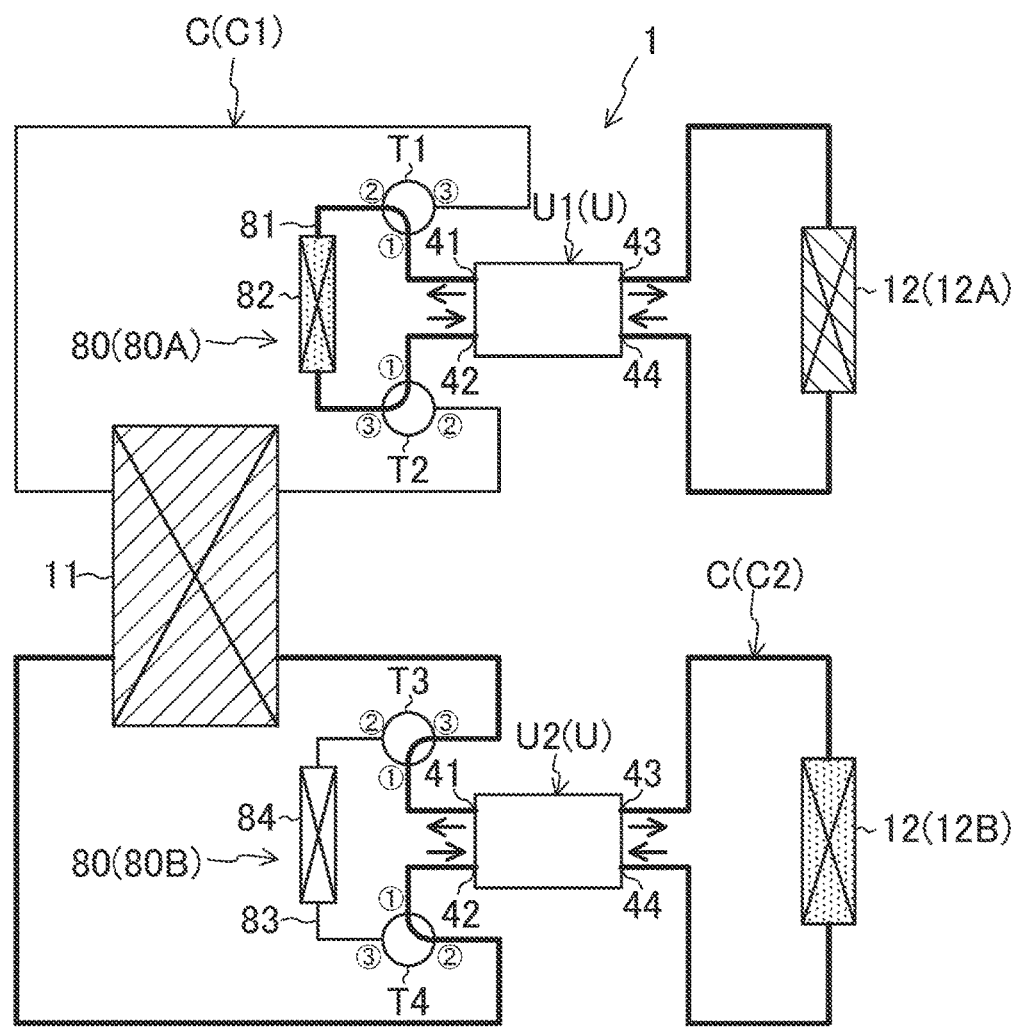
FIG. 38 is a piping diagram for illustrating a defrosting operation (first defrosting action) of the magnetic refrigeration device according to a second modification of the second embodiment.

A second modification of the second embodiment corresponds to the fourth modification of the first embodiment. As illustrated in FIG. 38, a magnetic refrigeration device (1) according to the present modification includes a first auxiliary circuit (80A) and a second auxiliary circuit (80B), as with the fourth modification of the first embodiment.

Operational Actions of Magnetic Refrigeration Device

The second modification of the second embodiment performs an air-cooling operation, an air-heating operation, and a defrosting operation. The defrosting operation includes a first defrosting action and a second defrosting action.

Air-Cooling Operation

In the air-cooling operation, the third action and the fourth action are alternately and repeatedly performed in the first magnetic refrigeration unit (U1) and the second magnetic refrigeration unit (U2). The first three-way valve (T1) is set to the second state, the second three-way valve (T2) is set to the first state, the third three-way valve (T3) is set to the second state, and the fourth three-way valve (T4) is set to the first state.

A heat medium heated by the first magnetic refrigeration unit (U1) releases heat in the first outdoor heat exchanger (12A). A heat medium cooled by the first magnetic refrigeration unit (U1) absorbs heat in the indoor heat exchanger (11). A heat medium heated by the second magnetic refrigeration unit (U2) releases heat in the second outdoor heat exchanger (12B). A heat medium cooled by the second magnetic refrigeration unit (U2) absorbs heat in the indoor heat exchanger (11).

Air-Heating Operation

In the air-heating operation, the fifth action and the sixth action are alternately and repeatedly performed in the first magnetic refrigeration unit (U1) and the second magnetic refrigeration unit (U2). The first three-way valve (T1) is set to the second state, the second three-way valve (T2) is set to the first state, the third three-way valve (T3) is set to the second state, and the fourth three-way valve (T4) is set to the first state.

A heat medium cooled by the first magnetic refrigeration unit (U1) absorbs heat in the first outdoor heat exchanger (12A). A heat medium heated by the first magnetic refrigeration unit (U1) releases heat in the indoor heat exchanger (11). A heat medium cooled by the second magnetic refrigeration unit (U2) absorbs heat in the second outdoor heat exchanger (12B). A heat medium heated by the second magnetic refrigeration unit (U2) releases heat in the indoor heat exchanger (11).

Defrosting Operation

The defrosting operation includes a first defrosting action and a second defrosting action. In the first defrosting action, defrosting of the first outdoor heat exchanger (12A) is performed, and air-heating is performed by the indoor heat exchanger (11). In the second defrosting action, defrosting of the second outdoor heat exchanger (12B) is performed, and air-heating is performed by the indoor heat exchanger (11).

First Defrosting Action

In the first defrosting action illustrated in FIG. 38, the third action and the fourth action are alternately and repeatedly performed in the first magnetic refrigeration unit (U1). The fifth action and the sixth action are alternately and repeatedly performed in the second magnetic refrigeration unit (U2). The first three-way valve (T1) is set to the first state, the second three-way valve (T2) is set to the second state, the third three-way valve (T3) is set to the second state, and the fourth three-way valve (T4) is set to the first state.

A heat medium heated by the first magnetic refrigeration unit (U1) releases heat in the first outdoor heat exchanger (12A). Thus, defrosting of the first outdoor heat exchanger (12A) is performed. A heat medium cooled by the first magnetic refrigeration unit (U1) absorbs heat in the first auxiliary heat exchanger (82).

A heat medium cooled by the second magnetic refrigeration unit (U2) absorbs heat in the second outdoor heat exchanger (12B). A heat medium heated by the second magnetic refrigeration unit (U2) releases heat in the indoor heat exchanger (11).

Second Defrosting Action

Figure 39:
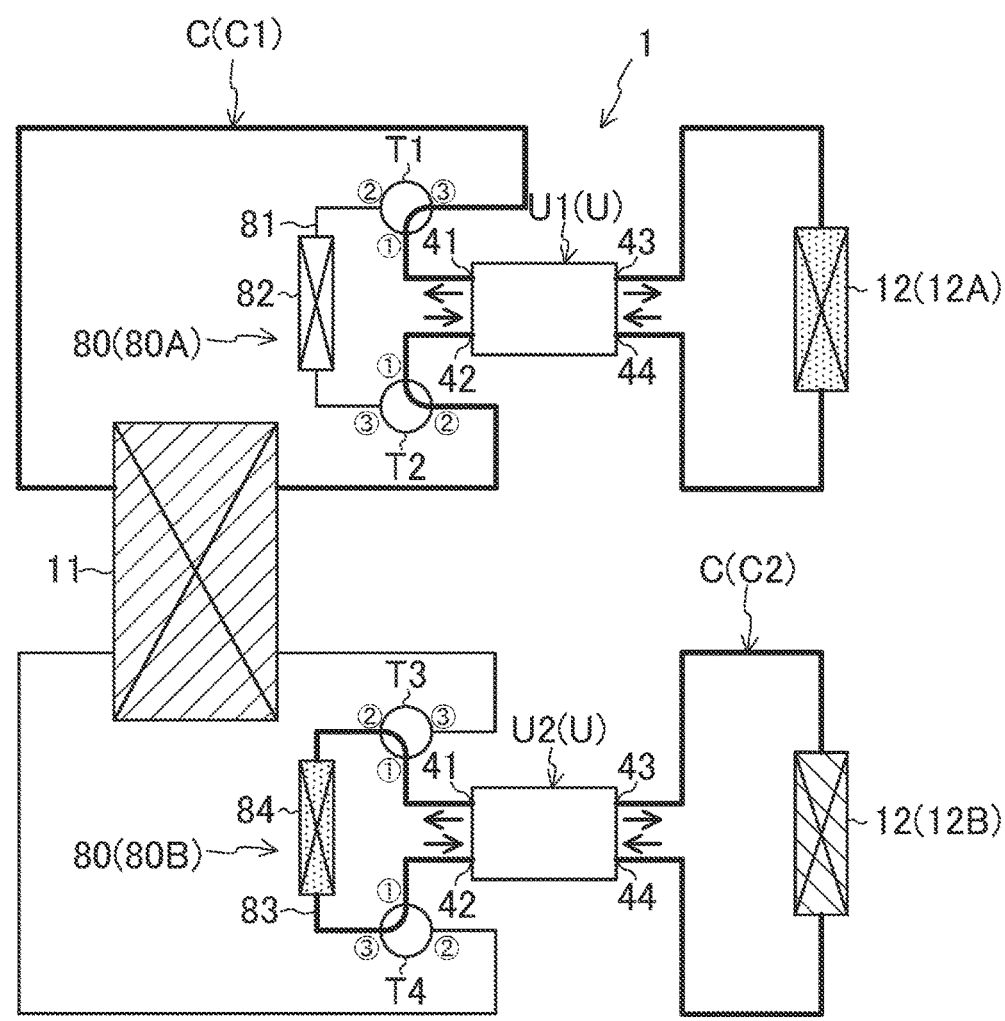
FIG. 39 is a piping diagram for illustrating a defrosting operation (second defrosting action) of the magnetic refrigeration device according to the second modification of the second embodiment.

In the second defrosting action illustrated in FIG. 39, the fifth action and the sixth action are alternately and repeatedly performed in the first magnetic refrigeration unit (U1). The third action and the fourth action are alternately and repeatedly performed in the second magnetic refrigeration unit (U2). The first three-way valve (T1) is set to the second state, the second three-way valve (T2) is set to the first state, the third three-way valve (T3) is set to the first state, and the fourth three-way valve (T4) is set to the second state.

A heat medium cooled by the first magnetic refrigeration unit (U1) absorbs heat in the first outdoor heat exchanger (12A). A heat medium heated by the first magnetic refrigeration unit (U1) releases heat in the indoor heat exchanger (11).

A heat medium heated by the second magnetic refrigeration unit (U2) releases heat in the second outdoor heat exchanger (12B). Thus, defrosting of the second outdoor heat exchanger (12B) is performed. A heat medium cooled by the second magnetic refrigeration unit (U2) absorbs heat in the second auxiliary heat exchanger (84).

Third Modification of Second Embodiment

Figure 40:
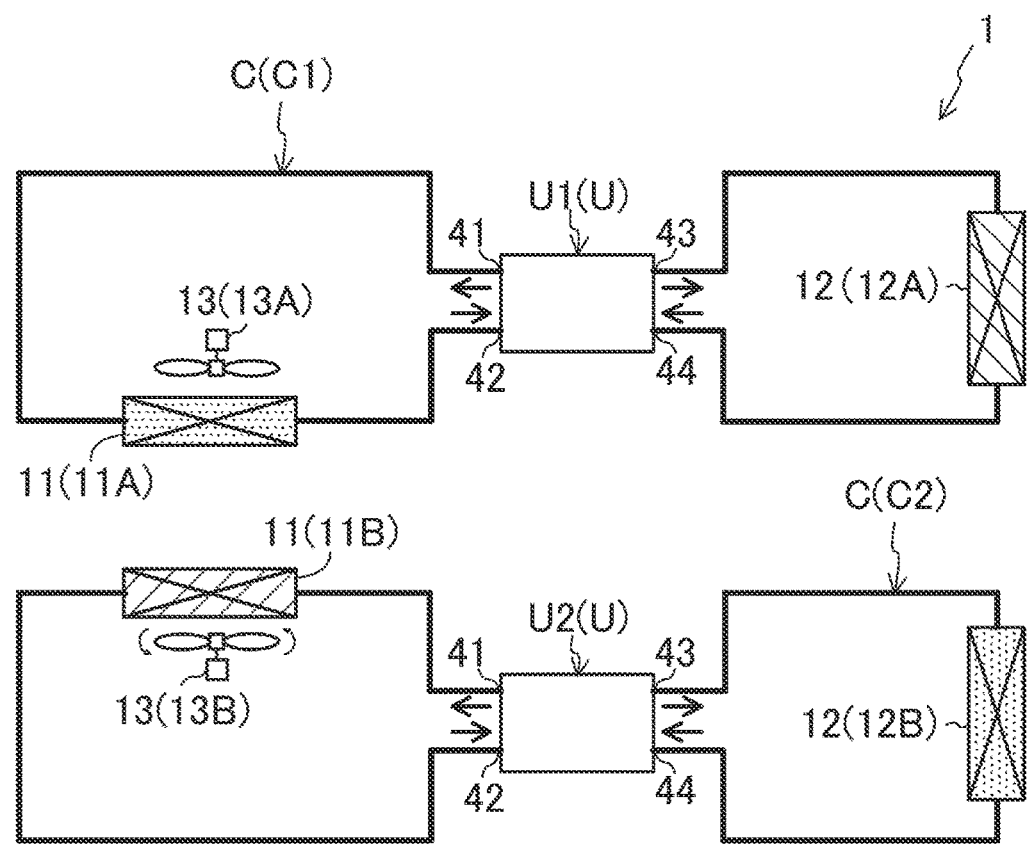
FIG. 40 is a piping diagram for illustrating a defrosting operation (first defrosting action) of a magnetic refrigeration device according to a third modification of the second embodiment.

A third modification of the second embodiment corresponds to the fifth modification of the first embodiment. As illustrated in FIG. 40, a magnetic refrigeration device (1) according to the present modification includes a first fan (13A) and a second fan (13B), as with the fifth modification of the first embodiment.

Operational Actions of Magnetic Refrigeration Device

The third modification of the second embodiment performs an air-cooling operation, an air-heating operation, and a defrosting operation. The defrosting operation includes a first defrosting action and a second defrosting action.

Air-Cooling Operation

In the air-cooling operation, the third action and the fourth action are alternately and repeatedly performed in the first magnetic refrigeration unit (U1) and the second magnetic refrigeration unit (U2). The first fan (13A) and the second fan (13B) operate.

A heat medium heated by the first magnetic refrigeration unit (U1) releases heat in the first outdoor heat exchanger (12A). A heat medium cooled by the first magnetic refrigeration unit (U1) absorbs heat in the first indoor heat exchanger (11A). A heat medium heated by the second magnetic refrigeration unit (U2) releases heat in the second outdoor heat exchanger (12B). A heat medium cooled by the second magnetic refrigeration unit (U2) absorbs heat in the second indoor heat exchanger (11B).

Air-Heating Operation

In the air-heating operation, the fifth action and the sixth action are alternately and repeatedly performed in the first magnetic refrigeration unit (U1) and the second magnetic refrigeration unit (U2). The first fan (13A) and the second fan (13B) operate.

A heat medium cooled by the first magnetic refrigeration unit (U1) absorbs heat in the first outdoor heat exchanger (12A). A heat medium heated by the first magnetic refrigeration unit (U1) releases heat in the first indoor heat exchanger (11A). A heat medium cooled by the second magnetic refrigeration unit (U2) absorbs heat in the second outdoor heat exchanger (12B). A heat medium heated by the second magnetic refrigeration unit (U2) releases heat in the second indoor heat exchanger (11B).

Defrosting Operation

The defrosting operation includes a first defrosting action and a second defrosting action. In the first defrosting action, defrosting of the first outdoor heat exchanger (12A) is performed, and air-heating is performed by the second indoor heat exchanger (11B). In the second defrosting action, defrosting of the second outdoor heat exchanger (12B) is performed, and air-heating is performed by the first indoor heat exchanger (11A).

First Defrosting Action

In the first defrosting action illustrated in FIG. 40, the third action and the fourth action are alternately and repeatedly performed in the first magnetic refrigeration unit (U1). The fifth action and the sixth action are alternately and repeatedly performed in the second magnetic refrigeration unit (U2). The first fan (13A) stops, and the second fan (13B) operates.

A heat medium heated by the first magnetic refrigeration unit (U1) releases heat in the first outdoor heat exchanger (12A). Thus, defrosting of the first outdoor heat exchanger (12A) is performed. A heat medium cooled by the first magnetic refrigeration unit (U1) flows in the first indoor heat exchanger (11A). Because the first fan (13A) is stopped, heat transfer between the heat medium in the first indoor heat exchanger (11A) and air is suppressed.

A heat medium cooled by the second magnetic refrigeration unit (U2) absorbs heat in the second outdoor heat exchanger (12B). A heat medium heated by the second magnetic refrigeration unit (U2) releases heat in the second indoor heat exchanger (11B). Because the second fan (13B) is operating, heat transfer between the heat medium in the second indoor heat exchanger (11B) and air is promoted.

Second Defrosting Action

Figure 41:
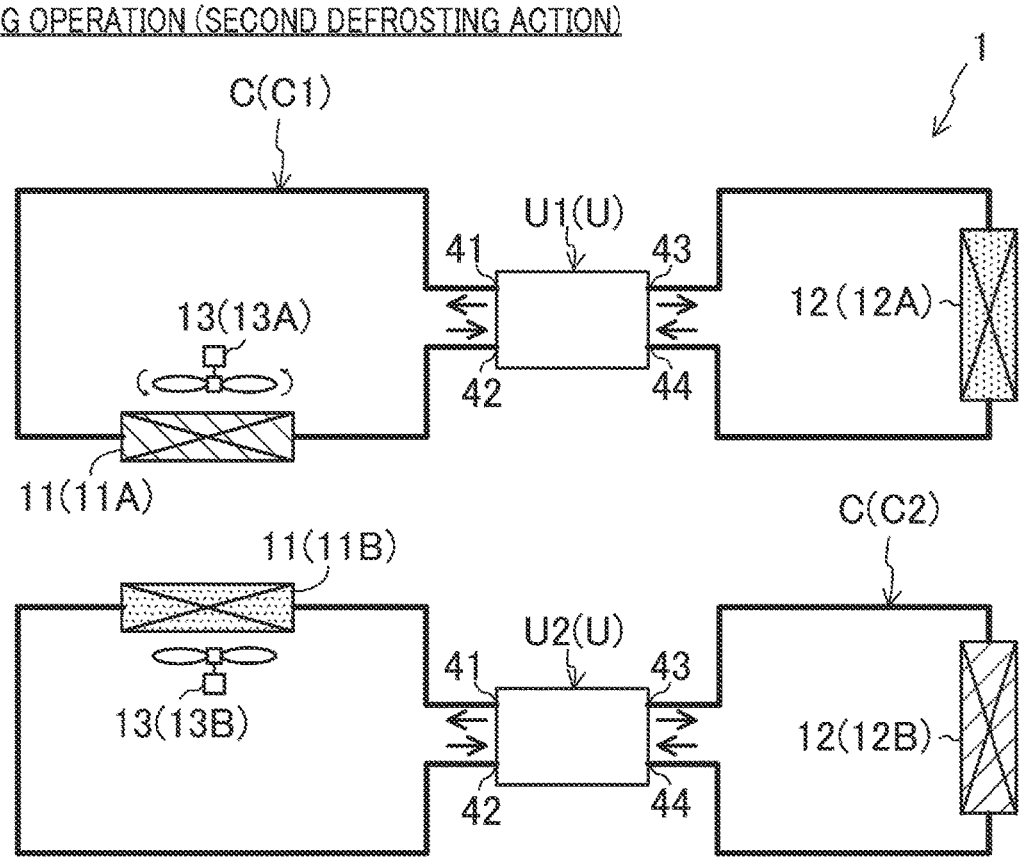
FIG. 41 is a piping diagram for illustrating a defrosting operation (second defrosting action) of the magnetic refrigeration device according to the third modification of the second embodiment.

In the second defrosting action illustrated in FIG. 41, the fifth action and the sixth action are alternately and repeatedly performed in the first magnetic refrigeration unit (U1). The third action and the fourth action are alternately and repeatedly performed in the second magnetic refrigeration unit (U2). The first fan (13A) operates, and the second fan (13B) stops.

A heat medium cooled by the first magnetic refrigeration unit (U1) absorbs heat in the first outdoor heat exchanger (12A). A heat medium heated by the first magnetic refrigeration unit (U1) releases heat in the first indoor heat exchanger (11A). Because the first fan (13A) is operating, heat transfer between the heat medium in the first indoor heat exchanger (11A) and air is promoted.

A heat medium heated by the second magnetic refrigeration unit (U2) releases heat in the second outdoor heat exchanger (12B). Thus, defrosting of the second outdoor heat exchanger (12B) is performed. A heat medium cooled by the second magnetic refrigeration unit (U2) flows in the second indoor heat exchanger (11B). Because the second fan (13B) is stopped, heat transfer between the heat medium in the second indoor heat exchanger (11B) and air is suppressed.

Fourth Modification of Second Embodiment

Figure 42:
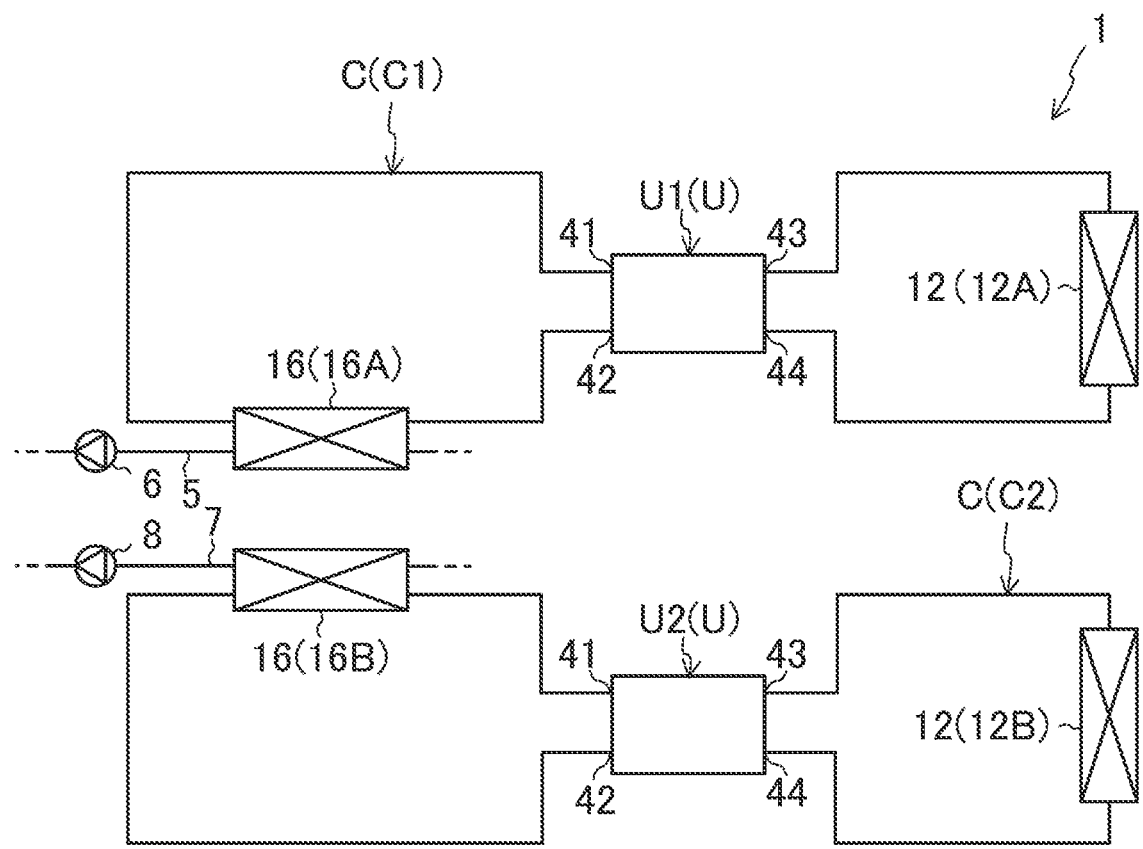
FIG. 42 is a piping diagram of a magnetic refrigeration device according to a fourth modification of the second embodiment.

A fourth modification of the second embodiment corresponds to the sixth modification of the first embodiment. As illustrated in FIG. 42, a magnetic refrigeration device (1) according to the present modification includes a first utilization heat exchanger (16A) and a second utilization heat exchanger (16B), as with the sixth modification of the first embodiment.

The first utilization heat exchanger (16A) includes a heat-transfer flow path that communicates with the first heat medium circuit (C1) and a heat-transfer flow path that communicates with a first secondary flow path (5). The first utilization heat exchanger (16A) causes a heat medium in the first heat medium circuit (C1) and a heat medium in the first secondary flow path (5) to exchange heat. A first fluid pump (6) is provided in the first secondary flow path (5).

The second utilization heat exchanger (16B) includes a heat-transfer flow path that communicates with the second heat medium circuit (C2) and a heat-transfer flow path that communicates with a second secondary flow path (7). The second utilization heat exchanger (16B) causes a heat medium in the second heat medium circuit (C2) and a heat medium in the second secondary flow path (7) to exchange heat. A second fluid pump (8) is provided in the second secondary flow path (7). The heat medium in the first secondary flow path (5) and the heat medium in the second secondary flow path (7) cool or heat the same target.

Also in the fourth modification of the second embodiment, a cooling operation, a heating operation, and a defrosting operation are performed, as in the sixth modification of the first embodiment. Basic actions and advantageous effects are similar to those of the sixth modification of the first embodiment.

Other Embodiments

Each of the embodiments and the modifications described above may be configured as follows.

The magnetic field modulator (23) may be, for example, of any of the following 1) to 4) types, or may be of another type.

1) a linear drive type using a permanent magnet
2) a rotational drive type using a permanent magnet
3) a stationary type using an electromagnet
4) a stationary type using an electromagnet and a permanent magnet The magnetic refrigeration device (1) (solid-state refrigeration device) may include two or more indoor heat exchangers (11) and may include two or more outdoor heat exchangers (12).

The magnetic refrigeration device (1) (solid-state refrigeration device) may cool air in an inner space of a refrigerator or a freezer. In this configuration, the first heat exchanger (11) is used as a heat-source heat exchanger, and the second heat exchanger (12) is used as a utilization heat exchanger. The utilization heat exchanger is a heat exchanger that cools air in the inner space. In this case, an operation in which a heat medium releases heat in the heat-source heat exchanger and a heat medium absorbs heat in the utilization heat exchanger corresponds to a heating operation. An operation in which a heat medium absorbs heat in the heat-source heat exchanger and a heat medium releases heat in the utilization heat exchanger corresponds to a defrosting operation.

The magnetic refrigeration device (1) (solid-state refrigeration device) may be a water heater that generates heated water by using a heat medium in the first heat exchanger (11).

The solid-state refrigeration device may use a method other than the magnetic refrigeration method of inducing a magnetocaloric effect in the magnetic working substance (22). A solid refrigerant substance (22) here includes a substance, such as a plastic crystal, that has properties between those of a liquid and those of a solid.

Examples of a solid-state refrigeration device using another method include: 1) a method of inducing an electrocaloric effect in a solid refrigerant substance; 2) a method of inducing a barocaloric effect in a solid refrigerant substance; and 3) a method of inducing an elastocaloric effect in a solid refrigerant substance.

In a solid-state refrigeration device using the method 1), an inducer applies an electric-field fluctuation to the solid refrigerant substance. Thus, the solid refrigerant substance generates heat or absorbs heat by, for example, undergoing a phase transition from a ferroelectric phase to a paraelectric phase.

In a solid-state refrigeration device using the method 2), the solid refrigerant substance undergoes a phase transition and generates heat or absorbs heat as an inducer applies a pressure fluctuation to the solid refrigerant substance.

In a solid-state refrigeration device using the method 3), the solid refrigerant substance undergoes a phase transition and generates heat or absorbs heat as an inducer applies a stress fluctuation to the solid refrigerant substance.

It should be understood that the embodiments and modifications described above can be modified in various ways in configuration and details within the sprit and scope of the claims. The embodiments and modifications described above may be combined or replaced as necessary, as long as the function of the object of the present disclosure is not impaired.

The terms "first", "second". "third", and the like used in the above description are used to discriminate between words or phrases to which these terms are attached and do not limit the number and the order of the words or phrases.

As heretofore described, the present disclosure is useful for solid-state refrigeration devices, in particular, magnetic refrigeration devices.

The invention claimed is:

1. A solid-state refrigeration device comprising:
   at least one solid-state cooler including a solid refrigerant substance, an internal flow path with the solid refrigerant substance disposed therein, and an inducer configured to induce a caloric effect in the solid refrigerant substance;
   at least one first heat exchanger;
   at least one second heat exchanger;
   at least one heat medium circuit connected to the first heat exchanger, the second heat exchanger, and the internal flow path;
   a reciprocating transport mechanism configured to transport a heat medium of the heat medium circuit in a reciprocating manner; and
   an operation switching mechanism configured to switch between
      a heating operation in which
         the heat medium heated by the solid-state cooler is caused to release heat in the first heat exchanger, and
         the heat medium cooled by the solid-state cooler is caused to absorb heat in the second heat exchanger, and
      a defrosting operation in which
         the heat medium cooled by the solid-state cooler is caused to absorb heat in the first heat exchanger, and
         the heat medium heated by the solid-state cooler is caused to release heat in the second heat exchanger,
   the operation switching mechanism including
      a switching mechanism configured to switch between flow paths of the heat medium in the heating operation and the defrosting operation; and
      an electronic controller,
   the electronic controller being configured to control the inducer, the reciprocating transport mechanism, and the switching mechanism so as to perform the heating operation and the defrosting operation in a switching manner.

2. The solid-state refrigeration device according to claim 1, wherein
   the solid refrigerant substance is a magnetic working substance,
   the inducer is a magnetic field modulator configured to apply a magnetic field fluctuation to the magnetic working substance,
   the solid-state cooler is a cascade magnetic refrigerator including magnetic working substances of a plurality of types,
   the heat medium circuit includes a high-temperature outflow portion, a high-temperature inflow portion, a low-temperature outflow portion, and a low-temperature inflow portion each of which communicates with the internal flow path of the magnetic refrigerator,
   in the heating operation,
      a heat medium heated by the magnetic refrigerator flows in the high-temperature outflow portion, the first heat exchanger, and the high-temperature inflow portion, and
      a heat medium cooled by the magnetic refrigerator flows in the low-temperature outflow portion, the second heat exchanger, and the low-temperature inflow portion, and
   in the defrosting operation,
      a heat medium cooled by the magnetic refrigerator flows in the low-temperature outflow portion, the first heat exchanger, and the low-temperature inflow portion, and
      a heat medium heated by the magnetic refrigerator flows in the high-temperature outflow portion, the second heat exchanger, and the high-temperature inflow portion.

3. The solid-state refrigeration device according to claim 2, further comprising:
   a suppression mechanism configured to suppress decrease in a temperature gradient in an interval from a high-temperature end to a low-temperature end of the magnetic refrigerator at least one of
      after switching from the heating operation to the defrosting operation and
      after switching from the defrosting operation to the heating operation.

4. The solid-state refrigeration device according to claim 3, wherein
   the suppression mechanism includes at least one of
      a first heat-quantity adjuster configured to reduce a heat quantity of a heat medium that flows into the low-temperature inflow portion, and
      a second heat-quantity adjuster configured to increase a heat quantity of a heat medium that flows into the high-temperature inflow portion.

5. The solid-state refrigeration device according to claim 4, wherein
   the first heat-quantity adjuster includes
      a first bypass flow path that allows a heat medium that has flowed out from the low-temperature outflow portion to bypass the first heat exchanger or the second heat exchanger and flow into the low-temperature inflow portion, and a first control valve that adjusts a flow-path resistance of the first bypass flow path, and the second heat-quantity adjuster includes a second bypass flow path that allows a heat medium that has flowed out from the high-temperature outflow portion to
bypass the first heat exchanger or the second heat exchanger and flow into the high-temperature inflow portion, and a second control valve that adjusts a flow-path resistance of the second bypass flow path.

6. The solid-state refrigeration device according to claim 5, wherein
the suppression mechanism includes the reciprocating transport mechanism, and
the reciprocating transport mechanism is configured to suppress decrease in the temperature gradient of the magnetic refrigerator by reducing a flow rate of the heat medium.

7. The solid-state refrigeration device according to claim 2, wherein
the at least one solid-state cooler includes a plurality of solid-state coolers,
the at least one heat medium circuit includes a plurality of heat medium circuits,
the at least one second heat exchanger includes a plurality of second heat exchangers,
in the defrosting operation, a plurality of defrosting actions are performed in such a way as to change a second heat exchanger to be defrosted, and
in each of the defrosting actions, a first operation and a second operation are simultaneously performed,
the first operation being an operation in which a heat medium heated by one or some of the solid-state coolers is caused to release heat in the first heat exchanger and a heat medium cooled by the one or some of the solid-state coolers is caused to absorb heat in one or some of the second heat exchangers, and
the second operation being an operation in which a heat medium heated by another or others of the solid-state coolers is caused to release heat in another or others of the second heat exchangers to be defrosted.

8. The solid-state refrigeration device according to claim 3, wherein
the suppression mechanism includes the reciprocating transport mechanism, and
the reciprocating transport mechanism is configured to suppress decrease in the temperature gradient of the magnetic refrigerator by reducing a flow rate of the heat medium.

9. The solid-state refrigeration device according to claim 8, wherein
the at least one solid-state cooler includes a plurality of solid-state coolers,
the at least one heat medium circuit includes a plurality of heat medium circuits,
the at least one second heat exchanger includes a plurality of second heat exchangers,
in the defrosting operation, a plurality of defrosting actions are performed in such a way as to change a second heat exchanger to be defrosted, and
in each of the defrosting actions, a first operation and a second operation are simultaneously performed,
the first operation being an operation in which a heat medium heated by one or some of the solid-state coolers is caused to release heat in the first heat exchanger and a heat medium cooled by the one or some of the solid-state coolers is caused to absorb heat in one or some of the second heat exchangers, and
the second operation being an operation in which a heat medium heated by another or others of the solid-state coolers is caused to release heat in another or others of the second heat exchangers to be defrosted.

10. The solid-state refrigeration device according to claim 3, wherein
the at least one solid-state cooler includes a plurality of solid-state coolers,
the at least one heat medium circuit includes a plurality of heat medium circuits,
the at least one second heat exchanger includes a plurality of second heat exchangers,
in the defrosting operation, a plurality of defrosting actions are performed in such a way as to change a second heat exchanger to be defrosted, and
in each of the defrosting actions, a first operation and a second operation are simultaneously performed,
the first operation being an operation in which a heat medium heated by one or some of the solid-state coolers is caused to release heat in the first heat exchanger and a heat medium cooled by the one or some of the solid-state coolers is caused to absorb heat in one or some of the second heat exchangers, and
the second operation being an operation in which a heat medium heated by another or others of the solid-state coolers is caused to release heat in another or others of the second heat exchangers to be defrosted.

11. The solid-state refrigeration device according to claim 4, wherein
the suppression mechanism includes the reciprocating transport mechanism, and
the reciprocating transport mechanism is configured to suppress decrease in the temperature gradient of the magnetic refrigerator by reducing a flow rate of the heat medium.

12. The solid-state refrigeration device according to claim 4, wherein
the at least one solid-state cooler includes a plurality of solid-state coolers,
the at least one heat medium circuit includes a plurality of heat medium circuits,
the at least one second heat exchanger includes a plurality of second heat exchangers,
in the defrosting operation, a plurality of defrosting actions are performed in such a way as to change a second heat exchanger to be defrosted, and
in each of the defrosting actions, a first operation and a second operation are simultaneously performed,
the first operation being an operation in which a heat medium heated by one or some of the solid-state coolers is caused to release heat in the first heat exchanger and a heat medium cooled by the one or some of the solid-state coolers is caused to absorb heat in one or some of the second heat exchangers, and
the second operation being an operation in which a heat medium heated by another or others of the solid-state coolers is caused to release heat in another or others of the second heat exchangers to be defrosted.

13. The solid-state refrigeration device according to claim 5, wherein
the at least one solid-state cooler includes a plurality of solid-state coolers,
the at least one heat medium circuit includes a plurality of heat medium circuits,
the at least one second heat exchanger includes a plurality of second heat exchangers,
in the defrosting operation, a plurality of defrosting actions are performed in such a way as to change a second heat exchanger to be defrosted, and
in each of the defrosting actions, a first operation and a second operation are simultaneously performed,
the first operation being an operation in which a heat medium heated by one or some of the solid-state coolers is caused to release heat in the first heat exchanger and a heat medium cooled by the one or some of the solid-state coolers is caused to absorb heat in one or some of the second heat exchangers, and
the second operation being an operation in which a heat medium heated by another or others of the solid-state coolers is caused to release heat in another or others of the second heat exchangers to be defrosted.

14. The solid-state refrigeration device according to claim 1, wherein
the solid refrigerant substance is a magnetic working substance,
the inducer is a magnetic field modulator configured to apply a magnetic field fluctuation to the magnetic working substance,
the solid-state cooler is a single-layer magnetic refrigerator including a magnetic working substance of one type,
the heat medium circuit includes a first outflow portion, a first inflow portion, a second outflow portion, and a second inflow portion each of which communicates with the internal flow path of the magnetic refrigerator,
in the heating operation,
a heat medium heated by the magnetic refrigerator flows in the first outflow portion, the first heat exchanger, and the first inflow portion, and
a heat medium cooled by the magnetic refrigerator flows in the second outflow portion, the second heat exchanger, and the second inflow portion, and
in the defrosting operation,
a heat medium cooled by the magnetic refrigerator flows in the first outflow portion, the first heat exchanger, and the first inflow portion, and
a heat medium heated by the magnetic refrigerator flows in the second outflow portion, the second heat exchanger, and the second inflow portion.

15. The solid-state refrigeration device according to claim 14, wherein
the at least one solid-state cooler includes a plurality of solid-state coolers,
the at least one heat medium circuit includes a plurality of heat medium circuits,
the at least one second heat exchanger includes a plurality of second heat exchangers,
in the defrosting operation, a plurality of defrosting actions are performed in such a way as to change a second heat exchanger to be defrosted, and
in each of the defrosting actions, a first operation and a second operation are simultaneously performed,
the first operation being an operation in which a heat medium heated by one or some of the solid-state coolers is caused to release heat in the first heat exchanger and a heat medium cooled by the one or some of the solid-state coolers is caused to absorb heat in one or some of the second heat exchangers, and
the second operation being an operation in which a heat medium heated by another or others of the solid-state coolers is caused to release heat in another or others of the second heat exchangers to be defrosted.

16. The solid-state refrigeration device according to claim 1, wherein
the at least one solid-state cooler includes a plurality of solid-state coolers,
the at least one heat medium circuit includes a plurality of heat medium circuits,
the at least one second heat exchanger includes a plurality of second heat exchangers,
in the defrosting operation, a plurality of defrosting actions are performed in such a way as to change a second heat exchanger to be defrosted, and
in each of the defrosting actions, a first operation and a second operation are simultaneously performed,
the first operation being an operation in which a heat medium heated by one or some of the solid-state coolers is caused to release heat in the first heat exchanger and a heat medium cooled by the one or some of the solid-state coolers is caused to absorb heat in one or some of the second heat exchangers, and
the second operation being an operation in which a heat medium heated by another or others of the solid-state coolers is caused to release heat in another or others of the second heat exchangers to be defrosted.

17. The solid-state refrigeration device according to claim 16, wherein
the plurality of heat medium circuits each include an auxiliary heat exchanger, and
in the second operation,
a heat medium cooled by the other or others of the solid-state coolers is caused to bypass the first heat exchanger and absorb heat in the auxiliary heat exchanger, and
a heat medium heated by the other or others of the solid-state coolers is caused to release heat in another or others of the second heat exchangers to be defrosted.

18. The solid-state refrigeration device according to claim 16, wherein
the plurality of heat medium circuits each include the first heat exchanger,
in the first operation,
a heat medium heated by the one or some of the solid-state coolers is caused to release heat in one or some of the first heat exchangers and
a heat medium cooled by the one or some of the solid-state coolers is caused to absorb heat in one or some of the second heat exchangers, and
in the second operation,
a heat medium heated by the other or others of the solid-state coolers is caused to release heat in another or others of the second heat exchangers and
a heat medium cooled by the other or others of the solid-state coolers is caused to absorb heat in another or others of the first heat exchangers.

19. The solid-state refrigeration device according to claim 18, further comprising:
- a plurality of fans, each fan being configured to transport air that passes through a corresponding one of the plurality of first heat exchangers and that is supplied to an indoor space,
- in the first operation, one or more of the fans corresponding to the one or more of the first heat exchangers is operated, and
- in the second operation, one of
  - an airflow rate of each of one or more the fans corresponding to the other or others of the first heat exchangers is made lower than an airflow rate of each of the one or more fans corresponding to the one or more of the first heat exchangers, or
  - one or more fans corresponding to the other or others of the first heat exchangers is stopped.

20. The solid-state refrigeration device according to claim 1, wherein
- the solid refrigerant substance is a magnetic working substance,
- the inducer is a magnetic field modulator configured to apply a magnetic field fluctuation to the magnetic working substance, and
- the solid-state cooler is a magnetic refrigerator.

* * * * *